US012557722B2

(12) United States Patent
Ellaboudy et al.

(10) Patent No.: US 12,557,722 B2
(45) Date of Patent: Feb. 24, 2026

(54) AGRICULTURAL LANE FOLLOWING

(71) Applicant: Deere & Company, Moline, IL (US)

(72) Inventors: Ameer Ellaboudy, Newark, CA (US);
Aubrey C. Donnellan, San Mateo, CA
(US); Austin Chun, San Jose, CA
(US); Igino C. Cafiero, Palo Alto, CA
(US); David E. Bertucci, Sunnyvale,
CA (US); Thuy T. Nguyen, Albany, CA
(US)

(73) Assignee: Deere & Company, Moline, IL (US)

( * ) Notice: Subject to any disclaimer, the term of this
patent is extended or adjusted under 35
U.S.C. 154(b) by 0 days.

(21) Appl. No.: 18/462,401

(22) Filed: Sep. 6, 2023

(65) Prior Publication Data

US 2024/0065131 A1      Feb. 29, 2024

Related U.S. Application Data

(63) Continuation of application No. 16/918,388, filed on
Jul. 1, 2020, now Pat. No. 11,778,934.
(Continued)

(51) Int. Cl.
*A01B 69/00*          (2006.01)
*A01B 69/04*          (2006.01)
(Continued)

(52) U.S. Cl.
CPC .......... *A01B 69/001* (2013.01); *A01B 69/008*
(2013.01); *B60W 40/114* (2013.01);
(Continued)

(58) Field of Classification Search
CPC .................................................. A01B 69/008
See application file for complete search history.

(56) References Cited

U.S. PATENT DOCUMENTS

| | | | | |
|---|---|---|---|---|
| 6,236,916 B1 * | 5/2001 | Staub | ................... | A01B 69/008 |
| | | | | 701/23 |
| 7,248,968 B2 * | 7/2007 | Reid | ...................... | G06V 20/10 |
| | | | | 701/116 |

(Continued)

FOREIGN PATENT DOCUMENTS

| | | | |
|---|---|---|---|
| BR | 102016015225 A2 * | 1/2017 | |
| BR | 102016015225 B1 | 9/2021 | |

(Continued)

OTHER PUBLICATIONS

International Search Report in International Application No. PCT/
US2020/04060, dated Oct. 1, 2020, 2 pgs.

*Primary Examiner* — Shelley Chen
(74) *Attorney, Agent, or Firm* — Young Basile Hanlon &
MacFarlane, P.C.

(57) ABSTRACT

Systems and methods for agricultural lane following are
described. For example, a method includes accessing range
data captured using a distance sensor connected to a vehicle
and/or image data captured using an image sensor connected
to a vehicle; detecting a crop row based on the range data
and/or the image data to obtain position data for the crop
row; determining, based on the position data for the crop
row, a yaw and a lateral position of the vehicle with respect
to a lane bounded by the crop row; and based on the yaw and
the lateral position, controlling the vehicle to move along a
length of the lane bounded by the crop row.

20 Claims, 32 Drawing Sheets

Related U.S. Application Data

(60) Provisional application No. 62/869,865, filed on Jul. 2, 2019.

(51) Int. Cl.

| | |
|---|---|
| *B60W 40/114* | (2012.01) |
| *G06V 10/44* | (2022.01) |
| *G06V 10/764* | (2022.01) |
| *G06V 20/56* | (2022.01) |

(52) U.S. Cl.
CPC .......... *G06V 10/454* (2022.01); *G06V 10/764* (2022.01); *G06V 20/56* (2022.01)

(56) References Cited

U.S. PATENT DOCUMENTS

| | | | | |
|---|---|---|---|---|
| 8,775,081 | B2 * | 7/2014 | Welty | G06V 10/26 702/2 |
| 9,767,366 | B1 * | 9/2017 | Fairfield | G06V 10/752 |
| 10,699,167 | B1 * | 6/2020 | Dowdall | G06F 18/2178 |
| 10,810,866 | B2 * | 10/2020 | Barth | G08B 13/19647 |
| 10,891,482 | B2 * | 1/2021 | Gurzoni, Jr. | G06V 20/64 |
| 11,100,648 | B2 * | 8/2021 | Sneyders | G06T 7/73 |
| 2007/0001097 | A1 * | 1/2007 | Wei | A01B 69/001 250/208.1 |
| 2007/0014434 | A1 * | 1/2007 | Wei | G06V 10/243 382/104 |
| 2007/0071311 | A1 * | 3/2007 | Rovira-Mas | G06T 7/70 382/104 |
| 2007/0269114 | A1 * | 11/2007 | Jochem | G06K 9/00798 382/209 |
| 2010/0070178 | A1 * | 3/2010 | Wang | A01B 69/007 701/472 |
| 2011/0246073 | A1 * | 10/2011 | Ma | G01S 17/89 702/2 |
| 2012/0004847 | A1 * | 1/2012 | Welty | A01G 23/099 702/2 |
| 2013/0080057 | A1 * | 3/2013 | Welty | G06V 10/26 702/150 |
| 2013/0083020 | A1 * | 4/2013 | Shimamura | G06F 30/00 345/420 |
| 2016/0050840 | A1 * | 2/2016 | Sauder | A01B 79/005 701/3 |
| 2017/0122742 | A1 * | 5/2017 | Schleicher | G01C 21/14 |
| 2017/0131718 | A1 * | 5/2017 | Matsumura | H04N 23/11 |
| 2017/0176595 | A1 * | 6/2017 | McPeek | G01C 21/165 |
| 2017/0206415 | A1 * | 7/2017 | Redden | H04N 13/243 |
| 2018/0243772 | A1 * | 8/2018 | Davis | A01M 7/0053 |
| 2019/0133022 | A1 * | 5/2019 | Connell | A01C 23/047 |
| 2019/0347821 | A1 * | 11/2019 | Stein | G08G 1/096725 |
| 2019/0351434 | A1 * | 11/2019 | Smith | B05B 12/124 |
| 2020/0073389 | A1 * | 3/2020 | Flajolet | A01B 69/004 |
| 2021/0195824 | A1 * | 7/2021 | Van Roekel | A01B 69/008 |
| 2022/0232771 | A1 * | 7/2022 | Byttebier | A01D 41/141 |

FOREIGN PATENT DOCUMENTS

| | | | | | |
|---|---|---|---|---|---|
| CA | 2556056 | C | * | 12/2015 | G06V 20/13 |
| CN | 102138377 | A | * | 8/2011 | |
| CN | 103196368 | A | * | 7/2013 | |
| CN | 103827697 | A | * | 5/2014 | G06V 10/26 |
| CN | 103914786 | A | * | 7/2014 | |
| CN | 102881219 | B | * | 11/2014 | |
| CN | 103196368 | B | * | 7/2015 | |
| CN | 102682475 | B | * | 2/2016 | |
| CN | 105612978 | A | * | 6/2016 | |
| CN | 106889052 | A | * | 6/2017 | A01B 39/18 |
| CN | 107067430 | A | * | 8/2017 | G06T 7/60 |
| CN | 109421730 | A | * | 3/2019 | G06V 20/58 |
| CN | 109886905 | A | * | 6/2019 | |
| CN | 110386142 | A | * | 10/2019 | B60W 60/001 |
| CN | 110388931 | A | * | 10/2019 | G06T 7/536 |
| CN | 109886905 | B | * | 6/2023 | |
| EP | 3219184 | A1 | | 9/2017 | |
| EP | 3298877 | A1 | * | 3/2018 | A01D 45/007 |
| EP | 3366134 | A1 | | 8/2018 | |
| EP | 3766320 | A1 | * | 1/2021 | G05D 1/242 |
| EP | 4198887 | A1 | * | 6/2023 | G06T 7/579 |
| JP | 01055113 | | | 3/1989 | |
| JP | 01055113 | A | * | 3/1989 | |
| JP | 6735303 | B2 | * | 8/2020 | G05D 1/242 |
| JP | 6793140 | B2 | * | 12/2020 | |
| WO | WO-0058801 | A1 | * | 10/2000 | G05D 1/0278 |
| WO | WO-2010063075 | A1 | * | 6/2010 | A01D 46/30 |
| WO | WO-2015024059 | A1 | * | 2/2015 | G01C 21/20 |
| WO | WO-2019120392 | A1 | * | 6/2019 | G06T 7/277 |
| WO | WO-2019176844 | A1 | * | 9/2019 | G05D 1/242 |
| WO | WO-2019228461 | A1 | * | 12/2019 | A01D 34/66 |
| WO | WO-2020037003 | A1 | * | 2/2020 | A01D 41/1278 |

* cited by examiner

100

200

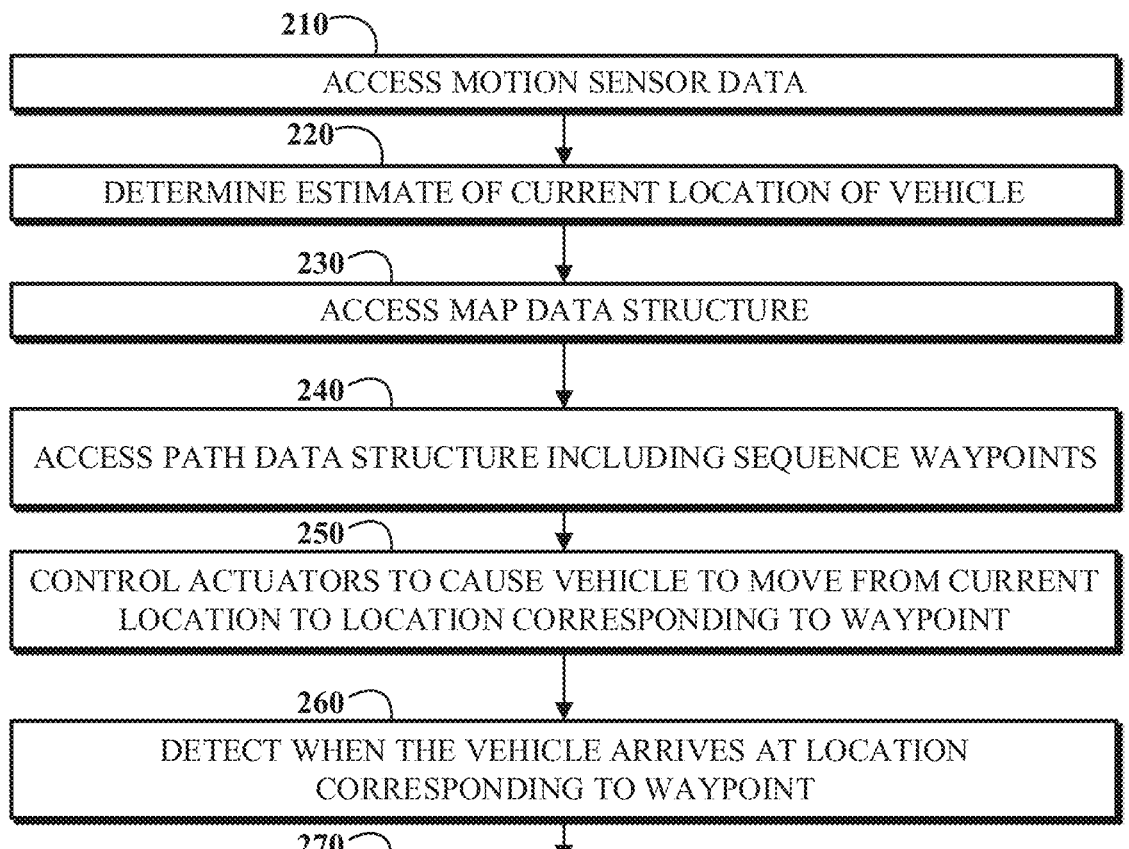

210
ACCESS MOTION SENSOR DATA

220
DETERMINE ESTIMATE OF CURRENT LOCATION OF VEHICLE

230
ACCESS MAP DATA STRUCTURE

240
ACCESS PATH DATA STRUCTURE INCLUDING SEQUENCE WAYPOINTS

250
CONTROL ACTUATORS TO CAUSE VEHICLE TO MOVE FROM CURRENT LOCATION TO LOCATION CORRESPONDING TO WAYPOINT

260
DETECT WHEN THE VEHICLE ARRIVES AT LOCATION CORRESPONDING TO WAYPOINT

270
RESPONSIVE TO VEHICLE ARRIVING AT WAYPOINT, CONTROLLING ACTUATORS, BASED ON IMPLEMENT CONTROL DATA OF THE WAYPOINT, TO CAUSE THE IMPLEMENT TO PERFORM OPERATION IN VICINITY OF THE VEHICLE

```
DETERMINE LOCALIZATION DATA BASED ON MOTION SENSOR DATA
COLLECTED WHILE A USER MANUALLY CONTROLS VEHICLE AND
MOUNTED IMPLEMENT
```

320 —

```
RECORD IMPLEMENT CONTROL DATA ASSOCIATED WITH POSITIONS
IN THE LOCALIZATION DATA
```

330 —

```
GENERATE THE PATH DATA STRUCTURE BASED ON THE
LOCALIZATION DATA AND THE ASSOCIATED IMPLEMENT CONTROL
DATA
```

410
PRESENT MAP TO USER IN A USER INTERFACE THAT ENABLES USER
TO DRAW A PATH FOR THE VEHICLE ON THE MAP
420
RECEIVE DATA SPECIFYING THE DRAWN PATH
430
GENERATE THE PATH DATA STRUCTURE BASED ON THE DRAWN PATH
FIG. 4

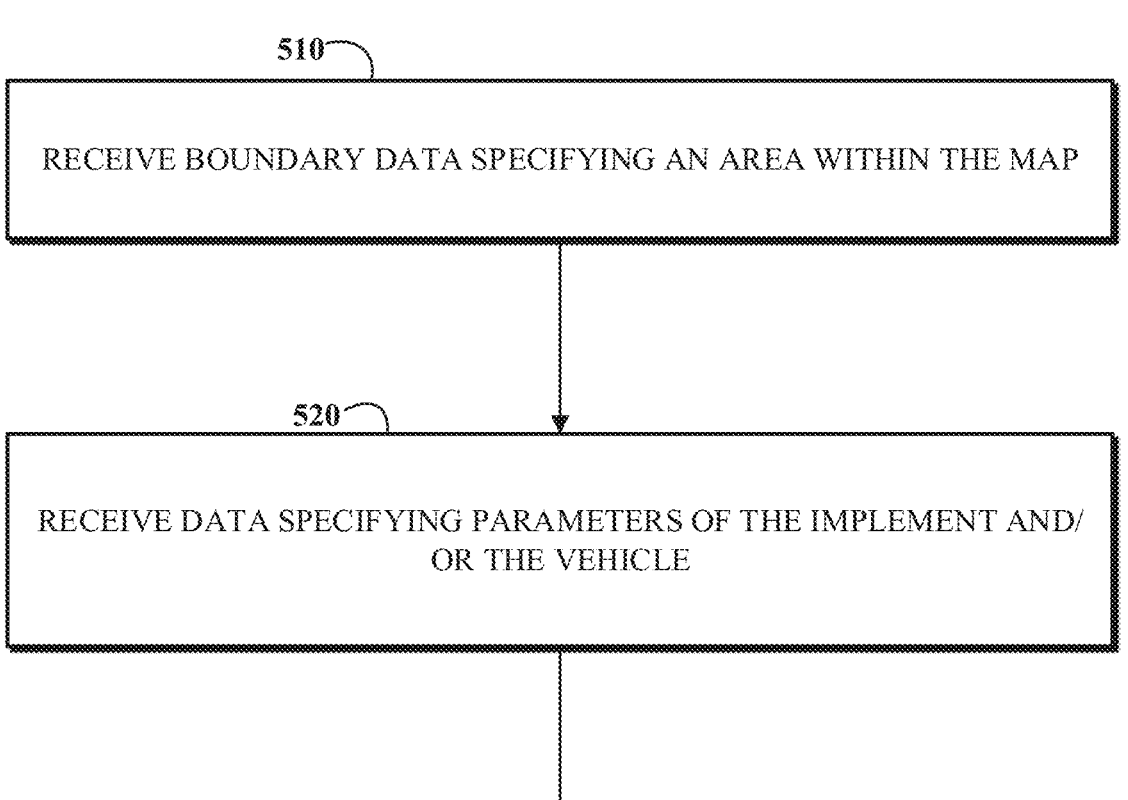
500
510
RECEIVE BOUNDARY DATA SPECIFYING AN AREA WITHIN THE MAP
520
RECEIVE DATA SPECIFYING PARAMETERS OF THE IMPLEMENT AND/ OR THE VEHICLE
530
GENERATE THE PATH DATA STRUCTURE BASED ON THE MAP AND THE BOUNDARY DATA
FIG. 5

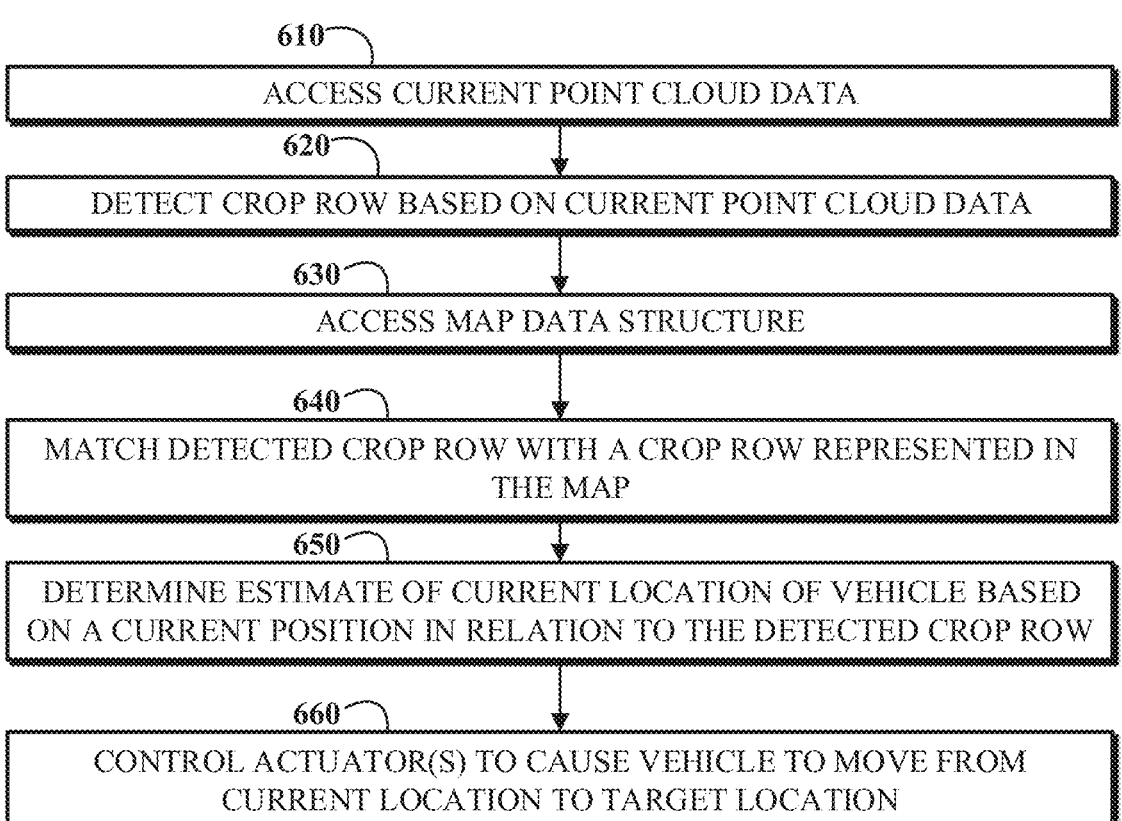

600

610
ACCESS CURRENT POINT CLOUD DATA

620
DETECT CROP ROW BASED ON CURRENT POINT CLOUD DATA

630
ACCESS MAP DATA STRUCTURE

640
MATCH DETECTED CROP ROW WITH A CROP ROW REPRESENTED IN THE MAP

650
DETERMINE ESTIMATE OF CURRENT LOCATION OF VEHICLE BASED ON A CURRENT POSITION IN RELATION TO THE DETECTED CROP ROW

660
CONTROL ACTUATOR(S) TO CAUSE VEHICLE TO MOVE FROM CURRENT LOCATION TO TARGET LOCATION

FILTER CURRENT POINT CLOUD DATA TO CONSIDER ONLY POINTS IN A ZONE OF INTEREST

720

DETECT CROP ROW IN FILTERED CURRENT POINT CLOUD DATA

730

COMPARE CURRENT POINT CLOUD DATA TO POINT CLOUD DATA OF THE MAP THAT IS SELECTED BASED ON MOTION SENSOR DATA FOR THE VEHICLE

740

MATCH DETECTED CROP ROW TO CROP ROW IN MAP BASED ON THE COMPARISON(S) OF POINT CLOUD DATA

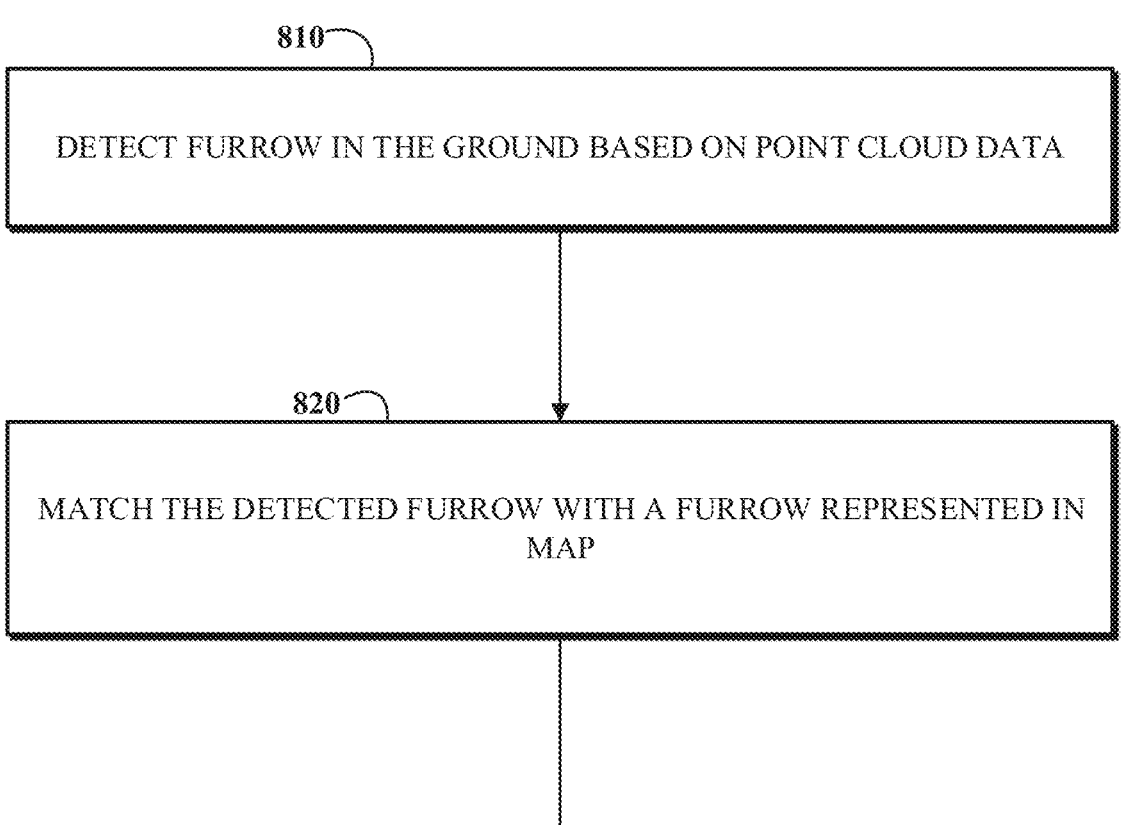
800
810
DETECT FURROW IN THE GROUND BASED ON POINT CLOUD DATA
820
MATCH THE DETECTED FURROW WITH A FURROW REPRESENTED IN MAP
830
DETERMINE ESTIMATE OF CURRENT LOCATION OF VEHICLE BASED ON A CURRENT POSITION IN RELATION TO THE DETECTED FURROW
FIG. 8

900
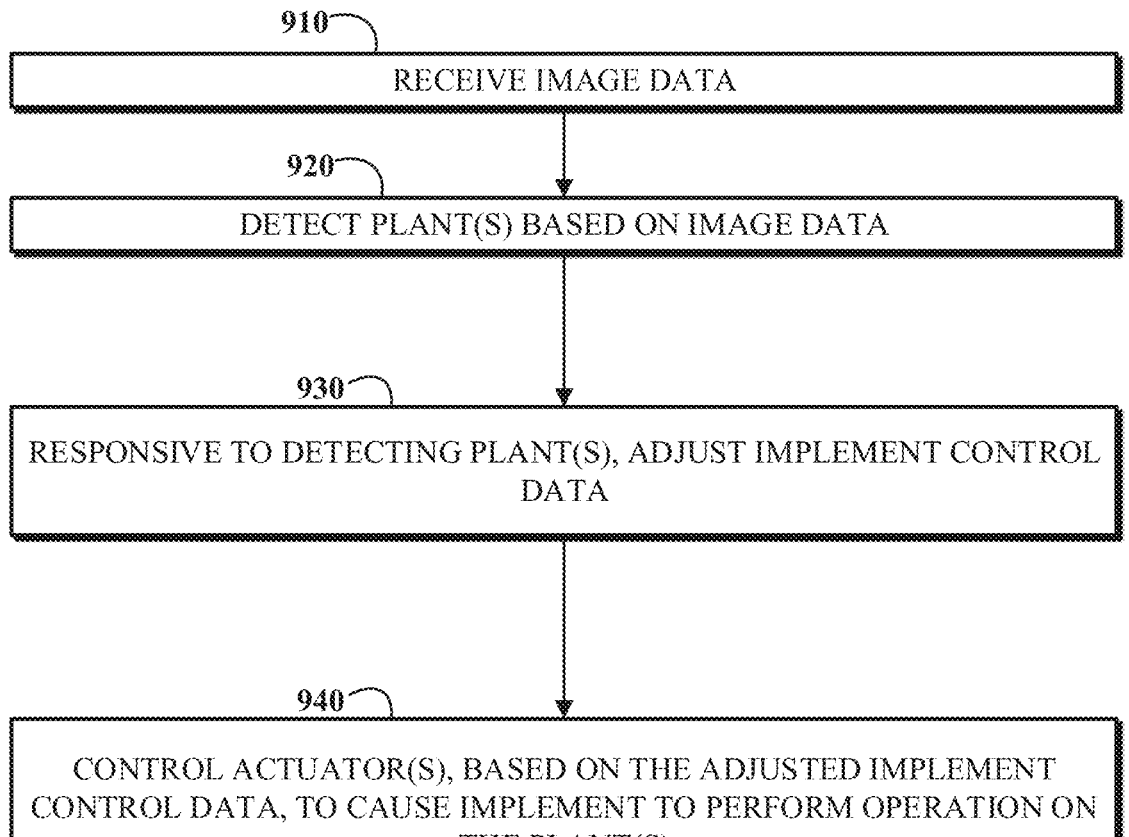
910
RECEIVE IMAGE DATA
920
DETECT PLANT(S) BASED ON IMAGE DATA
930
RESPONSIVE TO DETECTING PLANT(S), ADJUST IMPLEMENT CONTROL DATA
940
CONTROL ACTUATOR(S), BASED ON THE ADJUSTED IMPLEMENT CONTROL DATA, TO CAUSE IMPLEMENT TO PERFORM OPERATION ON THE PLANT(S)
FIG. 9

1010

| |
|---|
| WAYPOINT COORDINATES |
| IMPLEMENT CONTROL DATA |
| NEXT WAYPOINT POINTER |

1012

1014

1016

PROCESSING APPARATUS 1310

GPS 1330

ON-BOARD USER INTERFACE 1312

GPS 1330

PERCEPTION SENSOR(S) 1340

1320 STEERING, PEDAL, IMPLEMENT ACTUATORS

1350 E-STOPS

1300

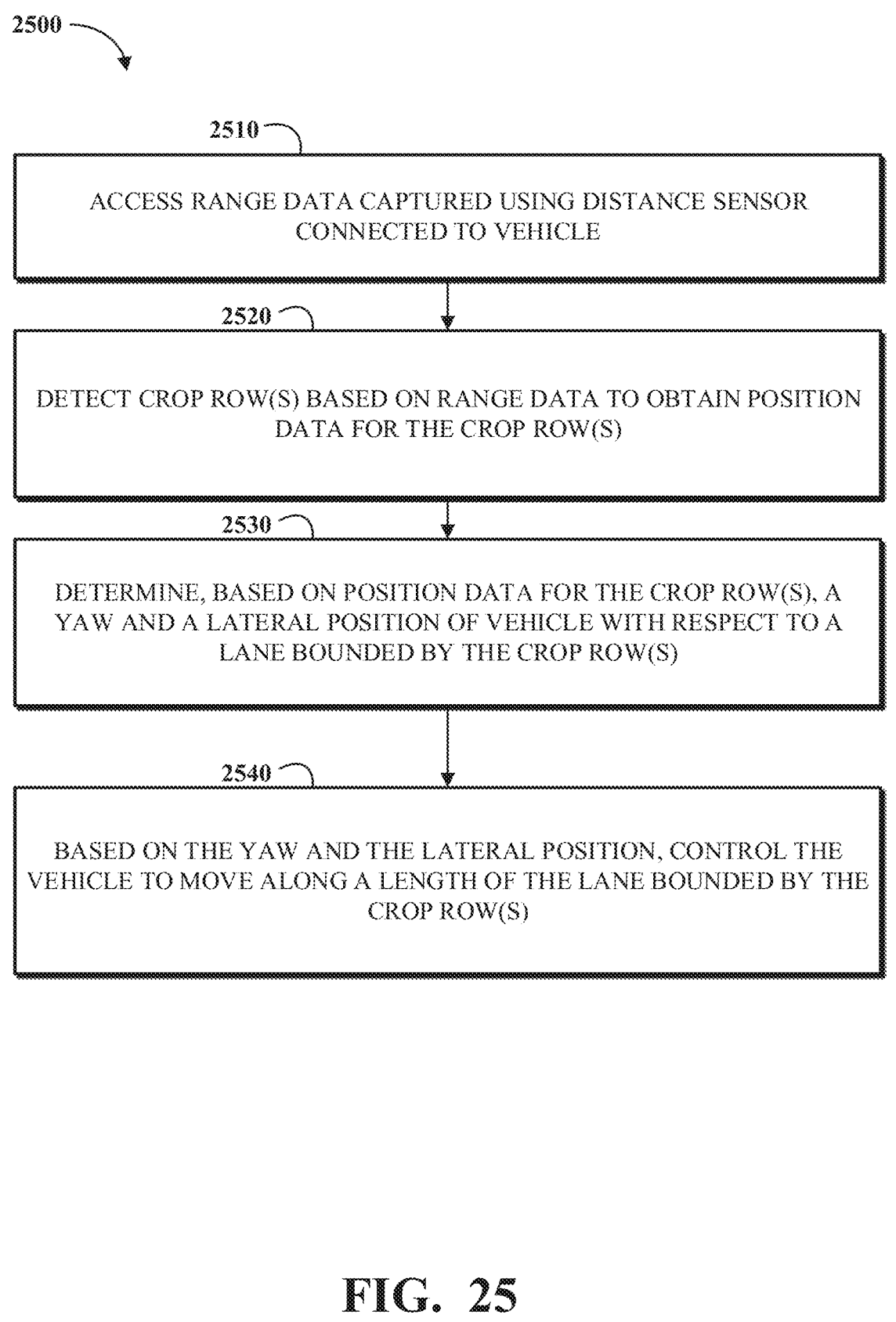

2500 ⌐

2510 ⌐

ACCESS RANGE DATA CAPTURED USING DISTANCE SENSOR
CONNECTED TO VEHICLE

2520 ⌐

DETECT CROP ROW(S) BASED ON RANGE DATA TO OBTAIN POSITION
DATA FOR THE CROP ROW(S)

2530 ⌐

DETERMINE, BASED ON POSITION DATA FOR THE CROP ROW(S), A
YAW AND A LATERAL POSITION OF VEHICLE WITH RESPECT TO A
LANE BOUNDED BY THE CROP ROW(S)

2540 ⌐

BASED ON THE YAW AND THE LATERAL POSITION, CONTROL THE
VEHICLE TO MOVE ALONG A LENGTH OF THE LANE BOUNDED BY THE
CROP ROW(S)

FIG. 25

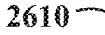
DETECT PLANTS OF CROP ROW BASED ON RANGE DATA, AND ASSOCIATE PLANTS OF THE CROP ROW WITH RESPECTIVE POSITIONS
FIT A LINE TO THE RESPECTIVE POSITIONS OF PLANTS OF THE CROP ROW
DETERMINE THE YAW AND LATERAL POSITION BASED ON THE LINE
FIG. 26

Figure 27:
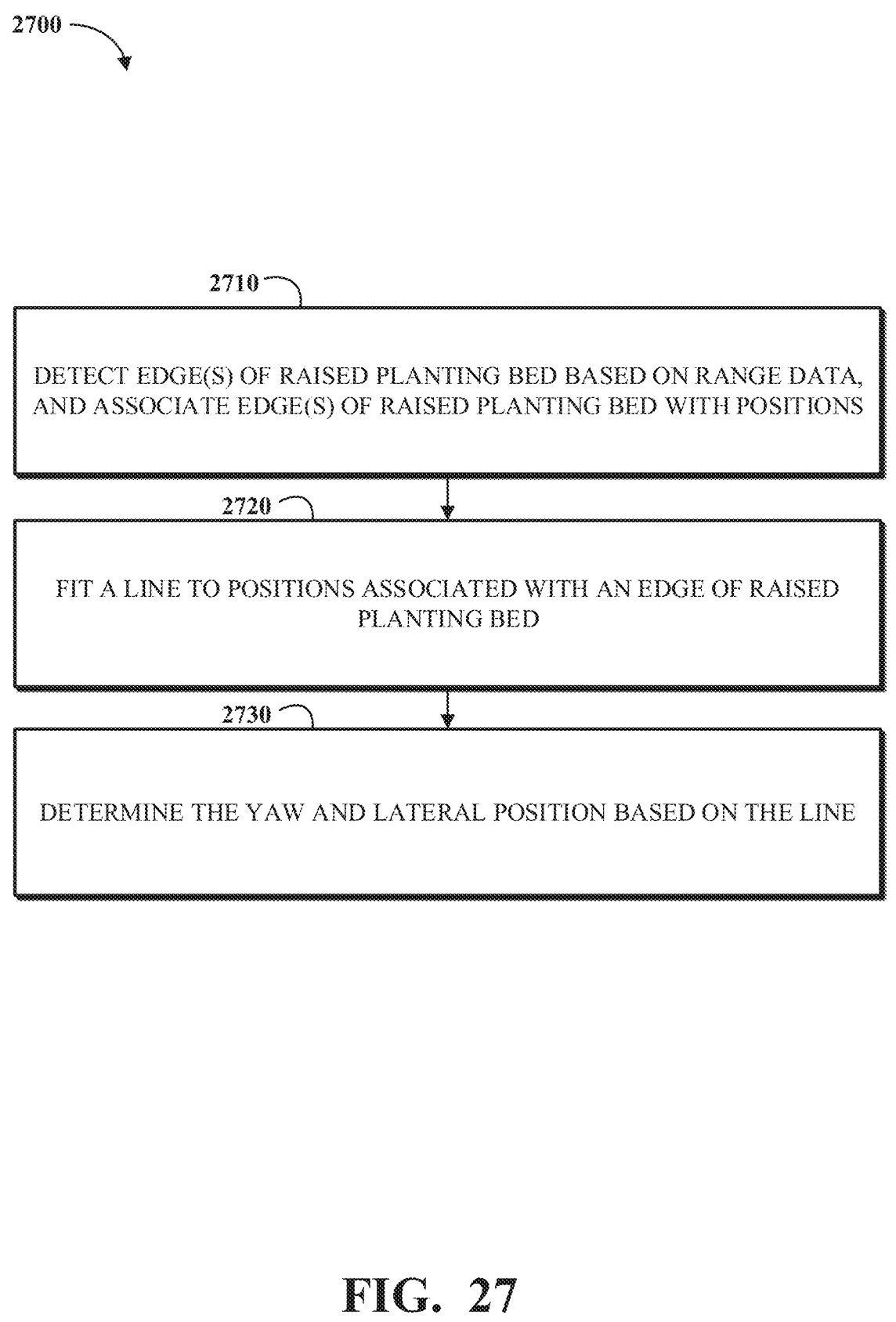

2700

2710

DETECT EDGE(S) OF RAISED PLANTING BED BASED ON RANGE DATA, AND ASSOCIATE EDGE(S) OF RAISED PLANTING BED WITH POSITIONS

2720

FIT A LINE TO POSITIONS ASSOCIATED WITH AN EDGE OF RAISED PLANTING BED

2730

DETERMINE THE YAW AND LATERAL POSITION BASED ON THE LINE

ACCESS IMAGE DATA CAPTURED USING IMAGE SENSOR(S) CONNECTED TO VEHICLE

2820

DETERMINE BOUNDING BOXES FOR RESPECTIVE PLANTS OF CROP ROW BASED ON IMAGE DATA AND RANGE DATA

2830

DETECT CROP ROW BASED ON THE BOUNDING BOXES

2910

DETERMINE GROUND PLANE SEGMENTATION BASED ON POINT
CLOUD DATA

2920

DETECT FURROW BASED ON THE GROUND PLANE SEGMENTATION

2930

BASED ON POSITION DATA FOR THE DETECTED FURROW, CONTROL
THE VEHICLE TO MOVE ALONG A LENGTH OF THE FURROW

3100

3110

INPUT IMAGE DATA TO NEURAL NETWORK TO DETECT A FIRST PLANT OF CROP ROW AND OBTAIN POSITION DATA FOR THE FIRST PLANT

3120

FIT A LINE TO POSITION DATA FOR MULTIPLE PLANTS OF THE CROP ROW, INCLUDING THE POSITION DATA FOR THE FIRST PLANT

3130

DETERMINE THE YAW AND LATERAL POSITION BASED ON THE LINE

AGRICULTURAL LANE FOLLOWING

CROSS REFERENCE

This application is a continuation of U.S. patent application Ser. No. 16/918,388, filed Jul. 1, 2020, which claims the benefit of U.S. Provisional Patent Application No. 62/869,865, filed Jul. 2, 2019, the entire disclosures of which are hereby incorporated by reference.

TECHNICAL FIELD

This disclosure relates to vehicle controllers for agricultural and industrial applications.

BACKGROUND

Autonomous vehicles have been made for automated navigation on roads and obstacle courses. These autonomous vehicles uses sensors, such as cameras and lidar, to sense objects in their environment. For example, an autonomous vehicle may generate motion plans and affect those motion plans by controlling wheels of the vehicles via control of an engine and transmission system, a braking system, and a steering system.

SUMMARY

Disclosed herein are implementations of vehicle controllers for agricultural and industrial applications.

In a first aspect, the subject matter described in this specification can be embodied in systems that include a distance sensor connected to a vehicle, wherein the distance sensor is configured to output range data reflecting distances of objects with respect to the vehicle; actuators configured to control motion of the vehicle; and a processing apparatus configured to: access range data captured using the distance sensor; detect a crop row based on the range data to obtain position data for the crop row; determine, based on the position data for the crop row, a yaw and a lateral position of the vehicle with respect to a lane bounded by the crop row; and based on the yaw and the lateral position, control, using one or more of the actuators, the vehicle to move along a length of the lane bounded by the crop row.

In a second aspect, the subject matter described in this specification can be embodied in systems that include one or more image sensors connected to a vehicle; actuators configured to control motion of the vehicle; and a processing apparatus configured to: access image data captured using the one or more image sensors; detect a crop row based on the image data to obtain position data for the crop row; determine, based on the position data for the crop row, a yaw and a lateral position of the vehicle with respect to a lane bounded by the crop row; and based on the yaw and the lateral position, control, using one or more of the actuators, the vehicle to move along a length of the lane bounded by the crop row.

In a third aspect, the subject matter described in this specification can be embodied in methods that include accessing range data captured using a distance sensor connected to a vehicle; detecting a crop row based on the range data to obtain position data for the crop row; determining, based on the position data for the crop row, a yaw and a lateral position of the vehicle with respect to a lane bounded by the crop row; and, based on the yaw and the lateral position, controlling the vehicle to move along a length of the lane bounded by the crop row.

In a fourth aspect, the subject matter described in this specification can be embodied in methods that include accessing image data captured using one or more image sensors connected to a vehicle; detecting a crop row based on the image data to obtain position data for the crop row; determining, based on the position data for crop row, a yaw and a lateral position of the vehicle with respect to a lane bounded by the crop row; and, based on the yaw and the lateral position, controlling the vehicle to move along a length of the lane bounded by the crop row.

In a fifth aspect, the subject matter described in this specification can be embodied in a non-transitory computer-readable storage medium storing executable instructions that, when executed by a processor, facilitate performance of operations, including accessing range data captured using a distance sensor connected to a vehicle; detecting a crop row based on the range data to obtain position data for the crop row; determining, based on the position data for the crop row, a yaw and a lateral position of the vehicle with respect to a lane bounded by the crop row; and, based on the yaw and the lateral position, controlling the vehicle to move along a length of the lane bounded by the crop row.

In a sixth aspect, the subject matter described in this specification can be embodied in a non-transitory computer-readable storage medium storing executable instructions that, when executed by a processor, facilitate performance of operations, including accessing image data captured using one or more image sensors connected to a vehicle; detecting a crop row based on the image data to obtain position data for the crop row; determining, based on the position data for crop row, a yaw and a lateral position of the vehicle with respect to a lane bounded by the crop row; and, based on the yaw and the lateral position, controlling the vehicle to move along a length of the lane bounded by the crop row.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2 is flow chart of an example of a process for automatically controlling a vehicle with a mounted implement to perform operations in portions of a geographic area.

FIG. 4 is flow chart of an example of a process for generating a path data structure based on a drawing on a map.

FIG. 5 is flow chart of an example of a process for generating a path data structure based on a boundary and a coverage objective.

FIG. 6 is flow chart of an example of a process for automated localization of a vehicle in an agricultural environment.

FIG. 8 is flow chart of an example of a process for localizing a vehicle in an agricultural environment.

FIG. 9 is flow chart of an example of a process for dynamically adjusting implement control for an implement connected to a vehicle in an agricultural environment.

FIG. 25 is flow chart of an example of a process for agricultural lane following using a distance sensor.

FIG. 26 is flow chart of an example of a process for determining a yaw and a lateral position within an agricultural lane based on detected plants.

FIG. 27 is flow chart of an example of a process for determining a yaw and a lateral position within an agricultural lane based on an edge of a raised planting bed.

DETAILED DESCRIPTION

Figure 1:
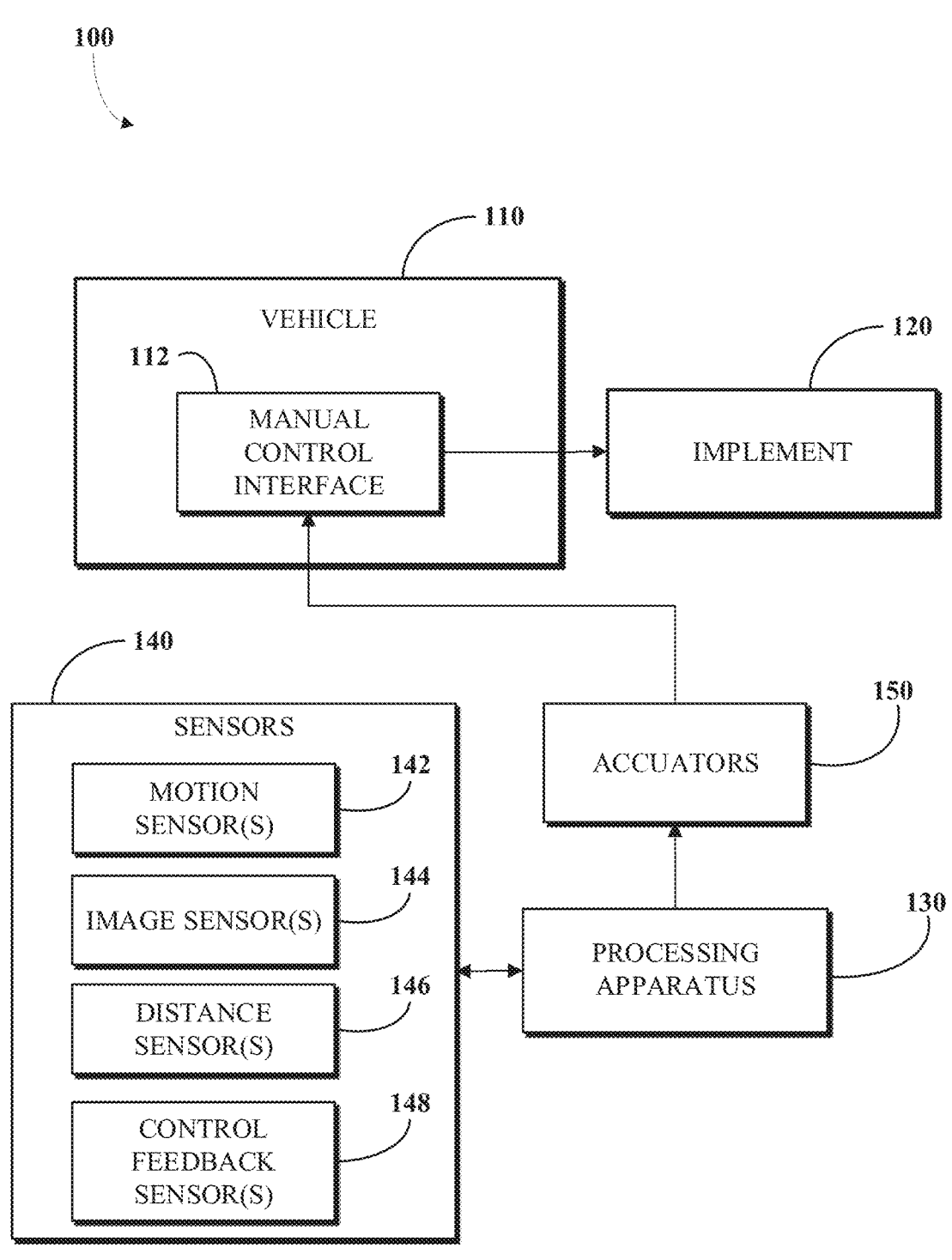
FIG. 1 is block diagram of an example of a system for automatically controlling a vehicle with a mounted implement to perform operations in portions of a geographic area.

Described herein are systems and processes for automated control of vehicles in agricultural and industrial environments. Some implementations may control movement of a vehicle (e.g., a tractor, a truck, or an all-terrain vehicle) and operation of an implement (e.g., a boom sprayer, a spreader, a harvester, a row crop cultivator, an auger, a plow, a tiller, a backhoe, a forklift, or a mower) that is connected to the vehicle in order to perform various operations at a subset of locations within a geographical area. In some implementations, these operations are controlled based on a predetermined path data structure, which may specify a desired path for a vehicle as a sequence of waypoints in a map of a geographic area. For example, waypoints of the path may include implement control data that specify how a mounted implement is to be used at locations associated with the respective waypoints. In some implementations, a path data structure may be generated by recording localization data for the vehicle and associated implement control data while a user manually controls the vehicle and the mounted implement to perform operations. In some implementations, a path data structure is generated based on a path drawn by user over a representation of a map that is presented to a user as part of a user interface. In some implementations, a path data structure may be generated automatically based on a map, specification of boundary of a region to be processed, a coverage objective, and/or vehicle and implement parameters and constraints.

The systems may include sensors connected to a vehicle for monitoring the state of the vehicle, monitoring the state of a mounted implement, and/or sensing the state of the surrounding environment. For example, a localization process may be implemented to determine an estimate of a current location of the vehicle based on motion sensor data and/or sensor data regarding objects (e.g., trees or row crops) in the surrounding environment. For example, a distance sensor (e.g., a lidar sensor, a radar sensor, or a sonar sensor) connected to the vehicle may be used to detect objects (e.g., plants) in a vicinity of the vehicle. Detected objects may then be matched with a topology of objects represented in a map to provide accurate localization (e.g., where motion sensor data is imprecise or unavailable).

For example, the state of objects (e.g., plants) in the environment may also be detected and monitored using sensors connected to a vehicle. For example, a normalized difference vegetation index camera may be connected to a vehicle and used to estimate a current state of a plant in the environment. For example, the state of plant may be monitored over time and used to determine recommendations for crop care. In some implementations, an estimate of the current state of one or more plants may be used to dynamically adjust the operation of an implement connected to the vehicle to better process the one or more plants. For example, an amount of input (e.g., water, fertilizer, or pesticide) deposited on the one or more plants may be adjusted based on sensor data reflecting a current state of the one or more plants.

FIG. 1 is block diagram of an example of a system 100 for automatically controlling a vehicle with a mounted implement to perform operations in portions of a geographic area. The system 100 system includes a vehicle 110; an implement 120 that is connected to the vehicle 110 and configured to selectively perform an operation in a vicinity of the vehicle 110; a processing apparatus 130 that is configured to control the vehicle 110 and the implement 120; sensors 140 connected to the vehicle 110 and/or the implement 120; and actuators 150 configured to control motion of the vehicle 110 and/or to control operation of an implement 120 based on control signals from the processing apparatus 130. The vehicle 110 may include a manual control interface 112 that can be used to control the vehicle 110 and the implement

5

6

120. In this example, the sensors 140 include one or more motion sensors 142, one or more image sensors 144, one or more distance sensors 146, and one or more control feedback sensors 148. For example, the system 100 may be used to implement the process 200 of FIG. 2, the process 600 of FIG. 6, and/or the process 900 of FIG. 9.

The system 100 includes a vehicle 110. For example, the vehicle 110 may be a tractor, a truck, an all-terrain vehicle, a drone, or a boat. In some implementations, the vehicle 110 is configured to move across land. For example, the vehicle 110 may include wheels, tracks, and/or treads. In some implementations, the vehicle 110 is configured to fly. For example, the vehicle 110 may include wings and/or propellers. In some implementations, the vehicle 110 is configured to through or across the surface of water. For example, the vehicle 110 may include a propeller, an impeller, or a pump-jet. The vehicle 110 may include a manual control interface 112 that can be used to control the vehicle 110. For example, the manual control interface 112 may include a steering wheel, an accelerator pedal, and a brake pedal. In some implementations, the manual control interface 112 also controls the operation of the implement 120. For example, the manual control interface 112 may include one or more joysticks, levers, and/or buttons for controlling the implement 120.

The system 100 includes an implement 120 that is connected to the vehicle 110 and configured to selectively perform an operation in a vicinity of the vehicle 110. For example, the implement 120 may include a sprayer (e.g., a boom sprayer), a spreader, a harvester, a row crop cultivator, an auger, a plow, a tiller, a backhoe, a forklift, or a mower. The implement 120 may include a tool attached to the vehicle to do work. For example, the implement 120 may be connected to the vehicle 110 via Power Take Off (PTO) connection. For example, the implement 120 may be connected to the vehicle 110 via permanent integration as components of a self-propelled farm implement. For example, the implement 120 may be primarily controlled via a 3-point hitch attached to the vehicle or via electronic or hydraulic systems. In some implementations, the implement 120 (e.g., controlled via a 3-point hitch) may be rigidly attached to the vehicle and can be raised and lowered to a constant height or a height that changes dynamically. For example, dynamic changes may be driven by load on the implement, such as from the ground during a tilling operation where the implement is partially in the ground or via some other sensor feedback on the implement or from the sensors 140 on the vehicle 110. For example, the implement 120 can be controlled via hydraulic or electric signaling. These signals may be used to control cutters, sprayers, motors, actuators, engines or any other required system to enable the implement 120 to execute a task. In some implementations, the implement 120, (e.g., a boom sprayer) may be actively leveled in real-time based on the tilt angle of the vehicle 110 (e.g., a tractor), which may be controlled with a closed loop system which includes sensing from the one or more motion sensors 142 (e.g., an IMU or other level sensing device) and the uses onboard actuators to level the implement 120.

The system 100 includes a processing apparatus 130. The processing apparatus 130 may include one or more processors having single or multiple processing cores. The processing apparatus 130 may include memory, such as random access memory device (RAM), flash memory, or any other suitable type of storage device such as a non-transitory computer readable memory. The memory of the processing apparatus 130 may include executable instructions and data that can be accessed by one or more processors of the processing apparatus 130. For example, the processing apparatus 130 may include one or more DRAM modules such as double data rate synchronous dynamic random-access memory (DDR SDRAM). In some implementations, the processing apparatus 130 may include a digital signal processor (DSP). In some implementations, the processing apparatus 130 may include a graphics processing unit (GPU). In some implementations, the processing apparatus 130 may include an application specific integrated circuit (ASIC).

The system 100 includes sensors 140 configured to capture sensor data reflecting state of the vehicle 110, the implement 120, and/or an environment the vehicle 110 is in. For example, the sensors 140 may be connected to the vehicle 110 and/or the implement. The processing apparatus 130 may be configured to access (e.g., receive via wired or wireless communications or read from a memory) sensor data captured using the sensors 140.

The sensors 140 include one or more motion sensors 142 configured to detect motion of the vehicle 110. For example, the one or more motion sensors 142 may include one or more accelerometers, gyroscopes, magnetometers, inertial measurement units, and/or global position system (GPS) receivers. For example, motion sensor data capturing using the one or more motion sensors 142 may be used to estimate a position and/or an orientation of the vehicle 110. For example, motion sensor data capturing using the one or more motion sensors 142 may be used to estimate a position and/or an orientation of the implement 120. For example, the processing apparatus 130 may be configured to access (e.g., receive via wired or wireless communications or read from a memory) motion sensor data captured using the one or more motion sensors 142.

The sensors 140 include one or more image sensors 144 connected to a vehicle 110. The one or more image sensors 144 are configured to capture images (e.g., RGB images or normalized difference vegetation index images). The one or more image sensors 144 are configured to detect light of a certain spectrum (e.g., the visible spectrum or the infrared spectrum) and convey information constituting an image as electrical signals (e.g., analog or digital signals). For example, the one or more image sensors 144 may include charge-coupled devices (CCD) or active pixel sensors in complementary metal-oxide-semiconductors (CMOS). The one or more image sensors 144 may detect light incident through respective lens (e.g., a fisheye lens). In some implementations, the one or more image sensors 144 include digital-to-analog converters. In some implementations, the one or more image sensors 144 have respective fields of view that overlap. The one or more image sensors 144 may be configured to capture images of objects in a vicinity of the vehicle 110. For example, the processing apparatus 130 may be configured to receive image data, captured using the one or more image sensors 144, depicting one or more plants in a vicinity of the vehicle 110. In some implementations, the one or more images sensors 144 may be configured to capture light in bands of the spectrum corresponding to plant vitality. For example, the one or more image sensors 144 may include a normalized difference vegetation index camera.

The sensors 140 include one or more distance sensors 146 connected to the vehicle 110. For example, the one or more distance sensors may include a lidar sensor, a radar sensor, a sonar sensor, and/or a structured light sensor. For example, sensor data captured using the one or more distance sensors 146 may include a three-dimensional point cloud data reflecting the locations of objects in a vicinity of the vehicle 110. In some implementations, point cloud data captured using the one or more distance sensors 146 may be processed and encoded as a voxelized occupancy grid. In some implementations, point cloud data captured using the one or more distance sensors 146 may be processed and encoded as a voxelized occupancy grid. For example, the processing apparatus 130 may be configured to access current point cloud data captured using the one or more distance sensors 146.

The sensors 140 include one or more control feedback sensors 148. The one or more control feedback sensors 148 may sense a state of the vehicle 110 and/or the implement 120 that is being controlled by the processing apparatus 130. In some implementations, the one or more control feedback sensors 148 may provide feedback about the vehicle state for use by a control system or for system status or health monitoring. For example, the one or more control feedback sensors 148 may include a speedometer, an encoder (e.g., an optical encoder), and/or a thermometer configured to sense temperature of an engine of the vehicle 110. For example, the one or more control feedback sensors 148 may utilize vehicle CAN-Bus integration to measure, vehicle speed, engine speed, fuel levels, and engine health, including but not limited to oil temp and pressure, coolant temperatures. For example, the one or more control feedback sensors 148 may include linear and rotary position sensors, including but not limited to those employing lasers, hall effect, resistor, switches and photogates to obtain position, including but not limited to absolute and relative positioning. For example, the one or more control feedback sensors 148 may include current sensors, including but not limited to hall effect and shunt type. For example, the one or more control feedback sensors 148 may include voltage sensors, including but not limited to digital and analog sensors. For example, the one or more control feedback sensors 148 may include force sensors, including but not limited to load cells and integrally mounted strain gauges. For example, the one or more control feedback sensors 148 may include temperature sensors, including but not limited to thermocouples, thermistors and resistance temperature detectors (RTDs). For example, the one or more control feedback sensors 148 may include pressure sensors.

The system 100 includes actuators 150 configured to control motion of the vehicle 110 and/or to control operation of the implement 120. The processing apparatus 130 may be configured to control the vehicle and/or the implement 120 using the actuators 150. In some implementations, the actuators 150 include components that can be mounted and easily removed from the vehicle 110. For example, the actuators 150 may include mechanical devices that move parts of the manual control interface 112 of the vehicle 110 (e.g., turn a steering wheel, pull a pedal, pull a lever, push a joystick, and/or depress a button). For example, the actuators 150 may be connected to the vehicle 110 in a way that allows a user to manually control the vehicle 110 using the manual control interface 112, either when the processing apparatus 130 is not actively controlling the vehicle 110 or to override control from the processing apparatus 130. For example, the actuators 150 may include electric motors controlled by the processing apparatus 130. For example, the actuators 150 may include cables connecting electric motors to parts of the manual control interface 112 and configured to pull or release those parts (e.g., a steering wheel, a pedal, or lever) in response to control signals from the processing apparatus 130. In some implementations, the actuators 150 include an interface to a messaging protocol (e.g., a vehicle CAN-bus or ISObus) for controlling part of the vehicle 110 and/or the implement 120. For example, the actuators 150 may include wires that convey control signals to downstream actuators (e.g., a motor or brakes) or downstream control interfaces (e.g., a steering wheel, a lever, a button, a pedal, or a touchscreen).

In some implementations (not shown in FIG. 1), the actuators may be integrated components of the vehicle 110. For example, the actuators 150 may include a motor, a transmission system, and/or brakes of the vehicle 110.

For example, the processing apparatus 130 may be configured to access a map data structure storing a map representing locations of physical objects in a geographic area; access a path data structure that includes a sequence of waypoints that each specify a position within the map, wherein a waypoint in the sequence of waypoints includes implement control data for operating the implement 120 at a location corresponding to the position of the waypoint; access motion sensor data captured using the one or more motion sensors 142; determine, based on the motion sensor data, an estimate of a current location of the vehicle 110; control one or more of the actuators 150 to cause the vehicle 110 to move from the current location of the vehicle 110 to the location corresponding to the position of the waypoint; detect, based on the motion sensor data, when the vehicle 110 arrives at the location corresponding to the position of the waypoint; and, responsive to the vehicle 110 arriving at the location corresponding to the position of the waypoint, control one or more of the actuators 150, based on the implement control data of the waypoint, to cause the implement 120 to perform the operation.

For example, the processing apparatus 130 may be configured to access a map data structure storing a map representing locations of physical objects in a geographic area; access current point cloud data captured using the one or more distance sensors 146; detect a crop row based on the current point cloud data; match the detected crop row with a crop row represented in the map; determine an estimate of a current location of the vehicle 110 based on a current position in relation to the detected crop row; and control one or more of the actuators 150 to cause the vehicle to move from the current location of the vehicle 110 to a target location.

For example, the processing apparatus 130 may be configured to receive image data, captured using the one or more image sensors 144, depicting one or more plants in a vicinity of the vehicle 110; detect the one or more plants based on the image data; responsive to detecting the one or more plants, adjust implement control data; and control one or more of the actuators 150, based on the adjusted implement control data, to cause the implement 120 to perform the operation on the one or more plants.

Mapping and Localization

A geographic area (e.g., a farm, a mine, a warehouse, a construction site, or another worksite) may be mapped and the resulting map may be used to control motion of a vehicle and/or operation of an implement connected to the vehicle to perform an operation at a subset of locations in the geographic area. The current position and/or orientation of the vehicle within the mapped area may be determined using a localization process, which may determine an estimate of a current position and/or orientation of the vehicle based on motion sensor data. In some implementations, a localization process may determine an estimate of a current position and/or orientation of the vehicle based on comparison of image data and/or point cloud data captured by sensors connected to the vehicle to corresponding data associated with positions in a map.

Mapping

This section presents three examples of map representations that may be used for localization and navigation as well as three techniques to collect data to create these maps.

A first example of a map representation is a high-resolution three-dimensional point cloud map. This map format may have a sub-centimeter level resolution. It may be created using fusion of data from multiple sensors (e.g., including LiDAR and camera). Sensor configurations may be calibrated to facilitate successful fusion of data from multiple sensors. For example, the calibration may take into account the lens distortion of the camera as well as the relative position of the sensors.

The three-dimensional point cloud map can be built using one or a combination of mapping algorithms. One method is point cloud stitching. One method for point cloud stitching is Iterative Closest Point (ICP). Iterative Closest Point minimizes the difference between two point clouds, a reference point cloud and a source point cloud, by repeatedly transforming the source point cloud, comparing it to the reference point cloud, and selecting the closest transformation. Moving Least Squares (MLS) is another technique for point cloud stitching. This method uses a regression to find the best fit between a reference point cloud and a source point cloud.

The three-dimensional point cloud map may also be created using simultaneous localization and mapping (SLAM) algorithms. These SLAM algorithms also use LiDAR and cameras to build maps of the environment, but they also utilize other sensors to estimate the location and state of the robot. For example, sensors used in SLAM may include wheel encoders, inertial measurement units (IMU), and/or ground speed radar. Two examples of SLAM algorithms that can be used to build these maps include Continuous-Time SLAM and Visual Lidar Odometry and Mapping.

The three-dimensional point cloud map representation can be used for localization, user visualization, or data analysis. The three-dimensional point cloud map representation may be a useful format for user visualization. The point cloud may be converted to a mesh, which may be colorized and viewed in a three-dimensional viewer.

From a data analysis perspective, a three-dimensional point-cloud map could be used for segmentation and classification. The point cloud data may be analyzed to determine the location of trees or other features in a local environment of the vehicle.

This map representation can also be used for localization. This algorithm will be discussed further in the localization section below.

A second example of a map representation is a three-dimensional occupancy grid. An occupancy grid divides a three-dimensional space into equally sized voxels, or three-dimensional cubes. Each of these voxels is given a probability of being occupied between 0 and 1. The occupancy grid is initialized with each cell having an occupancy probability of 0.5. In some implementations, as sensor data is collected, the occupancy probability of each cell may be updated with a Bayes filter. The specific voxel size can vary depending on the desired use case and the input data resolution.

The occupancy grid may be used for path planning and/or localization. When a path is planned, the coordinates of the path can be checked against an occupancy grid to indicate the likelihood of collision to ensure safe paths. The occupancy grid can also be used for localization. This algorithm will be discussed further in the localization section below.

A third example map representation is a feature map. A feature map may consist of the x, y position of features as well as their dimensions. For example, these features could include, but are not limited to, trees, driveable lanes in-between trees, headlands, and vineyard rows. The feature map can be generated using several different methods. First, the feature map could be manually created by a user. In some implementations, a user may use a tool where a georeferenced top-down image of the field-of-interest is displayed. For example, the georeferenced image may come from custom satellite imagery, public datasets, or aerial drone footage. From there, the user can mark identifying features, such as trees or lanes. Secondly, the top-down image could be used to generate feature labels automatically. For example, computer vision and machine learning techniques, such as convolutional neural networks, could be used to identify these features and georeference them.

For example, these map representations can be generated using several techniques, including data collection via manned and autonomous vehicles. These vehicles may include an unmanned ground vehicle, a manned ground vehicle, a teleoperated drone, or an autonomous drone. The map data collection vehicles may be equipped with an array of exteroceptive sensors. For example these exteroceptive sensors could include three-dimensional LiDAR, radar, a single camera, or an array of cameras (e.g., stereo cameras).

Map-Based Localization

This section provides two examples of techniques for a robot to localize itself within the environment based on map data. These localization methods may vary slightly depending on the map representation.

The first example of a map-based localization technique includes of a multi-stage algorithm. First, the proprioceptive sensors may be fused to provide a location estimate and covariance. Examples of algorithms that can be used for this sensor fusion include the Extended Kalman Filter (EKF) and the Unscented Kalman Filter (UKF). Then, N random poses are sampled based on the localization estimate distribution. Then, the measured perception data is compared to expected perception data for the N random poses, and the estimated pose may be based on a linear combination of all the poses and their perception-compared likelihood. The comparison algorithms are discussed further below.

The second example of a map-based localization technique does sensor fusion of the proprioceptive and perception sensors in a single algorithm. An example algorithm is the particle filter, or any Monte Carlo localization method. These algorithms may estimate N possible states of the vehicle. Each state estimate is then updated based on the proprioceptive data acquisition. Then, each state estimate is corrected using the comparison algorithms discussed below.

Both of the examples of map-based localization techniques describe above compare the true/current perception sensor data to the expected perception sensor data. The techniques generate N possible states for the robot (e.g., a vehicle with a mounted implement, such as a tractor with a mounted boom sprayer). For each of these states, the estimated perception data may be determined based on the map representation. This estimated perception data may then be compared to the measured perception data. This comparison may vary based on the map representation. For a three-dimensional point cloud map representation, the measured and estimated perception data may be compared using a difference between the measured point cloud and an expected point cloud. For an occupancy grid representation, the expected sensor measurements (range and bearing) may be compared to the true measured sensor measurements. For a feature map representation, the expected positions of features (e.g., range and bearing to a tree) could be compared to the perceived positions of features.

Path Planning and Navigation

This section describes examples of methods and systems for navigating agricultural environments with GPS, and methods and systems for navigating agricultural environments without a GPS signal, and methods and systems for planning an alternate route around obstacles in a planned path. In some implementations, an autonomous systems may be enabled to follow a manned vehicle using a camera and visual cue. In some implementations, a ground vehicle may be configured to pre-record a path and replay that path. In some implementations, available nodes and edges may be identified in an orchard environment where a robot can determine optimal paths based on varying start and end points. In some implementations, record and report operational coverage in an agricultural field.

An example of a system has two independent modes of path planning and navigation: path pre-learning and path following. In the path pre-learning mode, manual vehicle driving and steering may be used where the system is up for GPS, IMU, and radar speed sensor data capture and Unscented Kalman Filter (UKF) based sensor fusion of GPS based vehicle position, differential vehicle heading, and vehicle speed. In some environments, a single sensor may not be sufficiently reliable for a mobile robot to accurately perceive its current state (e.g., a GPS sensor might lose signal under dense tree canopy environment, or an IMU heading may drift over time), utilization of multiple sensors and fusion of them may provide significant benefits. For example, nonlinear Kalman filter based sensor fusion may be a good technique to fuse multiple sensors for accurate state estimation of a robotic system. The filter may take input of an over-time series of measurements, which may also include stochastic noise and false measures, and outputs estimates that may be more accurate than a single sensor system does. In some implementations, a UKF may be used instead of an Extended Kalman Filter because of its high reliability in propagating uncertainty through the nonlinear system. For example, the UKF may be configured to take absolute x, y positions from the GPS, differential yaw angle from the IMU, and absolute velocity from the radar speed sensor, and provide a filtered odometry that contains corrected x, y positions and heading. An output odometry may be recorded into a system database as a waypoint of a path data structure to be used for later vehicle navigation. In some implementations, a waypoint of the path may also include implement control data that specifies how an implement connected to a vehicle should be operated at a location corresponding to the waypoint.

For example, instead of manual driving and steering the vehicle, the path may be recorded based on high-resolution images based on a two-dimensional or three-dimensional map. This technique may utilize accurate georeferencing of image coordinates to geographic coordinates. The path may be planned by a user manually drawing on the map image and the path may then be extracted automatically using an image processing algorithm. The image based path extraction algorithm detects the starting point of the drawing and trace from the starting point to the end point. Output of this algorithm may be an ordered list of waypoints in the image coordinate system. Based on the georeferencing information in the map, the waypoints are converted to geographic coordinate system accordingly. In some implementations, no filters are applied in drawn path technique.

For example, a technique for automatic generation of paths for different implements and vehicle settings may be used to generate a path data structure. For example, this technique may take inputs of geo-coordinates of a map boundary, starting location, path direction, row width (e.g., in the case of orchard environment), implement parameters (e.g., including implement width, overlapping ratio between implement runs, and specific control for each type of implement, such as, mower needs to raise up at turn or sprayer is off at turn), and vehicle parameters (e.g., including vehicle turning radius and vehicle width). In some implementations, this technique enables a path to be generated without a map image and/or without manual effort by a user to draw a path. For example, the output of this technique may be a full path to do jobs/operations in the field, where waypoints resolution is one foot, as same as of the aforementioned techniques of manual driving of the vehicle and the method of manual drawing the path. In some implementations, no filters are applied in this technique.

For example, in the path following mode, an additional GPS (i.e., an attitude GPS) may be used together with the existing one (i.e., a reference GPS) for accurate heading estimation when the vehicle is stationary. Extending the idea of multiple sensor fusion in the path pre-learning mode, this mode may perform preliminary vehicle moving state and GPS based heading estimation before fusing the two GPS(s), IMU, radar speed sensor, lidar base perception information using UKF. In the vehicle moving state estimation step, GPS based speed (calculated from differential x, y positions) and radar based speed may be cross-validated to find out whether the vehicle is stationary or moving. When the vehicle stays still, a heading of the vehicle may be determined using single positions of the two GPS(s); otherwise, the heading of the vehicle may be determined based on two consecutive positions of the reference GPS. Once the GPS based heading is found, it may be fused together with two GPS positions, IMU yaw, radar based speed, and perception based differential yaw to have a filtered odometry. For example, in a perception-based differential yaw estimation, trees from left and right sides of the vehicle are used as features to determine an estimate of the vehicle heading. When there are no trees detected (e.g., in a non-orchard environment), the perception information may be omitted from the sensor fusion. Based on the waypoints recorded in the path pre-learning mode, the system may search for a waypoint to minimize the distance from the current position to that waypoint and plans a route to it based on the current heading. For example, output of this step may include an angle that the vehicle then uses to steer to the corresponding waypoint autonomously.

While traveling, the vehicle may detect objects on its way using both three-dimensional and two-dimensional sensors. The system may then decide whether to stop, go over obstacles (e.g., based on 100% certainty), or plan an alternate route around obstacles. For example, a sensing algorithm to plan an alternate route may include estimating three-dimensional size of the obstacle, calculating width of the route to travel, validating width of the vehicle to the route width, and keeping track of the obstacle. In the first step, three-dimensional obstacle size may be estimated from the stage of object detection and classification. In some implementations, when the system has insufficient confidence in classification of a detected obstacle, obstacle facial size is the maximum of width and height estimated from both three-dimensional and two-dimensional data, and depth of the obstacle is set at infinity until it is figured out. In some implementations, based on knowledge of tree-row sensing, row width is known and may be used to estimate width of the route to travel. In the case this width is not sufficient for the vehicle to go through, the vehicle may stop to wait for human help where collision alarm is off. In case the width is sufficient, the system may estimate a center line of a travel route and plan a path that is parallel to the upcoming pre-learned path. For example, while moving, the system may keep track of the location and size of the obstacle. The system may continuously update the path on the way and rejoin to the pre-learned path when no more obstacles found in the tracks.

In both path pre-learning and following modes, in-field operations may be attached to waypoints, i.e. when the path is learned parameters of implement controls (e.g., all parameters of the implement controls) may be recorded together with vehicle locations in the field. For example, in the path following mode, waypoints may be tracked and their corresponding implement operations may be executed accordingly. Progress of path following and implement operation may be recorded in the current run and may be recalled in future runs. For example, interrupts between runs may come from system faults, human interference, or stops due to obstacles. The system may be configured to switch to a path restart mode when the system finds that there is an unfinished job. For example, a path restart algorithm may support path planning based on an existing occupancy grid map of tree rows as well as permanent obstacles (e.g. barns, houses, or fences) and a recorded path, and may determine correct vehicle heading to come back to the most recent in-field location recorded from the last run. For example, a shortest path from current vehicle location to the most recent location may be determined using A* search on the map. In some implementations, at every run, operational coverage in a field is reported as local documents which are later automatically uploaded to a central server.

FIG. 2 is flow chart of an example of a process 200 for automatically controlling a vehicle with a mounted implement to perform operations in portions of a geographic area. The process 200 includes accessing 210 motion sensor data captured using one or more motion sensors configured to detect a motion of a vehicle; determining 220, based on the motion sensor data, an estimate of a current location of the vehicle; accessing 230 a map data structure storing a map representing locations of physical objects in a geographic area; accessing 240 a path data structure that includes a sequence of waypoints that each specify a position within the map; controlling 250 one or more actuators to cause the vehicle to move from the current location of the vehicle to the location corresponding to the position of the waypoint; detecting 260, based on the motion sensor data, when the vehicle arrives at the location corresponding to the position of the waypoint; and, responsive to the vehicle arriving at the location corresponding to the position of the waypoint, controlling, based on implement control data associated with the waypoint, the implement to perform an operation. For example, the process 200 may be implemented using the system 100 of FIG. 1.

The process 200 includes accessing 210 motion sensor data captured using one or more motion sensors (e.g., the one or more motions sensors 142) configured to detect a motion of a vehicle (e.g., the vehicle 110). For example, the vehicle may be a tractor, a truck, an all-terrain vehicle, a drone, or a boat. For example, the one or more motion sensors may be connected to the vehicle. For example, the motion sensor data may be accessed 210 by receiving motion sensor data from the one or more motions sensors via a bus (e.g., a controller area network (CAN) bus). In some implementations, the motion sensor data may be accessed 210 via a communications link. For example, the motion sensor data may be accessed 210 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the motion sensor data may be accessed 210 as an input signal, which may represent a position and/or orientation or differential changes in a position and/or orientation in a defined format, such as in three-dimensional coordinates, an acceleration vector, a tuple of angular rates, a set of Euler angles, and/or a quaternion. In some implementations, the motion sensor data may be accessed 210 directly from the one or more motion sensors without intermediate signal processing. In some implementations, the motion sensor data may be accessed 210 after being subjected to intermediate signal processing (e.g., low-pass filtering or Kalman filtering to fuse data from multiple sensors to obtain an estimate of a position and/or orientation). In some implementations, the motion sensor data may be accessed 210 by retrieving the motion sensor data from a memory or other data storage apparatus.

The process 200 includes determining 220, based on the motion sensor data, an estimate of a current location of the vehicle. For example, the motion sensor data may include position data from a global positioning system (GPS) sensor, and the estimate of the current location of the vehicle may be determined 220 as the being equal to a most recent position reflected in the position data from a global positioning system (GPS) sensor. For example, the motion sensor data may include orientation and acceleration measurements from an inertial measurement unit, and the estimate of the current location of the vehicle may be determined 220 based on integration of acceleration measurements to update a position estimate for the vehicle. For example, the motion sensor data may include data from multiple sensors, and the estimate of the current location of the vehicle may be determined 220 using filtering (e.g., an unscented Kalman filter) to fuse motion sensor data from multiple sensors. For example, localization techniques described in the map-based localization section above may be implemented to determine 220, based (at least in part) on the motion sensor data, an estimate of a current location of the vehicle. For example, the process 600 of FIG. 6 may be implemented to determine 220, based (at least in part) on the motion sensor data, an estimate of a current location of the vehicle.

The process 200 includes accessing 230 a map data structure storing a map representing locations of physical objects in a geographic area. For example, the geographic area may include or be part of a farm, a mine, a warehouse, or a construction site. In some implementations, the map data structure includes data representing abstract objects or overlays, such as a representation of a geo-fence. In some implementations, the map data structure stores a three-dimensional model of the geographic area. For example, the map data structure may include point cloud data representing the positions of objects (e.g., trees or other plants, furrows, buildings, fences, and/or shelves) located in the geographic area. For example, the map data structure may include a three-dimensional occupancy grid representing likelihoods that positions corresponding to voxels occupied by an object. For example, the map data structure may include a feature map, including a list of features corresponding to objects with associated locations. In some implementations, the map data structure stores a two-dimensional model of the geographic area. For example, the map data structure may be accessed 230 by receiving map data via a bus. In some implementations, the map data structure may be accessed 230 via a communications link. For example, the map data structure may be accessed 230 via a wireless or wired communications interface (e.g., Wi-Fi, Bluetooth, USB, HDMI, Wireless USB, Near Field Communication (NFC), Ethernet, a radio frequency transceiver, and/or other interfaces) from a map server. In some implementations, the map data structure may be accessed 230 by retrieving the map data from a memory or other data storage apparatus (e.g., memory of the processing apparatus 130 of FIG. 1).

The process 200 includes accessing 240 a path data structure that includes a sequence of waypoints that each specify a position within the map. For example, a waypoint in the sequence of waypoints may include implement control data for operating an implement (e.g., the implement 120) at a location corresponding to the position of the waypoint. For example, the implement may be connected to the vehicle and configured to selectively perform an operation in a vicinity of the vehicle. For example, the sequence of waypoints may specify a desired path for the vehicle and may also specify how the mounted implement is to be used at various locations along the path. For example, the implement control data may specify how much of an input (e.g., water, fertilizer, or a pesticide) should be deposited at a location corresponding to the waypoint. For example, the implement control data may specify how much of an input (e.g., water, fertilizer, or a pesticide) should be deposited (e.g., using a sprayer or spreader) at a location corresponding to the waypoint. For example, the implement control data may specify a depth for a plow that is pulled through a location corresponding to the waypoint. In some implementations, the sequence of waypoints are regularly spaced along the desired path (e.g., one waypoint every foot along the path). For example, the path data structure may include an array or a linked list of waypoint records representing respective waypoints in the sequence of waypoints. For example, a record for a waypoint may be stored in the format of the waypoint record 1010 of FIG. 10. For example, the path data structure may have been generated using the process 300 of FIG. 3. For example, the path data structure may have been generated using the process 400 of FIG. 4. For example, the path data structure may have been generated using the process 500 of FIG. 5. In some implementations, only changes in the implement control data are stored with associated waypoints. For example, a first set of implement control data stored with waypoint A may apply to waypoint A and all subsequent waypoints in the sequence of waypoints of the path that lack associated implement control data until another waypoint with a second set of implement control data occurs.

The process 200 includes controlling 250 one or more actuators (e.g., the actuators 150) to cause the vehicle to move from the current location of the vehicle to the location corresponding to the position of the waypoint. In some implementations, the one or more actuators may be controlled to engage parts of a manual control interface (e.g., the manual control interface 112) of the vehicle to cause the vehicle to move to the next waypoint on the path). For example, a turning angle may be determined based on the estimate of current location of the vehicle, the location of the waypoint, and an estimate of a current orientation of the vehicle. The turning angle may be used control 250 the one or more actuators to turn a steering wheel of the vehicle. For example, the one or more actuators may be controlled 250 to pull down an accelerator pedal of the vehicle to cause the vehicle to be moved forward. In some implementations, the one or more actuators may bypass a manual control interface of the vehicle (e.g., using a controller area network (CAN) bus).

The process 200 includes detecting 260, based on the motion sensor data, when the vehicle arrives at the location corresponding to the position of the waypoint. For example, an estimate of the current location of the vehicle may be updated based on the motion sensor data as the vehicle is moves toward the waypoint, and the estimate of the current location may be compared to the position of the waypoint to detect 260 when the vehicle arrives at the location corresponding to the position of the waypoint. For example, localization techniques described in the map-based localization section above may be implemented to detect 260, based (at least in part) on the motion sensor data, when the vehicle arrives at the location corresponding to the position of the waypoint.

The process 200 includes, responsive to the vehicle arriving at the location corresponding to the position of the waypoint, controlling 270, based on the implement control data of the waypoint, the implement (e.g., the implement 120) to perform an operation. In some implementations, the implement is configured to selectively deposit input (e.g., water, fertilizer, or pesticide) in a vicinity of the vehicle, and, responsive to the vehicle arriving at the location corresponding to the position of the waypoint, the implement is controlled 270, based on the implement control data of the waypoint, to deposit an input in a vicinity of the vehicle. For example, the vehicle may be a tractor and the implement may be a sprayer (e.g., a boom sprayer). For example, the vehicle may be a tractor and the implement may be a tillage implement (e.g., a plow). For example, the implement control data may specify an amount of input to be deposited (e.g., sprayed or spread) at the location corresponding to the waypoint. In some implementations, the implement is configured to selectively collect output (e.g., a crop such as apples, grapes, or tomatoes) in a vicinity of the vehicle, and, responsive to the vehicle arriving at the location corresponding to the position of the waypoint, the implement is controlled 270, based on the implement control data of the waypoint, to collect an output in a vicinity of the vehicle. For example, the implement control data may indicate whether output will be collected (e.g., using a harvester implement) at the location corresponding to the waypoint. In some implementations, the process 900 of FIG. 9 may be implemented to dynamically adjust, based on current image sensor data (e.g., including normalized difference vegetation index data for plants near the waypoint), implement control data for the waypoint, and use the dynamically adjusted implement control data to control 270 the implement (e.g., the implement 120) to perform the operation.

Figure 3:
FIG. 3 is flow chart of an example of a process for generating a path data structure based on localization data collected during a demonstration run.

FIG. 3 is flow chart of an example of a process 300 for generating a path data structure based on localization data collected during a demonstration run. The process 300 includes determining 310 localization data based on motion data from one or more motion sensors collected while a user manually controls the vehicle and the implement; recording 320 implement control data associated with positions in the localization data; and generating 330 the path data structure based on the localization data and the associated implement control data. For example, the process 300 may be implemented using the system 100 of FIG. 1.

The process 300 includes determining 310 localization data based on motion data from the one or more motion sensors collected while a user manually controls the vehicle and the implement. For example, the localization data may include a sequence of positions within a map of a geographic area (e.g., a farm, a mine, a warehouse, or a construction site). For example, the motion sensor data may include position data from a global positioning system (GPS) sensor, and the localization data may be determined 310 based on this position data. For example, the motion sensor data may include orientation and acceleration measurements from an inertial measurement unit, and localization data may be determined 310 based on integration of acceleration measurements to update a position estimate for the vehicle. For example, the motion sensor data may include data from multiple sensors, and the localization data may be determined 310 using filtering (e.g., an unscented Kalman filter) to fuse motion sensor data from multiple sensors. For example, localization techniques described in the map-based localization section above may be implemented to determine 310, based (at least in part) on the motion sensor data, the localization data for the vehicle.

The process 300 includes recording 320 implement control data associated with positions in the localization data. For example, implement control data may specify control signals manually applied (e.g., using a manual control interface) to the implement (e.g., the implement 120) by user while the vehicle was at a location associated with a position in the localization data. This implement control data may be recorded 320 in a manner that associates the implement control data with one or more corresponding positions in the localization data. For example, the implement control data and the localization data may be time synchronized (e.g., using time stamps with a common time base or by running a phase locked loop to synchronize the positions of the localization data with implement control data).

The process 300 includes generating 330 the path data structure based on the localization data and the associated implement control data. For example, the path may include a sequence of waypoints that are represented by corresponding waypoint records of the path data structure. In some implementations, waypoints of the path are regularly spaced along the path and the positions of the waypoints are selected from among the positions in the localization data to achieve this spacing. A waypoint record may be generated 330 for each waypoint of the path. The waypoint records may include coordinates of a selected position in the localization data. A waypoint record may also include implement control data that has been associated (e.g., using time synchronization) with the position in the localization data of the waypoint. For example, the generated 330 path data structure may include the waypoint record 1010 of FIG. 10. For example, the generated 330 path data structure may be stored in a memory of the processing apparatus 130 of FIG. 1.

FIG. 4 is flow chart of an example of a process 400 for generating a path data structure based on a drawing on a map. The process 400 includes presenting 410 the map to a user in a user interface that enables the user to draw a path for the vehicle on the map; receiving 420 data specifying the drawn path; and generating 430 the path data structure based on the drawn path. For example, the process 400 may be implemented using the system 100 of FIG. 1. For example, the process 400 may be implemented using a personal computing device (e.g., a smartphone, a tablet, a laptop, or a desktop computer).

The process 400 includes presenting 410 the map to a user in a user interface (e.g., a webpage) that enables the user to draw a path for the vehicle on the map. For example, the map may be presented 410 as an image. In some implementations, the map may be presented 410 as an image reflecting a two-dimensional projection or slice (e.g., a birds-eye-view) of a three-dimensional map (e.g., a map including point cloud data). For example, a processing apparatus may present 410 the map by displaying the user interface using a locally connected display device (e.g., a touchscreen). In some implementations, a processing apparatus may present 410 the map by transmitting (e.g., via a wireless network) data encoding the user interface (e.g., a webpage) to a user, who may receive, view, and interact with the map using a personal computing device.

The process 400 includes receiving 420 data specifying the drawn path. For example, the path may be drawn (e.g., using a touchscreen or a mouse) on an image representation of the map in the user interface (e.g., a webpage). For example, data specifying the drawn path may include a sequence coordinates within the presented 410 map. For example, the user may also associate implement control data with points along the drawn path (e.g., using a color coding scheme with a drop-down menu to select an implement control setting with an associated color). In some implementations, the data specifying the path is received 420 via a bus. In some implementations, the data specifying the path is received 420 via a wireless network (e.g., a WiFi network or a cellular data network).

The process 400 includes generating 430 the path data structure based on the drawn path. For example, the path may include a sequence of waypoints that are represented by corresponding waypoint records of the path data structure. In some implementations, waypoints of the path are regularly spaced along the path and the positions of the waypoints are selected from among the positions in the data specifying the drawn path data to achieve this spacing. A waypoint record may be generated 430 for each waypoint of the path. The waypoint records may include coordinates of a selected position in the data specifying the drawn path. A waypoint record may also include implement control data that has been associated (e.g., using color coding) with the position in the data specifying drawn path of the waypoint. For example, the generated 430 path data structure may include the waypoint record 1010 of FIG. 10. For example, the generated 430 path data structure may be stored in a memory of the processing apparatus 130 of FIG. 1.

FIG. 5 is flow chart of an example of a process 500 for generating a path data structure based on a boundary and a coverage objective. The process 500 includes receiving 510 boundary data specifying an area within the map; receiving 520 data specifying parameters of the vehicle and/or the implement; and generating 530 the path data structure based on the map and the boundary data. For example, the process 500 may be implemented using the system 100 of FIG. 1. For example, the process 500 may be implemented using a personal computing device (e.g., a smartphone, a tablet, a laptop, or a desktop computer).

The process 500 includes receiving 510 boundary data specifying an area within a map. For example, the boundary data may include a sequence of vertices of a polygon (e.g., a rectangle or hexagon) corresponding to the area in a two-dimensional representation of the map. In some implementations, the polygon may be specified in a plane of a two-dimensional slice or projection of a three-dimensional map. In some implementations, a user may utilize a user interface, similar to the user interfaces described in relation to FIG. 4, draw the boundary of the area on a presented representation of the map. In some implementations, the boundary data specifying the area is received 510 via a bus.

In some implementations, the boundary data specifying the area is received 510 via a wireless network (e.g., a WiFi network or a cellular data network).

The process 500 includes receiving 520 data specifying parameters of a vehicle (e.g., the vehicle 110) and/or an implement (e.g., the implement 120). For example, the received 520 parameters of the vehicle may include the width of the vehicle and/or a turning radius of the vehicle. For example, the received 520 parameters of the implement may include an implement width, an overlapping ratio between implement runs, and specific control for each type of implement, such as, mower needs to raise up at turn or sprayer is off at turns. In some implementations, the data specifying parameters of the vehicle and/or the implement is received 520 via a bus (e.g., from an input/output peripheral or from a local memory). In some implementations, the data specifying parameters of the vehicle and/or the implement is received 520 via a wireless network (e.g., a WiFi network or a cellular data network).

The process 500 includes generating 530 the path data structure based on the map and the boundary data. For example, the path may include a sequence of waypoints that are represented by corresponding waypoint records of the path data structure. In some implementations, waypoints of the path are regularly spaced along the path and the positions of the waypoints are selected from among the positions in the area to achieve this spacing and coverage objective for the area. For example, a coverage objective may be to completely cover the area using the implement. For example, a coverage objective may be traverse all crop rows within the area that are represented in the map. For example, dynamic programming or another optimization algorithm may be implemented to generate 530 the path as a sequence of waypoints to achieve the coverage objective subject to additional constraints, including constraints based on the data specifying the parameters of the vehicle (e.g., turning radius) and the implement (e.g., implement width). A waypoint record may be generated 530 for each waypoint of the path. The waypoint records may include coordinates of a selected position in the area. A waypoint record may also include implement control data associated with the position in the area of the waypoint, which may be inferred based on map data for the position and the objective. For example, the generated 530 path data structure may include the waypoint record 1010 of FIG. 10. For example, the generated 530 path data structure may be stored in a memory of the processing apparatus 130 of FIG. 1.

In some implementations, control data or instructions for an implement (e.g., a sprayer or a plow) attached to a vehicle (e.g., a tractor) are associated with discrete waypoints (e.g., GPS waypoints) along a programmed path for the vehicle. In some implementations, control data or instructions for an implement may be integrating into a map in a map layer covering an operational area. For example, such a map layer might include different zones drawn by a user which would trigger different implement controls. For example, a particular region of crop might be affected by disease and require a certain prescription of pesticide. In this example scenario, an affected zone might be drawn or selected in a map layer and used to precisely apply pesticide via a tractor-pulled sprayer on the ground only in the affected zone. In some implementations, a map layer may associate stationary features on the map to a set of instructions or prescriptions for an implement. For example, the trees in a map of an orchard might be classified and tagged such that when the vehicle observes or is within a certain vicinity of the feature, the implement will operate per the prescription associated with those features in the map layer. With this technique, implement control instructions can be assigned on a per-plant level and can follow a time and/or event-based model. Some techniques may differ from the path-based implement controls in that the path for the vehicle and navigation is not linked directly to the implement control. Instead the vehicle may recognize features (e.g., plants) as it navigates and control a connected implement accordingly based on those features perceived.

Classification of Environmental Landmarks and Obstacles

This section describes examples of methods and systems for real-time classification of trees and vegetation using point cloud data. In some implementations, dense lidar data may be filtered to classify trees in an orchard to reduce computation requirements on a vehicle. In some implementations, trees are classified based on image data from a camera. In some implementations, lanes in-between trees may be identified. In some implementations, obstacles in a planned path may be identified using a lidar sensor and a camera. In some implementations, obstacles are detected, and notification is relayed via video feed to a user interface.

This section presents two major examples of techniques to detect environmental landmarks for vehicle navigation and/or to classify on-the-way obstacles so that the vehicle is able to automatically respond accordingly. The first technique is based on three-dimensional point cloud input which is captured using a lidar sensor to detect trees along traveling direction. For example, the point cloud may include thousands of x, y, z points that represent forward/backward, left/right, and up/down sensing directions with respect to where the sensor is located, respectively. In some implementations, the point cloud is programmatically cropped to an x, y, z range to fit to dynamic movement of the vehicle. This cropping may serve to eliminate or mitigate environmental noise (e.g., human or non-tree objects in unnecessarily out-of-observation areas in the field) as well as to increase processing performance. For example, trees may be presumably considered individual clusters of points in the point cloud. For example, trees may be detected using a three-dimensional point cloud based Euclidean cluster extraction algorithm. For example, a clustering algorithm may make use of a three-dimensional fixed-width box based octree data structure to fast search nearest point neighbors for congregation purpose. In some implementations, this algorithm is executed in a defined z range chosen to detect tree trunks exclusively. For example, tree trunks, rather than tree canopies, may be considered environmental landmarks because of their much less complex structure which may lead to better detection results and faster processing time for real-time vehicle navigation.

The second major example of a technique for classification of obstacles is based on both three-dimensional point cloud and two-dimensional color image data. The three-dimensional data may be used to quickly detect whether there is an obstacle on the way and act safely as it takes a certain amount of time for the vehicle to fully stop. The three-dimensional based obstacle detection technique may be fundamentally based on the aforementioned Euclidean cluster extraction algorithm, but it may aim for objects right in front of the vehicle instead. As it takes time to recognize exactly what an obstacle is, the two-dimensional color image based method may run in a parallel manner to the three-dimensional based one. Once the object is identified with an estimated three-dimensional size using a neural network based real-time object detection algorithm, the vehicle may be programmed to stop completely for the objects like rocks, human, trees, fences, or other vehicles, or go over the unharmed and non-dangerous objects like grass, weeds, dust, or hays. The recognition system may be designed for a high rate of safety so when there is uncertainty of object classification (e.g., the object needs to be recognized with 100% confidence or above a certain predetermined threshold level of confidence), the vehicle may be stopped or planned to follow a path that goes around the object. Both three-dimensional and two-dimensional techniques may incorporate wheel turning angle to vehicle traveling direction for precise detection of in-front objects.

For example, the two-dimensional image based technique may also be used to detect trees, in the same manner as detecting on-the-way obstacles, to incorporate to the three-dimensional point cloud based environmental landmarks recognition and to improve robustness of tree-row detection. The incorporation of the two sensors may improve performance of an object sensing system because the three-dimensional sensor alone may be confused by crooked tree trunks as well as complex tree canopy structures (e.g., tree canopy covers tree trunk) and the two-dimensional sensor alone may lack distance-to-sensor knowledge of the environment. For example, precise calibration of the three-dimensional lidar sensor and two-dimensional color camera may be performed such that each three-dimensional point can be accessed together with its color information, which is significantly helpful for integration of three-dimensional clustering algorithm and neural network learning based object recognition. In some implementations, an object sensing system is based on the motion estimated by odometry fusion of both sensors, which may support targetless and automatic calibration, also called in-run calibration. This technique may be particularly useful for high vibrational environment like a tractor.

FIG. 6 is flow chart of an example of a process 600 for automated localization of a vehicle in an agricultural environment. The process 600 includes accessing 610 current point cloud data captured using a distance sensor connected to a vehicle; detecting 620 a crop row based on the current point cloud data; accessing 630 a map data structure storing a map representing locations of physical objects in a geographic area; matching 640 the detected crop row with a crop row represented in the map; determining 650 an estimate of a current location of the vehicle based on a current position in relation to the detected crop row; and controlling 660 one or more actuators to cause the vehicle to move from the current location of the vehicle to a target location. For example, the process 600 may be implemented using the system 100 of FIG. 1.

The process 600 includes accessing 610 current point cloud data captured using a distance sensor (e.g., the one or more distance sensors 146) connected to a vehicle (e.g., the vehicle 110). For example, the vehicle may be a tractor, a truck, an all-terrain vehicle, a drone, or a boat. For example, the current point cloud data may be accessed 610 by receiving point cloud data from the distance sensor via a bus (e.g., a controller area network (CAN) bus). In some implementations, the current point cloud data may be accessed 610 via a communications link. For example, the current point cloud data may be accessed 610 via a wireless or wired communications interface (e.g., Wi-Fi, Bluetooth, USB, HDMI, Wireless USB, Near Field Communication (NFC), Ethernet, a radio frequency transceiver, and/or other interfaces). For example, current point cloud data may be accessed 610 as an input signal, which may represent time of flight data for light projected at a given angle from the distance sensor and received as a reflection. In some implementations, the current point cloud data may be accessed 610 directly from the distance sensor without intermediate signal processing. In some implementations, the current point cloud data may be accessed 610 after being subjected to intermediate signal processing (e.g., low-pass filtering or conversion to a three-dimensional occupancy grid). In some implementations, the current point cloud data may be accessed 610 by retrieving the current point cloud data from a memory or other data storage apparatus.

The process includes detecting 620 a crop row based on the current point cloud data. For example, detecting 620 a crop row may include performing Euclidean cluster extraction, least squares fitting of plant (e.g. tree) locations, outlier tree removal, and/or associating detected plants in a crop row. For example, the crop row may be a row of trees. For example, the crop row may be a row of vines (e.g. grape vines).

The process includes accessing 630 a map data structure storing a map representing locations of physical objects in a geographic area. For example, the geographic area may include or be part of a farm, a mine, a warehouse, or a construction site. In some implementations, the map data structure stores a three-dimensional model of the geographic area. For example, the map data structure may include point cloud data representing the positions of objects (e.g., trees or other plants, furrows, buildings, fences, and/or shelves) located in the geographic area. For example, the map data structure may include a three-dimensional occupancy grid representing likelihoods that positions corresponding to voxels occupied by an object. For example, the map data structure may be accessed 630 by receiving map data via a bus. In some implementations, the map data structure may be accessed 630 via a communications link. For example, the map data structure may be accessed 630 via a wireless or wired communications interface (e.g., Wi-Fi, Bluetooth, USB, HDMI, Wireless USB, Near Field Communication (NFC), Ethernet, a radio frequency transceiver, and/or other interfaces) from a map server. In some implementations, the map data structure may be accessed 630 by retrieving the map data from a memory or other data storage apparatus (e.g., memory of the processing apparatus 130 of FIG. 1).

The process 600 includes matching 640 the detected crop row with a crop row represented in the map. For example, matching 640 the detected crop row with a crop row represented in the map may include comparing the current point cloud data corresponding to the detected row to expected point cloud data for nearby crop rows represented in the map. In some implementations, matching 640 the detected crop row with a crop row represented in the map may include determining cross-correlations of an occupancy grid based on the current point cloud with occupancy grid based map data reflecting the presence of one or more nearby crop rows in the map data. For example, a crop row from the map data that maximizes the cross-correlation may be identified as the detected crop row and used for georeferencing the detected crop row. In some implementations, N candidate states (e.g., position and orientation or pose) for the vehicle with a mounted implement (e.g., a tractor with a mounted boom sprayer) are selected and an expected point cloud data for each candidate state is determined based on the map data. This expected point cloud data may then be compared to the current point cloud data. For example, the comparison may include determining a difference between the current point cloud and the expected point cloud of a candidate state. For example, the detected crop row may be matched 640 with a crop row represented in the map by finding a candidate pose with a low value of this difference of the current point cloud and the expected point cloud and identifying the corresponding crop row of the map based on the selected candidate pose and current point cloud data.

The process 600 includes determining 650 an estimate of a current location of the vehicle based on a current position in relation to the detected crop row. For example, the detected 620 crop row may be georeferenced based on the matched 640 crop row represented in the map, and the estimate of the current location of the vehicle may in turn be determined 650 based on a relative position (e.g., derived directly from the point cloud data from the distance sensor) of the vehicle to the georeferenced detected 620 crop row. For example, localization techniques described in the map-based localization section above may be implemented to determine 650, based (at least in part) on a current position in relation to the detected crop row, an estimate of a current location of the vehicle. In some implementations, the process 800 of FIG. 8 may be implemented to determine the estimate of the current location of the vehicle based on a furrow detected in the current point cloud data. For example an estimate of the current position of the vehicle may be determined as an average (e.g., a weighted average) of an estimate based on a detected crop row and an estimate based on a detected furrow.

The process 600 includes controlling 660 one or more actuators (e.g., the actuators 150) to cause the vehicle to move from the current location of the vehicle to a target location (e.g., a next waypoint in a path). In some implementations, the one or more actuators may be controlled to engage parts of a manual control interface (e.g., the manual control interface 112) of the vehicle to cause the vehicle to move to the target location. For example, a turning angle may be determined based on the estimate of current location of the vehicle, the location of the target location, and an estimate of a current orientation of the vehicle. The turning angle may be used control 660 the one or more actuators to turn a steering wheel of the vehicle. For example, the one or more actuators may be controlled 660 to pull down an accelerator pedal of the vehicle to cause the vehicle to be moved forward. In some implementations, the one or more actuators may bypass a manual control interface of the vehicle (e.g., using a controller area network (CAN) bus).

Figure 7:
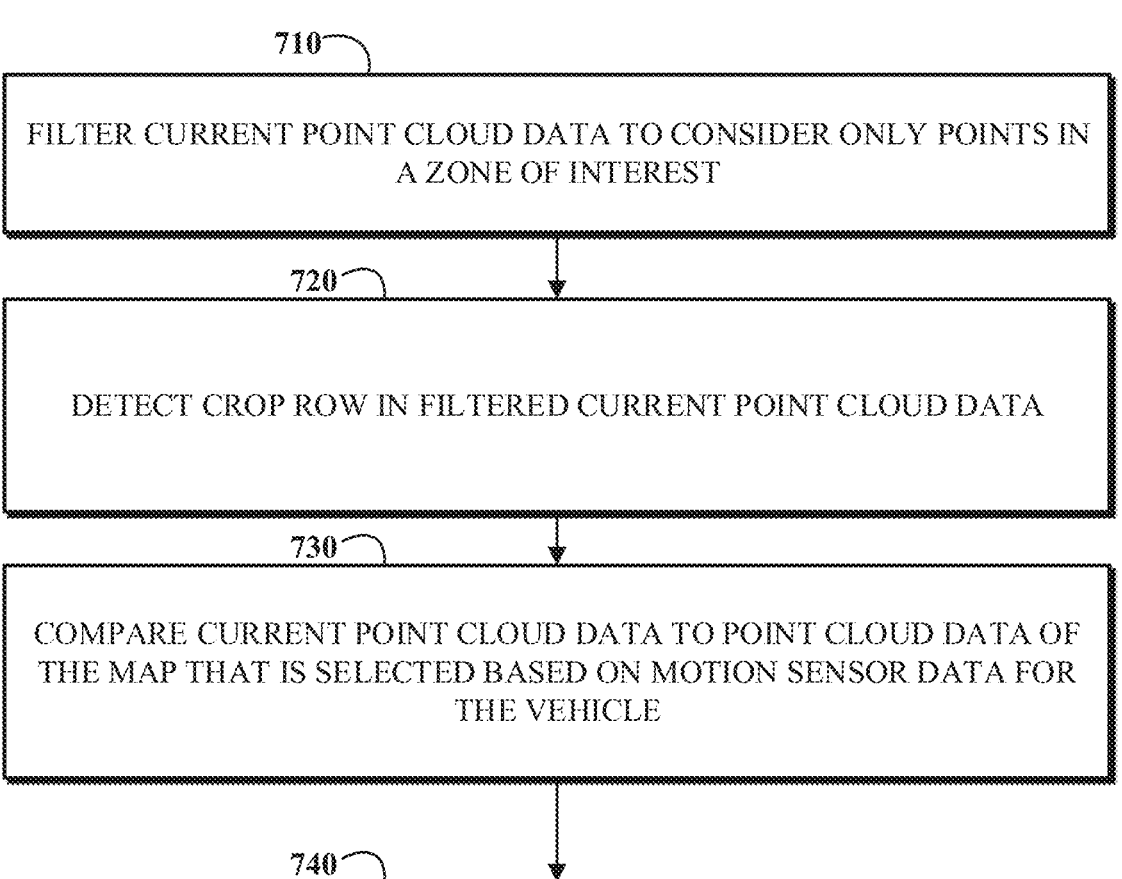
FIG. 7 is flow chart of an example of a process for filtering point cloud data from an agricultural environment for localization analysis.

In some implementations, the filtering 710 techniques described in relation to FIG. 7 may be applied to the current point cloud data to simplify the operations of detecting 620 and/or matching 640 the detected crop row to crop row in the map.

FIG. 7 is flow chart of an example of a process 700 for filtering point cloud data from an agricultural environment for localization analysis. The process 700 includes filtering 710 the current point cloud data to consider only points in a zone of interest; detect 720 a drop row in the filtered current point cloud data; comparing 730 the current point cloud data to point cloud data of the map that is selected based on the motion sensor data; and match 740 the detected 720 crop row to a crop row in the map based on the comparisons of point cloud data. For example, the process 700 may be implemented using the system 100 of FIG. 1.

The process 700 includes filtering 710 the current point cloud data to consider only points in a zone of interest when comparing the current point cloud data to point cloud data of the map. For example, filtering 710 the point cloud data may include cropping the point cloud data to the zone of interest. For example, the zone of interest may limited to a range of heights (e.g., from 1 foot above the ground to 4 feet above the ground) and a maximum distance (e.g., 10 meters or 20 meters) from the vehicle. In some implementations, the current point cloud data is filtered 710 to consider only points in the zone of interest when comparing 730 the current point cloud data to point cloud data of the map to match 740 the detected crop row with the crop row represented in the map. In some implementations, the zone of interest may be selected to focus on the trunks of trees, instead of the canopies of the trees. The filtering 710 of the point cloud data may reduce noise and reduce computational complexity of operations to detect 720 crop rows and match 740 them to crop rows represented in a map.

The process 700 includes detecting 720 a crop row based on the filtered current point cloud data. For example, detecting 720 a crop row may include performing Euclidean cluster extraction, least squares fitting of plant (e.g. tree) locations, outlier tree removal, and/or associating detected plants in a crop row. For example, the crop row may be a row of trees. For example, the crop row may be a row of vines (e.g. grape vines).

The process 700 includes comparing 730 the current point cloud data to point cloud data of the map that is selected based on motion sensor data. For example, the motion sensor data may have been captured using one or more motion sensors (e.g., the one or more motion sensors 142) that are connected to the vehicle. For example, of a map-based localization technique may include of a multi-stage algorithm. First, proprioceptive sensors, including the one or more motion sensors, may be fused to provide a location estimate and covariance. Examples of algorithms that can be used for this sensor fusion include the Extended Kalman Filter (EKF) and the Unscented Kalman Filter (UKF). Then, N random poses may be sampled based on the localization estimate distribution. Then, the measured perception data may be compared 730 to expected perception data from the map for the N random poses. For example, for each of these N random poses, the estimated perception data may be determined based on the map representation. This estimated perception data may then be compared to the measured perception data. For example, measured and estimated perception data may be compared using a difference between the measured point cloud and the expected point cloud.

The process 700 includes matching 740 the detected 720 crop row to a crop row in the map based on the comparisons of point cloud data. For example, the detected crop row may be matched 740 with a crop row represented in the map by finding a candidate pose with a low value of a difference of the current point cloud and its expected point cloud and identifying the corresponding crop row of the map based on the selected candidate pose and current point cloud data. For example, an estimate of the current location of the vehicle may then be determined based on the comparison of the current point cloud data to point cloud data of the map (e.g., by georeferencing the detected 720 and matched 740 crop row in the current point cloud data.

FIG. 8 is flow chart of an example of a process 800 for localizing a vehicle in an agricultural environment. The process 800 includes detecting 810 a furrow in the ground based on current point cloud data; matching 820 the detected furrow with a furrow represented in the map; and determining 830 an estimate of the current location of the vehicle based on a current position in relation to the detected furrow. For example, the process 800 may be implemented using the system 100 of FIG. 1.

The process 800 includes detecting 810 a furrow in the ground based on the current point cloud data. For example, the furrow may be long trench in the ground between crop rows (e.g., formed by wheels of a tractor). For example, detecting 810 the crop row may include performing Euclidean cluster extraction.

The process 800 includes matching 820 the detected furrow with a furrow represented in the map. For example, matching 820 the detected furrow with a furrow represented in the map may include comparing the current point cloud data corresponding to the detected furrow to expected point cloud data for nearby furrows represented in the map. In some implementations, matching 820 the detected furrow with a furrow represented in the map may include determining cross-correlations of an occupancy grid based on the current point cloud with occupancy grid based map data reflecting the presence of one or more nearby furrows in the map data. For example, a furrow from the map data that maximizes the cross-correlation may be identified as the detected furrow and used for georeferencing the detected furrow. In some implementations, N candidate states (e.g., position and orientation or pose) for the vehicle with a mounted implement (e.g., a tractor with a mounted boom sprayer) are selected and an expected point cloud data for each candidate state is determined based on the map data. This expected point cloud data may then be compared to the current point cloud data. For example, the comparison may include determining a difference between the current point cloud and the expected point cloud of a candidate state. For example, the detected furrow may be matched 820 with a furrow represented in the map by finding a candidate pose with a low value of this difference of the current point cloud and the expected point cloud and identifying the corresponding furrow of the map based on the selected candidate pose and current point cloud data.

The process 800 includes determining 830 the estimate of the current location of the vehicle based on a current position in relation to the detected furrow. For example, the detected 810 furrow may be georeferenced based on the matched 820 furrow represented in the map, and the estimate of the current location of the vehicle may in turn be determined 830 based on a relative position (e.g., derived directly from the point cloud data from the distance sensor) of the vehicle to the georeferenced detected 810 furrow. For example, localization techniques described in the map-based localization section above may be implemented to determine 830, based (at least in part) on a current position in relation to the detected furrow, an estimate of a current location of the vehicle.

Smart Implement Control

Implement control may be handled by the control systems described elsewhere in this document. Here, smart implement control refers to modifying the standard implement behavior because of inputs from the sensing system from a baseline system performance. This may include using any or all sensors described as potentially part of the system. Smart implement control functionality may allow sensor data to be fused with crop models (described in the crop models section) to modify implement behavior, which may save time or inputs on jobs and thereby increase efficiency.

In some implementations, a system (e.g., the system 100 of FIG. 1) can also be used to forecast new required jobs based on crop performance. In this way the system allows users to increase yield by tending better to land under cultivation.

Some examples of types of ways system could be used are as follows.

For example, an autonomous spraying system that utilizes front and/or side facing sensors to detect the presence and physical profile of trees and vegetation that individually controls nozzles to direct a range of spray. In some implementations, a spray rig; which could include a boom sprayer, air blast sprayer, or self-propelled sprayer; would be retrofitted with individual control nozzles, allowing for variable rate and autonomous spraying. For example, perception system (e.g., including the sensors 140) on a tractor identifies the target spray area and only activates nozzles which spray said area thus reducing the total amount of spray applied. Additionally, using the vehicle speed and vegetation tracking via the perception system, input flow rate through the nozzles can be adjusted to precisely apply and adjust the necessary amount of input as a function of the vehicles motion and position in a geographic region (e.g., a farm field).

For example, a camera (e.g., multispectral, hyperspectral, and/or standard) and machine learning may be used for crop identification, disease detection, crop counting, and yield estimation.

FIG. 9 is flow chart of an example of a process 900 for dynamically adjusting implement control for an implement connected to a vehicle in an agricultural environment. The process 900 includes receiving 910 image data, captured using one or more image sensors connected to a vehicle, depicting one or more plants in a vicinity of the vehicle; detecting 920 the one or more plants based on the image data; responsive to detecting the one or more plants, adjusting 930 implement control data; and controlling 940, based on the adjusted implement control data, an implement connected to the vehicle to perform an operation on the one or more plants. For example, the process 800 may be implemented using the system 100 of FIG. 1.

The process 900 includes receiving 910 image data, captured using one or more image sensors (e.g., the one or more image sensors 144) connected to a vehicle (e.g., the vehicle 110), depicting one or more plants in a vicinity of the vehicle. For example, plants may include trees (e.g., apple trees, lemon trees, or cherry trees), vines (e.g., grape vines), or other plants (e.g., tomato plants, potato plants, or squash plants). In some implementations, the one or more images sensors may be configured to capture light in bands of the spectrum corresponding to plant vitality. For example, the one or more image sensors may include a normalized difference vegetation index camera connected to the vehicle. In some implementations, receiving 910 the image data includes receiving 910 normalized difference vegetation index data, captured using the normalized difference vegetation index camera, for the one or more plants. For example, the image data may include RGB images and/or normalized difference vegetation index data. For example, the image data may be received 910 from the one or more image sensors via a bus (e.g., a controller area network (CAN) bus). In some implementations, the image data may be received 910 via a communications link. For example, the image data may be received 910 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image data may be received 910 as an input signal, which may represent each pixel value in a defined format, such as in a RAW image format or a YUV image format. In some implementations, the image data may be received 910 directly from the one or more image sensors without intermediate signal processing. In some implementations, the image data may be received 910 after being subjected to intermediate signal processing (e.g., low-pass filtering, lens distortion correction, spatial noise reduction and/or temporal noise reduction).

The process 900 includes detecting 920 the one or more plants based on the image data. For example, computer vision processing (e.g., using a convolutional neural network) may be implemented to detect and/or classify the one or more plants. In some implementations, point cloud data from a distance sensor (e.g., a lidar sensor) may also be used to help detect and/or classify the one or more plants.

The process 900 includes, responsive to detecting the one or more plants, adjusting 930 implement control data. For example, the implement control data that is adjusted 930 may be accessed in a waypoint record of a path data structure (e.g., the waypoint record 1010). In some implementations, adjusting 930 the implement control data includes adjusting an amount of input (e.g., water, fertilizer, or pesticide) to be deposited on the one or more plants based on the normalized difference vegetation index data. For example, an amount of input scheduled for deposit (e.g., spraying spreading, or planting) in vicinity of the vehicle (e.g. near a waypoint of a path) may be increased when difference vegetation index data for the one or plants in the vicinity indicate the one or plants are already struggling. For example, an amount of input scheduled for deposit (e.g., spraying spreading, or planting) in vicinity of the vehicle (e.g. near a waypoint of a path) may be decreased when difference vegetation index data for the one or plants in the vicinity indicate the one or plants are already thriving. In some implementations, adjusting 930 the implement control data includes adjusting an amount of input (e.g., water, fertilizer, or pesticide) to be deposited on the one or more plants based on a count of plants in the vicinity of the vehicle. In some implementations, the implement control data may be adjusted 930 based on a count of the one or more plants detected 920 in the vicinity of the vehicle. In some implementations, the implement control data may be adjusted 930 to focus an operation (e.g., depositing input) on the one or more plants within the vicinity. In some implementations, the implement (e.g., a harvester) is configured to selectively collect output (e.g., crops such as apples, grapes, or tomatoes) in a vicinity of the vehicle.

The process 900 includes controlling 940, based on the adjusted implement control data, an implement connected to the vehicle to perform an operation on the one or more plants. For example, the process 900 may include controlling 940, based on the adjusted implement control data, the implement to deposit an input (e.g., water, fertilizer, or pesticide) on the one or more plants. For example, the process 900 may include controlling 940, based on the adjusted implement control data, the implement to collect an output (e.g., apples, grapes, or tomatoes) from the one or more plants. For example, the vehicle may be a tractor and the implement may be a boom sprayer.

Figure 10:
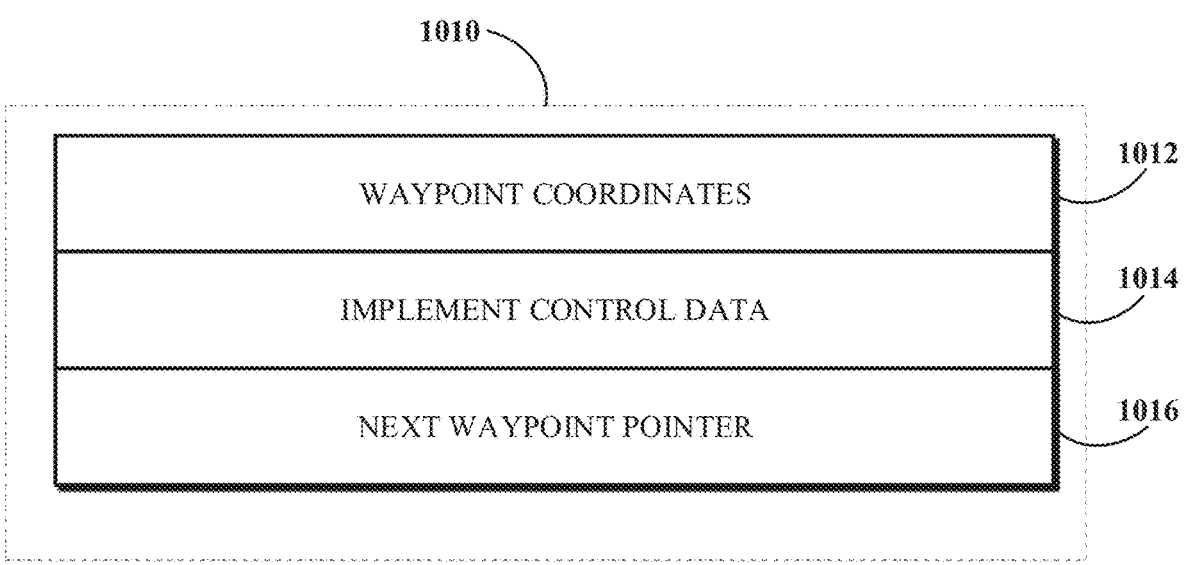
FIG. 10 is a memory map showing an example format for a waypoint record of a path data structure that may be used to facilitate automatic control of a vehicle with a mounted implement to perform operations in portions of a geographic area.

FIG. 10 is a memory map showing an example format for a waypoint record 1010 of a path data structure that may be used to facilitate automatic control of a vehicle with a mounted implement to perform operations in portions of a geographic area. The waypoint record 1010 stores data concerning a waypoint that is one of a series if waypoints in a path for vehicle (e.g., the vehicle 110) with a mounted implement (e.g., the implement 120) for performing an operation. For example, the waypoint record 1010 may be one of many waypoint records included in a path data structure. The waypoint record includes waypoint coordinates 1012, which may specify a position within a map that corresponds to a location in a geographic area represented by the map. For example, the waypoint coordinates may be a pair coordinates in two dimensions (e.g., x and y or east and north). In some implementations, the waypoint coordinates may be a three-tuple of coordinates in three dimensions (e.g., (x, y, z) or (east, north, altitude)).

This waypoint record 1010 includes implement control data 1014 that specifies how the implement should be controlled at a location corresponding to the waypoint of the waypoint record 1010. For example, the implement control data may indicate an amount of input (e.g., water, fertilizer, or pesticide) to deposit at a location corresponding to the waypoint. For example, the implement control data may indicate whether to collect (e.g., harvest) output (e.g., crops) from a location corresponding to the waypoint. In some implementations (not shown in FIG. 10) some of the waypoint records of a path data structure may lack implement control data. For example, to save memory, implement control data for a previous waypoint in the sequence of waypoints of the path may implicitly apply to subsequent waypoints that lack explicit implement control data of their own. In some implementations, only changes in the implement control data are recorded, and these changes are associated with the first waypoint in the sequence at which they apply.

In this example, the waypoint record 1010 is part of a path data structure that includes a linked list of waypoint records for waypoints in a sequence of waypoints of the path. The waypoint record 1010 includes a next waypoint pointer 1016 that points to waypoint record for the next waypoint in the sequence of waypoints of the path. In some implementations (not shown in FIG. 10), a path data structure may be implemented as an ordered array or waypoint records that lack next pointers.

Methods and Systems for Autonomous Vehicles

Examples of autonomous vehicle platforms are described that are configured to map, navigate, and control attached agricultural implements. Some implementations include a sensor-based perception system including one or more forward looking range finding sensors and GPS antennas. In some implementations, a vehicle actuation system configured to convert a standard vehicle (e.g., a tractor or a truck) to one with steering and speed that can be controlled autonomously through actuation of steering wheel, clutch, pedals, and/or throttle. Additionally, this vehicle actuation system may include actuation of position, draft, etc. of an attached implement should the vehicle be designed to operate one. The actuation system may be configured to command and control the vehicle without the use of any native or built in communication or control protocols such as CAN-BUS. The actuation system may be make and model agnostic to the vehicle it is installed on. In some implementations, a mobile connected platform is configured to scout agricultural environments using agricultural sensors such as soil moisture, humidity, temperature, multi-spectral camera, and/or lidar.

Figure 11:
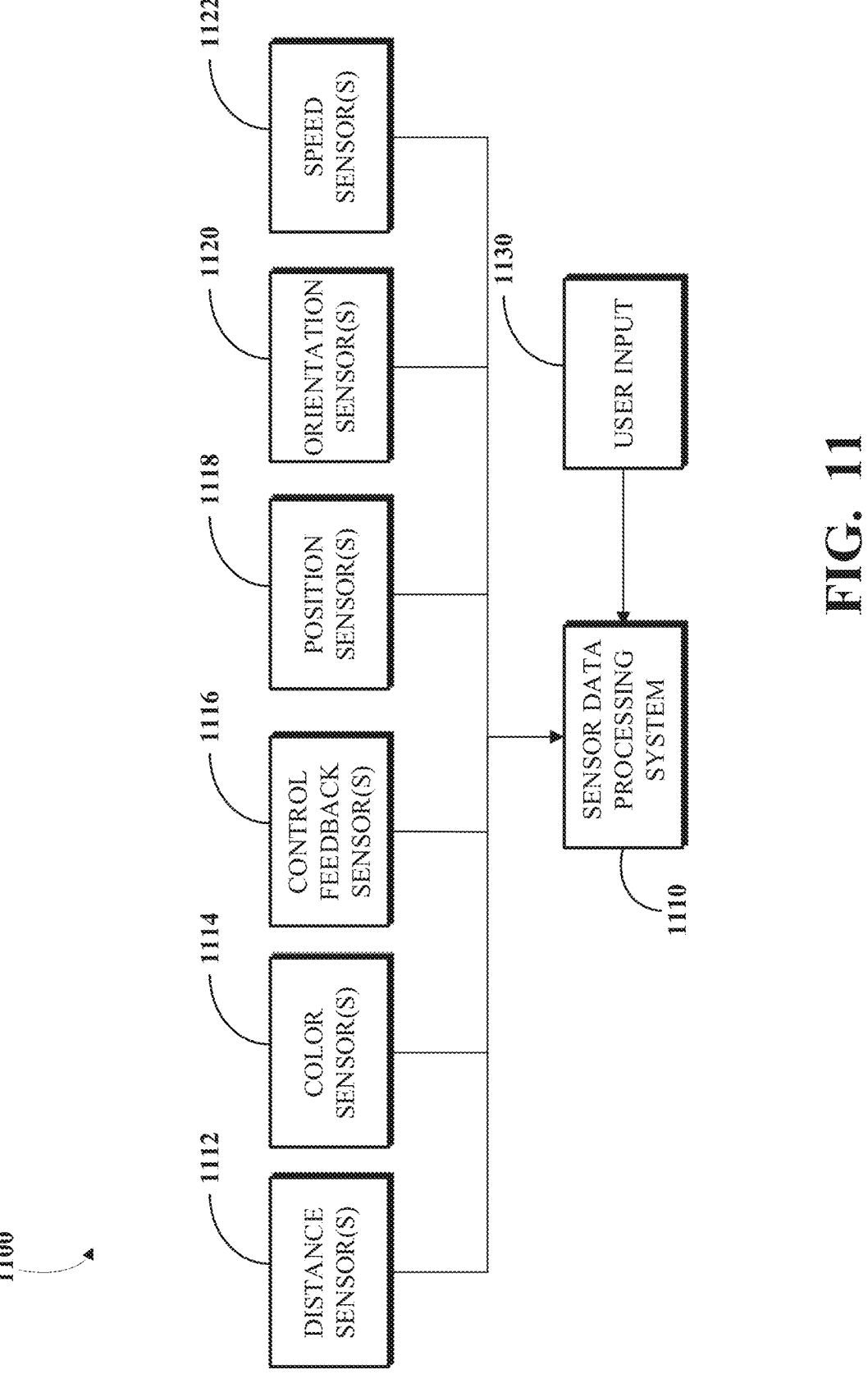
FIG. 11 is block diagram of an example of a tractor sensing system.

FIG. 11 is block diagram of an example of a tractor sensing system 1100. The tractor sensing system 1100 may include sensors designed to be connected to a vehicle to collect some or all of the following types of information. For example, this information could be collected directly or inferred by combining data from several sources (e.g., using sensor fusion techniques).

The tractor sensing system 1100 includes a sensor data processing system 1110. For example, the sensor data processing system 1110 may receive sensor data from one or more sensors of the tractor sensing system 1100 (e.g., 1112, 1114, 1116, 1118, 1120, and/or 1122) and perform signal processing (e.g., Kalman filtering or other sensor fusion processing) on the sensor data to determine estimates of operating parameters (e.g., position, orientation, speed, current, voltage, and/or temperature) of a vehicle (e.g., the vehicle 110) and/or a mounted implement (e.g., the implement 120). For example, the sensor data processing system 1110 may receive sensor data from one or more sensors of the tractor sensing system 1100 (e.g., 1112, 1114, 1116, 1118, 1120, and/or 1122) and perform signal processing (e.g., simultaneous localization and mapping (SLAM) or other sensor fusion processing) on the sensor data to determine a model of an environment surrounding the vehicle). For example, the sensor data processing system 1110 may include software executed by processing apparatus (e.g., the processing apparatus 130).

The tractor sensing system 1100 includes one or more distance sensors 1112, such as laser range finders, (e.g., lidar), radar, sonar, stereo cameras, structured light sensors, and/or photogrammetry (e.g., structure from motion).

The tractor sensing system 1100 includes one or more color sensors 1114, such as visual light cameras, multispectral and/or hyperspectral imagers (e.g., sensitive in the infrared, visual, and/or ultraviolet bands and sensitive to both wide and narrow bands of electromagnetic radiation in these bands). The one or more color sensors 1114 may rely on passive illumination or be coupled with an illumination system in a relevant band.

The tractor sensing system 1100 includes one or more control feedback sensors 1116, which may be configured to provide feedback about the vehicle state for use by the control system or for system status or health monitoring. For example, the one or more control feedback sensors 1116 may utilize a native messaging protocol (e.g., CAN-Bus or ISO-bus) integration to measure vehicle speed, engine speed, fuel levels, and engine health, including but not limited to oil temp and pressure, coolant temperatures. For example, the one or more control feedback sensors 1116 may include linear and rotary position sensors (e.g., sensors employing lasers, hall effect, resistor, switches and/or photogates) to obtain position (e.g., absolute and/or relative positioning). For example, the one or more control feedback sensors 1116 may include current sensors (e.g., Hall Effect and shunt type). For example, the one or more control feedback sensors 1116 may include voltage sensors (e.g., digital or analog). For example, the one or more control feedback sensors 1116 may include force sensors (e.g., load cells and/or integrally mounted strain gauges). For example, the one or more control feedback sensors 1116 may include temperature sensors (e.g., thermocouples, thermistors and/or resistance temperature detectors (RTDs)). For example, the one or more control feedback sensors 1116 may include pressure sensors. In some implementations, the one or more control feedback sensors 1116 may be connected to components of a vehicle (e.g., the vehicle 110) and/or an implement (e.g., the implement 120).

The tractor sensing system 1100 includes one or more position sensors 1118, such as sensors to communicate with one or more global navigation satellite systems (GNSS) (e.g., one or more on vehicle receivers and optional fixed base station receivers), a local or global radio beacon based position sensing system, and/or sensors based on fixed ground reference markers (e.g., detectable via visual, radio frequency, or magnetic sensors). In some implementations, position detection may be implemented based on fusing data from disparate sensors defined elsewhere in the tractor sensing system 1100 to provide more accurate position estimates than one sensor alone.

The tractor sensing system 1100 includes one or more orientation sensors 1120, such as an inertial measurement unit (e.g., integrating any of one or more axis magnetometers, one or more axis accelerometers, and/or one or more axis gyroscopes) and/or two or more position sensors (e.g., Global Positioning System (GPS) sensors). For example, an inertial measurement unit may output sensor data in a form of an estimate of orientation (e.g., relative or absolute). For example, an orientation of the vehicle may be derived from two or more position sensors connected to vehicle (e.g., near the front and near the back of the vehicle) as a vector between the position points estimated by the two positions sensors. For example, the one or more orientation sensors 1120 may be mounted and configured to determine an orientation of a vehicle (e.g., a tractor) and/or an orientation of an implement (e.g., a boom sprayer).

The tractor sensing system 1100 includes one or more speed sensors 1122, such as wheel encoders, radar speed sensors, and/or inferred speed from processing algorithms computed on data from any or all of the depth and color sensor data described above.

The tractor sensing system 1100 be configured to receive user input 1130, such as via physical or virtual buttons, switches, sliders and/or knobs either attached to vehicle or connected via wireless link. In some implementations, users may be enabled to send commands necessary to manually control the vehicle, either from a cockpit of the vehicle, near the vehicle, or remotely (e.g., teleoperation). In some implementations, a user is enabled to command all motors and actuators on the vehicle or some subset to allow the user to manually control the vehicle. For example, users could send high level commands that cause the vehicle to execute complex tasks, such as commanding a vehicle to return home or mow a mapped field. In some implementations, a user may be enabled to force the tractor to start, stop, pause or abort the current task from on the vehicle, locally via local wireless or from anywhere in the world via a communication system (e.g., using a WiFi or cellular data network interface).

For example, the tractor sensing system 1100 may include a Swiftnav RTK GPS for Position and Speed, an XSens IMU for Orientation, a Velodyne Lidar for Distance and Perception, and a ZED 3D Camera for Color and Perception.

Figure 12:
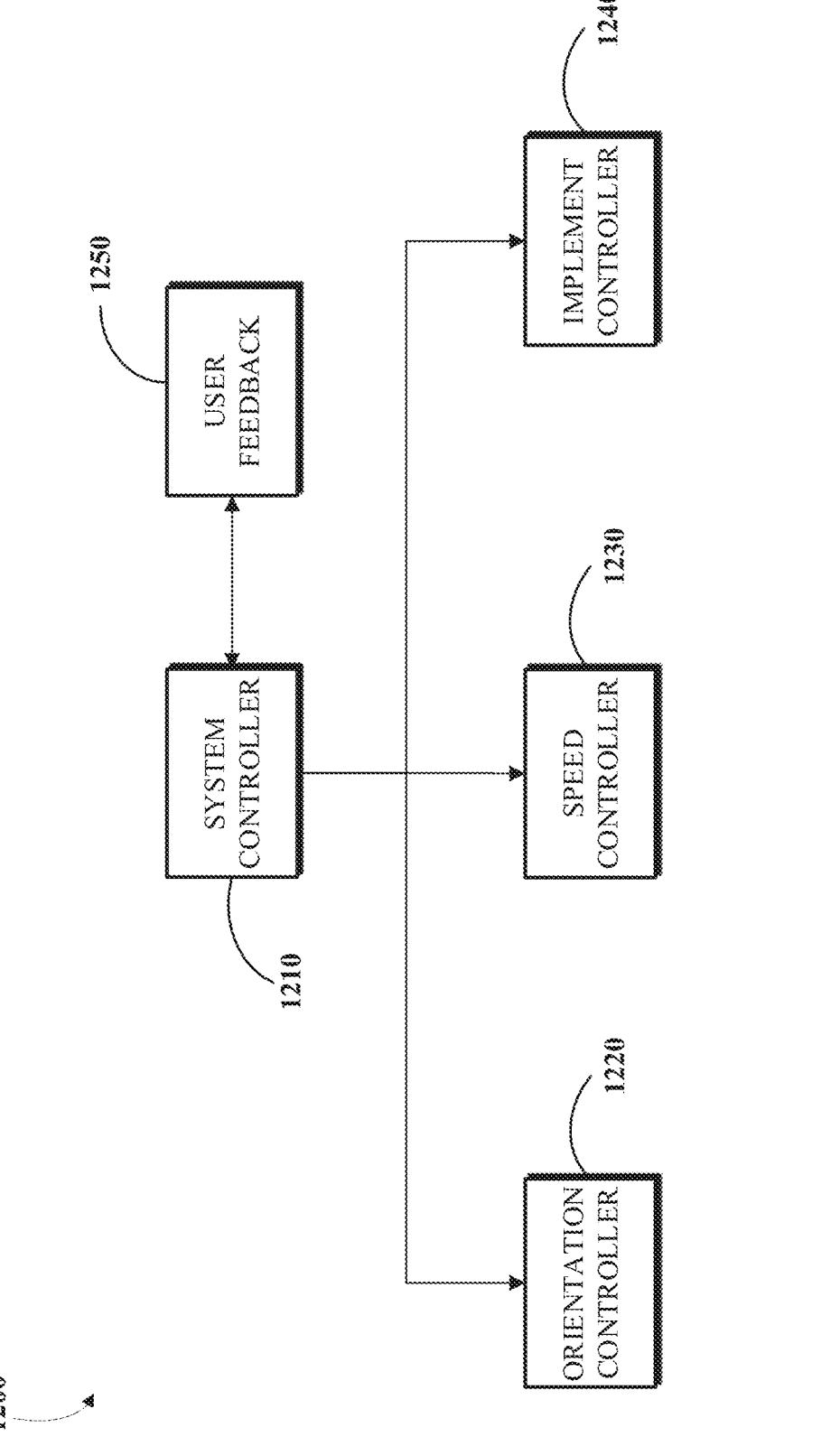
FIG. 12 is block diagram of an example of a tractor control system.

FIG. 12 is block diagram of an example of a tractor control system 1200. The tractor control system 1200 may enable a vehicle (e.g., a tractor) to automatically move in the world and execute tasks. This may involve actively controlling an orientation and speed of the vehicle as well as manipulating one or more implements (e.g., farm implements). Additionally, the vehicle may be configured to provide feedback to operators and other people working in the area as well as other vehicles. The tractor control system 1200 includes a system controller 1210 that issues control signals to an orientation controller 1220 configured to control orientation of a vehicle (e.g., the vehicle 110), a speed controller 1230 configured to control speed of the vehicle, and an implement controller 1240 configured to control operation of an implement (e.g., the implement 120); and provides user feedback 1250.

The tractor control system 1200 includes an orientation controller 1220. The orientation controller 1220 may be configured for steering, including steering a single wheel to all wheels. For example, steering can be accomplished with a combination of linkages and actuators, including electrical, pneumatic or hydraulic actuators or any combination. The tractor control system 1200 includes an orientation controller 1220 differential drive, where wheels or tracks are powered at different rates to change the vehicle orientation. Differential drive may include skid steer, where each wheel or track has significant transverse movement across the ground that is resolved as friction, omni-wheel configurations, where wheels are designed not to produce friction transverse to their orientation, as well as configurations with all driven wheels on the same axis and non-driven wheels allowed to free castor in the local direction of travel. For omni-wheel configurations, traditional wheel configurations with all wheels pointed generally in the same direction may be used as well as configurations involving wheels oriented around a circle to simplify control strategies. For example, in a 3-wheeled configuration, positioning wheels at 120° angles from each other may enable complete position and speed control in 2-D space.

The tractor control system 1200 includes a speed controller 1230. For example, vehicle speed may be increased or decreased by changing settings on engine or motor to change speed (e.g., changing throttle setting on an internal combustion or gas turbine, changing gear in a transmission, changing voltage or current to an electric motor, changing air or fluid flow or pressure to pneumatic or hydraulic motors). For example, the speed controller 1230 may be configured to control vehicle speed by changing pressure applied to brakes installed in the vehicle, either in central locations on the drivetrain or at one or more wheels or tracks or some combination of the two. For example, the speed controller 1230 may be configured to control vehicle speed by changing pressure to clutches installed in the drivetrain, either locally at one or more wheels or tracks or in central locations where a single clutch can modulate power to more than one wheel or track.

The tractor control system 1200 includes an implement controller 1240, which may control one or more implements (e.g., including a tool attached to the vehicle to do work). For example, the implement controller 1240 may be configured to control an implement primarily via a 3-point hitch attached to the vehicle or via electronic or hydraulic systems. For example, implements controlled via a 3-point hitch are rigidly attached to be the vehicle and can be raised and lowered to a constant height or a height that changes dynamically. In some implementations, dynamic changes can be driven by load on the implement, such as from the ground during a tilling operation where the implement partially in the ground or via some other sensor feedback on the implement or from a sensor system on the vehicle (e.g., the tractor sensing system 1100). For example, implements may be controlled via hydraulic or electric signaling. These signals can be used to control cutters, sprayers, motors, actuators, engines or any other required system to allow an implement to execute a task. For example, implements such as boom sprayers, which require leveling in real time based on the tilt angle of the tractor, can be controlled with a closed loop system which includes sensing from an IMU or other level sensing device and the uses onboard actuators to level the boom sprayer.

The tractor control system 1200 provides user feedback 1250. In some implementations, the vehicle is able to inform users about its state and command queue. For example, state may include the settings to all system outputs as well as raw and processed sensor data. For example, user feedback 1250 may be available to users via interfaces on the vehicle, including screens, lights, and audible indicators. For example, user feedback 1250 may be available to remote users via custom interfaces on cellular phones and tablets as well as desktops and laptops. For example, user feedback 1250 may take the form of web interfaces and custom application software. For example, user feedback 1250 may be communicated as described in the communication system section below.

Other Vehicles

The autonomous sensor perception and actuation platform may extend to other vehicle types that operate in outdoor industrial environments including but not limited to farms. For example, other vehicles that could use this technology include mining, construction, marine, trucking, warehouse, shipping yards and logging applications. For example, the vehicle control systems described herein could extend to vehicles which do road maintenance such as clearing, watering or deicing. For example, in agriculture, the vehicle control systems described herein could be extended to a self-propelled tree nut shaker, tree nut sweeper, self-propelled cart designed to transport fruit from a point in a vineyard or field to a point in the headlands, and return to that point, grain cart, combine, self-propelled planter, self-propelled discer, or tiller.

In some implementations, the vehicle control systems described herein may be extended to control a swarm of smaller robots. For example, these smaller swarm robots could be terrestrial or air vehicles such as rotorwing and fixed wing drones. The vehicle control systems described herein could be used to schedule and control their activities as well as be a physical docking station for transportation over longer distances, recharging, refueling, or reloading inputs. Additionally, the vehicle control systems described herein may be used as a communications relay over long distances in a mesh network configuration.

In some implementations, the vehicle control systems described herein could be extended to work alongside humans when needed in activities such as harvesting, where workers are walking next to slow moving tractors. For example, the vehicle control systems described herein can also be used on smaller vehicles such as side-by-sides and all-terrain vehicles, where moving or towing small objects around an area is desirable.

For example, the vehicle control systems described herein may be used with vehicles to do jobs that interact with land and crops such as spraying, mowing, discing, trenching, and vacuuming. In some implementations, the vehicles can also use vehicle control systems described herein as a platform for collecting data by monitoring and surveying crops. For example, the vehicle control systems described herein may be used to detect dehydrated plants, disease, pests, and monitor growth over time.

Autonomous/Connected Operation

A system of autonomous perception sensors may be deployed via stationary ground sensors, drones/UAVs, and vehicles used to automate scouting and farm operations. Global farm data may be collected and collated with local data at the plant or field level to monitor ground and air conditions. Mobile robots may be deployed on command such as UAVs, drones, self-propelled vehicles, or manned vehicles to collect time sensitive data. Data may be used in statistical models to relate weather, soil moisture, humidity, geographic location, chemicals and operations applied to growth and health of plants. Data may also be used to produce operational recommendations and automatically or manually deploy human and robotic resources to complete agricultural tasks. For example, a connected site-wide operation may include automatic tool changing stations, refueling stations, and a central command and control center to monitor and assign mobile assets operational tasks.

Communication System

A vehicle may be enabled to communicate with central locations to send and receive updates and store information. While in the field communications may include but are not limited to cellular, WiFi, or other RF links. These links can be ganged together in parallel or series to maintain connectivity. For example, communication links can be used for real time communication or for occasional updates. For example, communication links may utilize antennas on the vehicle and optionally antennas centrally located at the site to relay signals based on a chosen topology. For example, central servers can be located on site with the vehicles or centrally in the cloud or a dedicated datacenter or some combination. Additionally, servers may be kept in multiple of these locations for either redundancy or to store different types of vehicle data.

Figure 13:
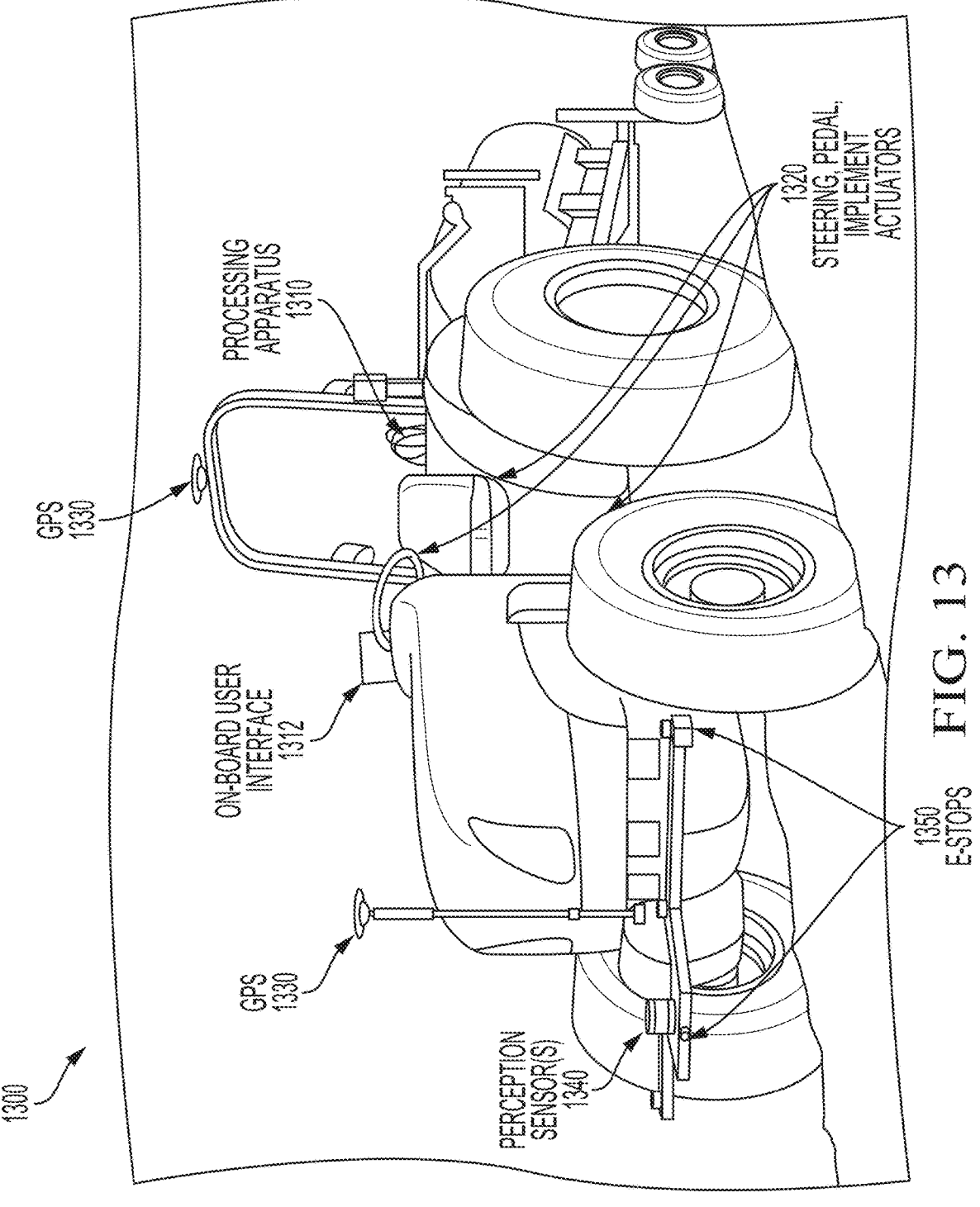
FIG. 13 is an illustration of an example of a tractor retrofitted with an autonomous system.

FIG. 13 is an illustration of an example of a tractor retrofitted with an autonomous system 1300. FIG. 13 depicts a market available 50 HP tractor and rear-attached sprayer implement. The boxes denote hardware components of the autonomous system 1300 that connect through a processing apparatus 1310 (e.g., a central computer) and actuate the steering and pedals of the tractor. The autonomous system 1300 includes a processing apparatus 1310 (e.g., the processing apparatus 130); an on-board user interface 1312 (e.g. including a touchscreen); steering, pedal, and implement actuators 1320 configured to control the tractor and the sprayer via a manual control interface of the tractor; a global positioning system (GPS) 1330, including a reference GPS receiver mounted near the back of the tractor and an attitude GPS mounted near the front of the tractor; one or more perception sensors 1340 (e.g., including a lidar sensor and/or an RGB camera); and e-stops 1350 configured to shutdown the tractor when they are pressed or activated.

Human Machine Interface

For example, a vehicle may be assigned tasks, controlled, and monitored by a remote control interface. A user interface may enable a single user or user group to control one or multiple autonomous farming vehicles from the vehicle or other remote locations. Examples of remote locations include on vehicle, line-of-sight distance away from vehicle, other locations on a work site, or a central command and control center operated onsite or elsewhere. The user interface may be used to initialize the vehicle, assign it tasks, monitor and alert users to vehicle health diagnostics, obstacles, and/or fuel levels. In some implementations, a secondary user interface may be used to show location of all assets, their statuses and records of the operations executed by those assets and users that initialized operations on the vehicle.

For example, teleoperation may enable remote operators to intervene with the vehicle's assigned job in scenarios where the software or vehicle has determined it cannot safely proceed per the constraints provided. Some examples of teleoperation may be to transport machines over longer distances including semi-private or public roads, navigating non-standard turns, navigating around obstacles where there is a level of uncertainty of the obstacle geometry and type, and conducting on-the-fly operations that are not programmed into the machine's core algorithms. The user interface may enable a human controller to take over the machine's operation using a live camera feed, sensor inputs, and teleoperation of actuators on the vehicle.

In some implementations, vehicles may be enabled to load and unload themselves from trailers. The vehicle's path will be able to be programmed in an extendable way from knowing only a small part of the field and then generating the rest of the path based on knowledge of the size and shape of the land as well as the desired operational task that the tractor is requested to perform.

Hardware Architecture Implementations

Figure 14:
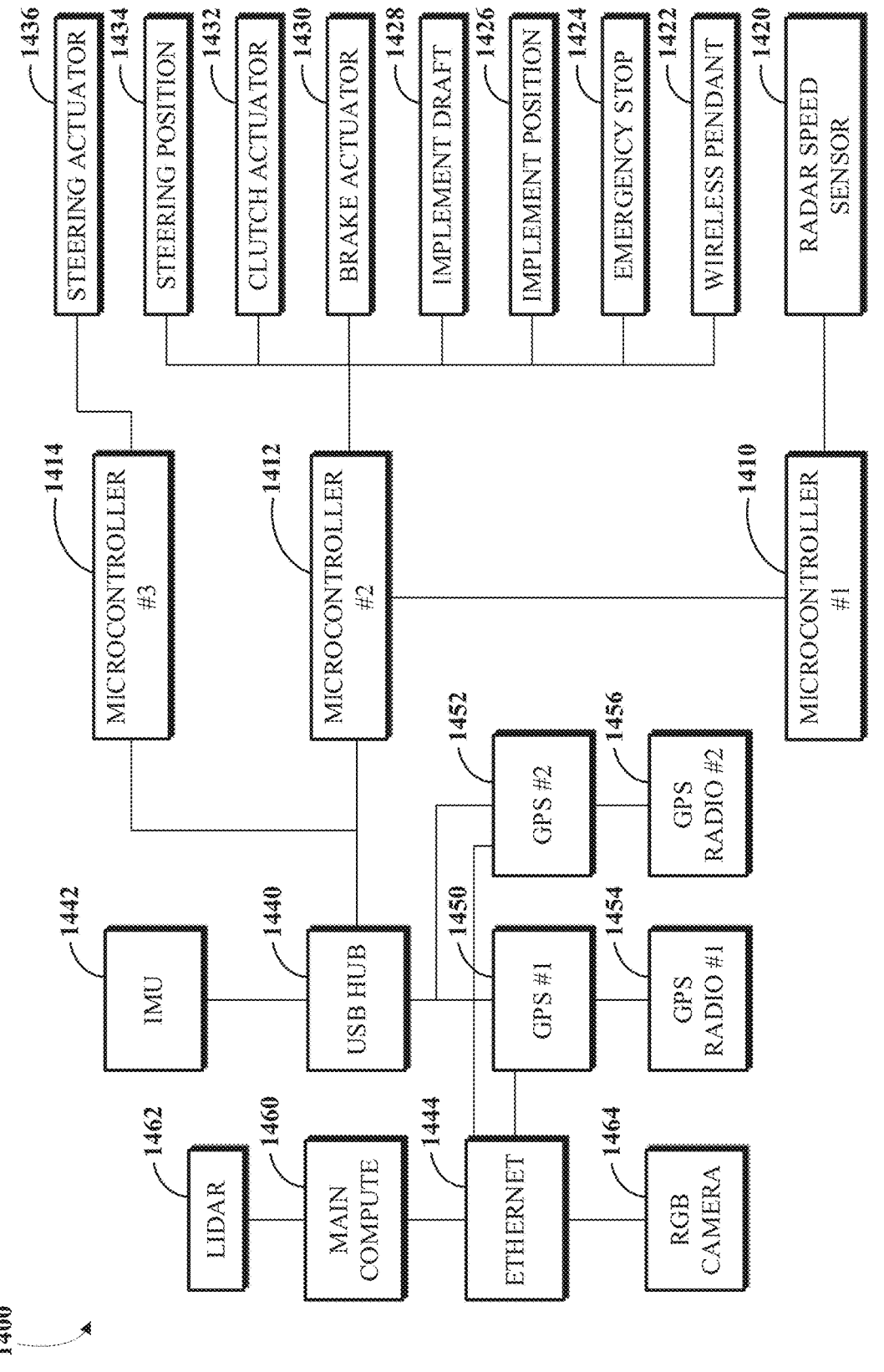
FIG. 14 is block diagram of an example of a hardware architecture for an autonomous vehicle control system.
Figure 15:
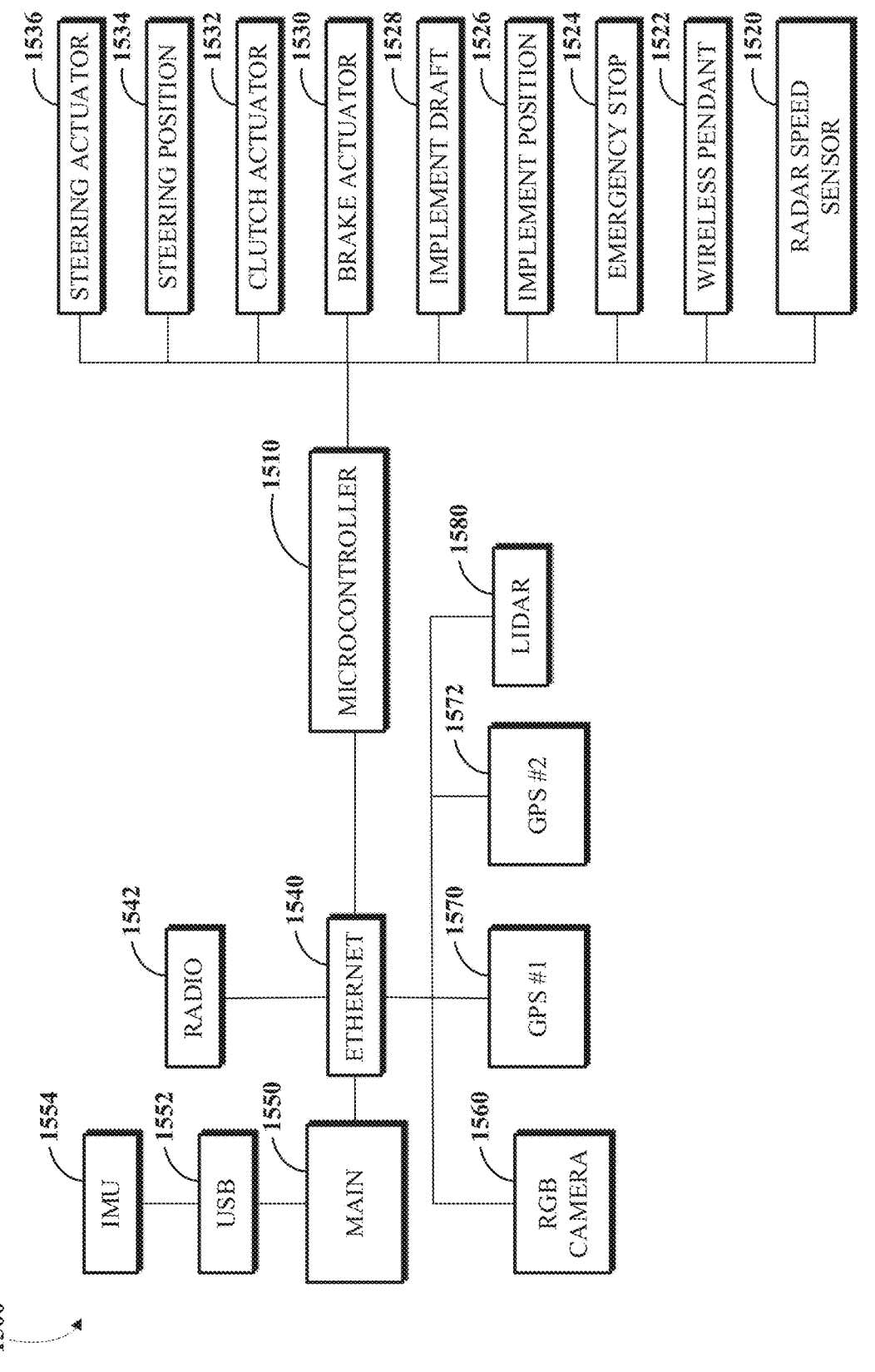
FIG. 15 is block diagram of an example of a hardware architecture for an autonomous vehicle control system.

FIGS. 14-15 depict examples of the electrical and communication architecture of a vehicle control system's hardware components. For example, externally mounted sensors including the Lidar, IMU, RGB Camera, and GPS antennas may be connected via Ethernet and/or hardwired to a processing apparatus (e.g., a core computer). Signals from these sensors may be processed via software algorithms which then instruct the controllers to actuate the steering wheel/pedals/implement controls/e-stop system and relay data to and from the remote interface. Hardware components may be mounted to the vehicle to eliminate or mitigate vibrations, and actuators may be mounted to enable manual manipulation of the tractor when autonomous mode is not activated (e.g., a pedal may be actuated by a cable attached to the pedal and a motor that pulls the pedal down by varying amounts while in use and goes slack when autonomous mode is not activated to allow the pedal to be operated normally by a human foot).

FIG. 14 is block diagram of an example of a hardware architecture for an autonomous vehicle control system 1400. The autonomous vehicle control system 1400 includes three microcontrollers (1410, 1412, and 1414), which may enable lower delay in some feedback control loops. The autonomous vehicle control system 1400 includes microcontroller #1 1410; microcontroller #2 1412; microcontroller #3 1414; a radar speed sensor 1420; a wireless pendant 1422; an emergency stop 1424; an implement position sensor 1426; an implement draft 1428; a brake actuator 1430; a clutch actuator 1432; a steering position sensor 1434; a steering actuator 1436; a universal serial bus (USB) hub 1440; an inertial measurement unit (IMU) 1442; an Ethernet network 1444; a first global positioning system (GPS) 1450 (e.g., a reference GPS); a second global positioning system (GPS) 1452 (e.g., an attitude GPS); a first GPS radio 1454; a second GPS radio 1456; a main compute module 1460; a lidar 1462; and a red green blue (RGB) camera 1464.

FIG. 15 is block diagram of an example of a hardware architecture for an autonomous vehicle control system 1500. The autonomous vehicle control system 1500 includes a microcontroller 1510, which may enable lower delay in some feedback control loops. The autonomous vehicle control system 1500 includes a microcontroller 1510; a radar speed sensor 1520; a wireless pendant 1522; an emergency stop 1524; an implement position sensor 1526; an implement draft 1528; a brake actuator 1530; a clutch actuator 1532; a steering position sensor 1534; a steering actuator 1536; an Ethernet network 1540; a radio 1542; a main compute module 1550; a universal serial bus (USB) 1552; an inertial measurement unit (IMU) 1554; a red green blue (RGB) camera 1560; a first global positioning system (GPS) 1570 (e.g., a reference GPS); a second global positioning system (GPS) 1572 (e.g., an attitude GPS); and a lidar 1580.

The autonomous vehicle control system 1500 and similar systems may include external internet/internet of things (IoT) connectivity. For example, the autonomous vehicle control system 1500 may use over the air network communications for software updates and to enable teleoperation. The autonomous vehicle control system 1500 utilizes the radio 1542 to receive/send signals (e.g., RTK, eStop commands, and WiFi) to and from a vehicle (e.g., a tractor). In some implementations (not shown in FIG. 15), a cradlepoint gateway may be integrated onto the tractor itself which allows a remote user to control, stream video, and/or transmit data over a cellular data network (e.g., an LTE network).

Tractor Perception System

Figure 16:
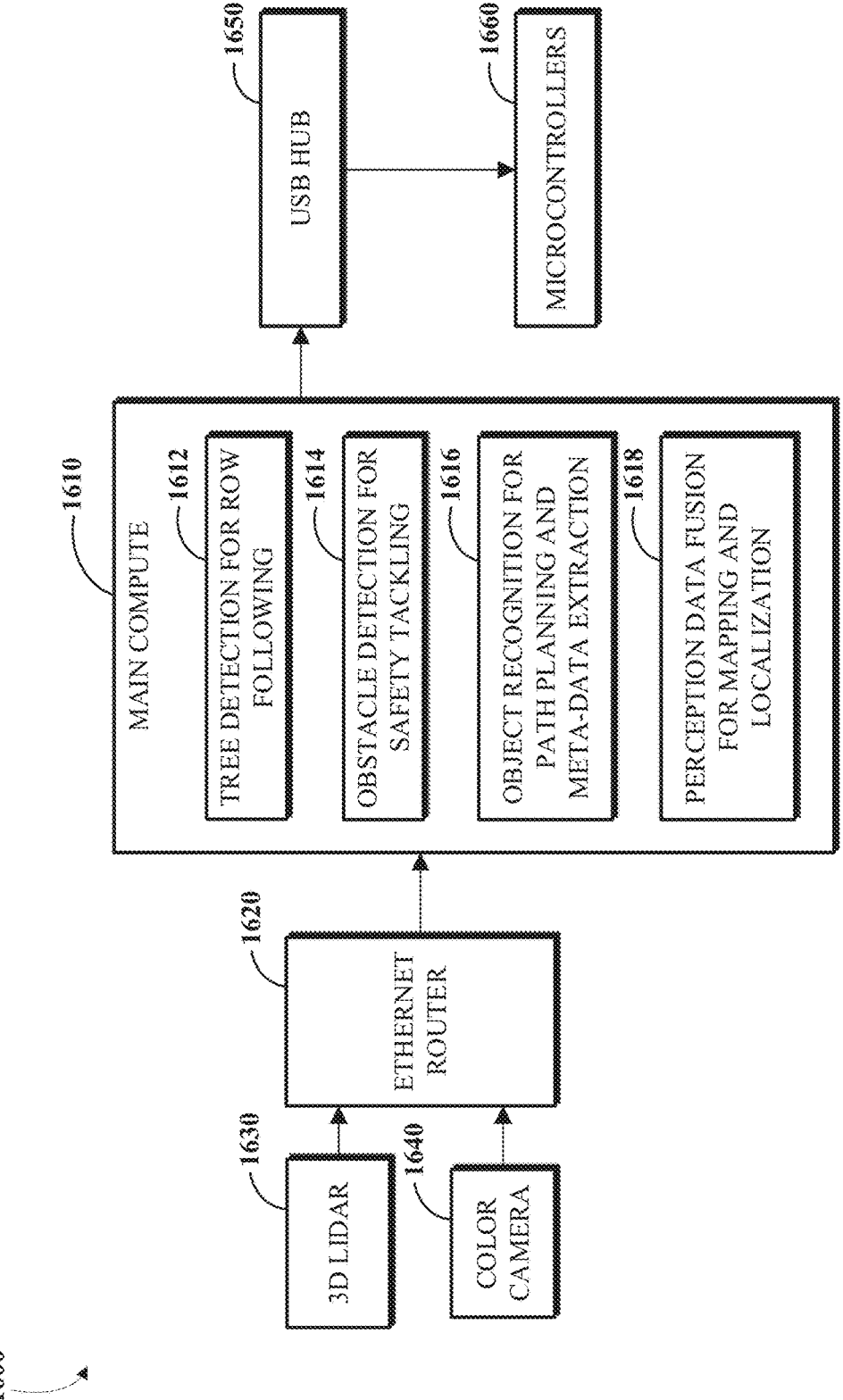
FIG. 16 is block diagram of an example of a tractor perception system.

FIG. 16 depicts the hardware and software components of the tractor perception system 1600. The perception system hardware is comprised of a 3-D lidar sensor 1630 and Color Camera sensor 1640 that are mounted to the front of the tractor. These sensors are connected, via an Ethernet router 1620, to a main compute 1610 (e.g., a central compute platform) and continuously relay data about the tractor's surroundings which may enable the tractor to course correct and make real-time navigational decisions. While a preferred configuration is a Lidar+Color Camera, other configurations with range finding sensors and cameras can be used to perceive the vehicle's environment. For example, primary functions of the perception system software may include tree or vegetation detection, field row following, and unknown obstacle detection for alternate route planning and safety. For example, secondary functions of the perception system may include mapping of plant growth over time, monitoring plant health, and variable application of materials and implement control.

FIG. 16 is block diagram of an example of a tractor perception system 1600. The tractor perception system 1600 includes a main compute 1610; an Ethernet router 1620; a 3-D lidar sensor 1630; a color camera sensor 1640; a universal serial bus (USB) hub 1650; and one or more microcontrollers 1660, which may be configured to control actuation based on perception data regarding the environment. The main compute 1610 runs software modules to process sensor data from the 3-D lidar sensor 1630 and the color camera sensor 1640 to determine a model of an environment surrounding the tractor. The main compute 1610 includes a tree detection and row following module 1612; an obstacle detection for safety tackling module 1614; an object recognition for path planning and meta-data extraction module 1616; and a perception data fusion for mapping and localization module 1618.

Software/Algorithms (Path Planning and Navigation)

Figure 17:
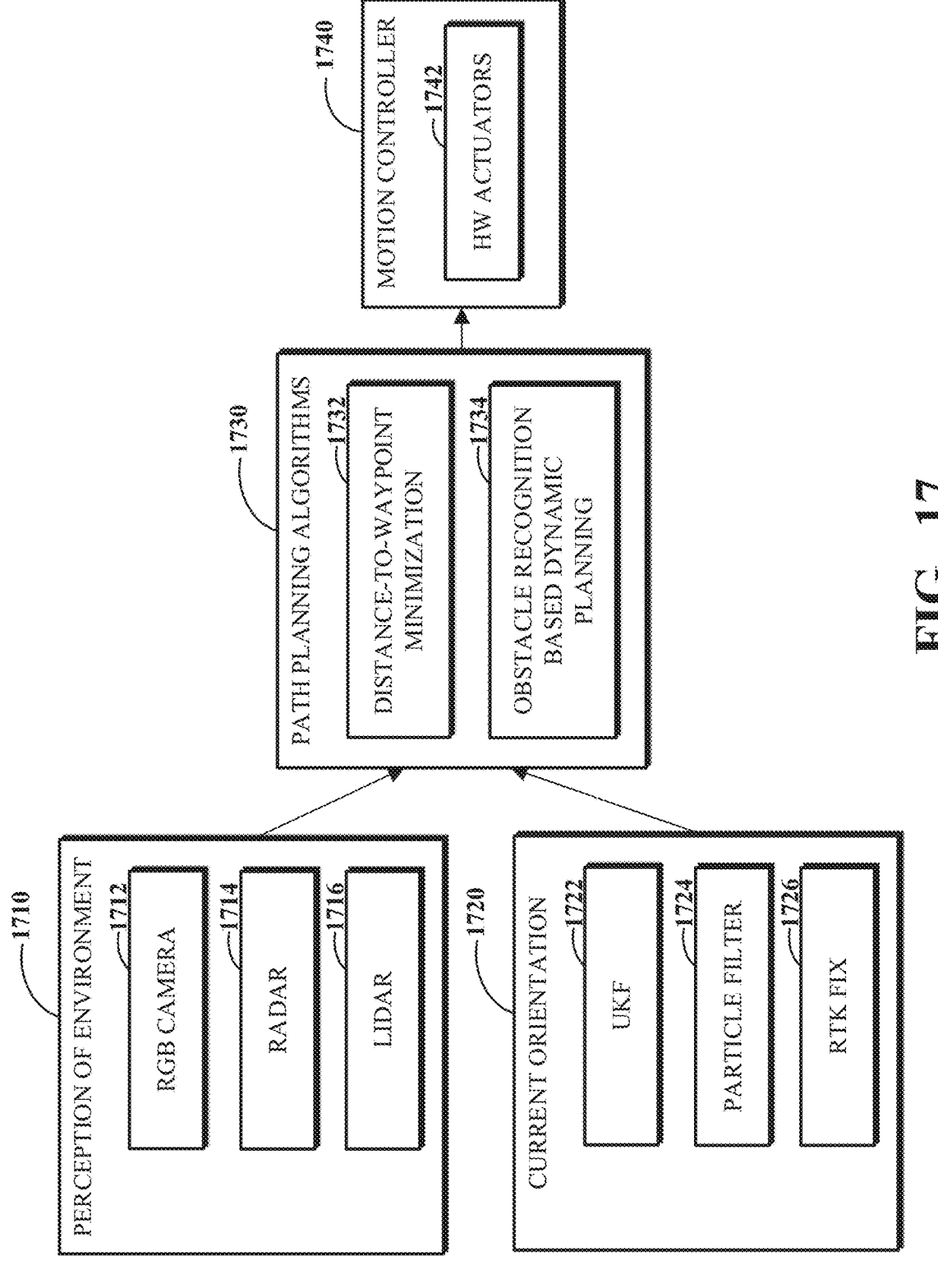
FIG. 17 is block diagram of an example of a system configured for autonomous vehicle control.

FIG. 17 depicts at a high level how a perception system (e.g., camera and Lidar) and state estimation techniques (e.g., UKF, Particle Filter, and RTK GPS location) are fed into a vehicle control system's path planning algorithms. The vehicle control system may be given a navigational course or map with available routes, and uses perception data as well as orientation data to correct the tractor's actual pose and location via sending commands to the actuators. This may enable the tractor to stay on its prescribed course while reacting to variances and anomalies in the environment.

FIG. 17 is block diagram of an example of a system 1700 configured for autonomous vehicle control. The system 1700 perception of environment module 1710 that utilizes an RGB camera 1712, a radar 1714, and a lidar 1716; a current orientation module 1720 that utilizes an unscented Kalman filter (UKF) 1722, a particle filter 1724, and/or a real-time kinematic fix module 1726; a path planning algorithms module 1730 that includes a distance-to-waypoint minimization module 1732 and an obstacle recognition based dynamic planning module 1734; and a motion controller 1740 that includes hardware actuators 1742.

There are physical features in agricultural environments that a vehicle can use to localize, plan, and navigate using sensor fusion, data filtering, and estimation techniques. For example, in an orchard and utilizing lidar point cloud data, points may be clustered based on distance and intensity to estimate locations of trees, and create virtual lanes which the vehicle can navigate between. Creating models of physical features planted in agricultural row formations may include distinguishing between hard obstacles such as poles, tree trunks, and branches, and soft obstacles such as leaves that do not need to be avoided. In some implementations, by using the vehicle pose and location in relation to these lanes, the vehicle is able to safely navigate between rows without the use of GPS. Another scenario required of the vehicle in GPS denied or unreliable environments is detecting the end of a row, planning a turn, and re-entering the next row to continue the operation without the use of GPS. In this scenario the geospatial relationship between the vehicle and environmental features may be determined based on distance and/or camera sensor feedback and analysis. Once the vehicle reaches and detects an end-of-row condition, the vehicle may execute a turn and identify the optimal trajectory to enter the next agricultural lane. Using this method, the vehicle may cover an entire plot of agricultural rows without the use of global satellite based positioning. In some implementations, a method of mapping and localization called SLAM can be utilized using lidar and/or camera data that creates a local map of the environment as the vehicle drives through the environment that can be referenced in subsequent autonomous runs to localize and navigate when lacking GPS.

Non-GPS Path Planning/Navigation

Figure 18:
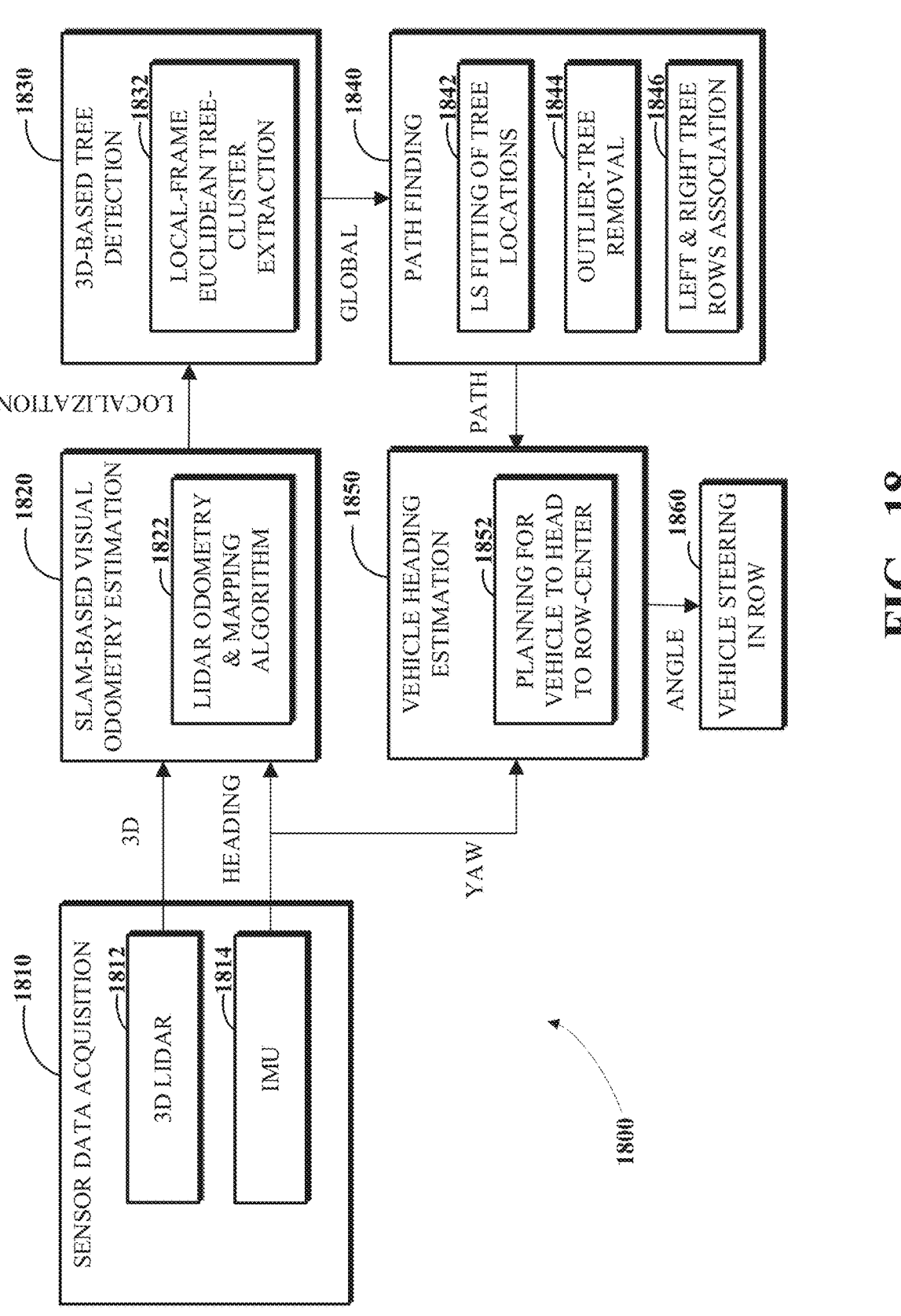
FIG. 18 is block diagram of an example of a system configured for autonomous vehicle control using perception based tree detection and row following.

FIG. 18 depicts a lower level framework for path planning and navigation without the use of a GPS antenna. In most robotic applications requiring real-world navigation, a GPS is used to localize the robot and estimate its speed in the real world. There are many environments that may inhibit the use of a GPS such as an underground mine, underwater, inside a building, and underneath vegetation. In agriculture, and specifically in old growth orchards and vineyards with significant canopy cover, GPS guidance solutions may not be adequate for precision operations as an RTK fix is occluded by the leaves and branches overhead of the robot. This diagram shows an alternative approach to path planning in a GPS-denied orchard environment, and extends to row finding and following in vineyards, row crops, and other rowed or laned environments.

FIG. 18 is block diagram of an example of a system 1800 configured for autonomous vehicle control using perception based tree detection and row following. The system 1800 includes a sensor data acquisition system 1810 that includes a three dimensional lidar 1812 and an inertial measurement unit 1814; a SLAM-based visual odometry estimation module 1820 that utilizes a lidar odometry and mapping algorithm 1822; a 3D-based tree detection module 1830 that includes a local-frame Euclidean tree-cluster extraction module 1832; a path finding module 1840 that includes a least-squares fitting of tree locations module 1842, an outlier-tree removal module 1844, and a left and right tree rows association module 1846; a vehicle heading estimation module 1850 that includes a planning for vehicle to head to row-center module 1852; and a vehicle steering in row system 1860 (e.g., including a steering wheel actuator). For example, the SLAM-based visual odometry estimation module 1820 may be configured to take 3D sensor data (e.g., three-dimensional point cloud data) and heading data (e.g., pitch, roll, and yaw) from the sensor data acquisition system 1810 and determine localization data for the vehicle that is passed to the 3D-based tree detection module 1830.

The algorithms of the system 1800 may be based on simultaneous localization and mapping (SLAM), 3D-based tree detection, tree-lane finding, and/or vehicle heading estimation. For example, trees may be detected based on their trunks, which do not change much over time compared to tree canopies, and a Euclidean cluster extraction algorithm. Once tree trunks in front of the vehicle are found, an algorithm may be applied to least-squares fit the detected trees on the left and right sides of the vehicle. The least-squares fit may serve to find the directions of the left and right tree lines which form a tree lane. In each fitted tree line, a detected tree is considered an outlier and removed when its perpendicular distance to the fitted tree line is greater than a defined threshold. In some implementations, the satisfied trees then go through a process of left and right tree-rows association which may take a constraint of parallel tree lines into account. In this step, left and right tree lines are fit at once with a condition that they are parallel to each other. Afterwards, vehicle heading may be calculated from the detected tree lane in every frame (e.g., the vehicle stays in the middle of the lane and its heading is parallel to the lane).

Figure 19:
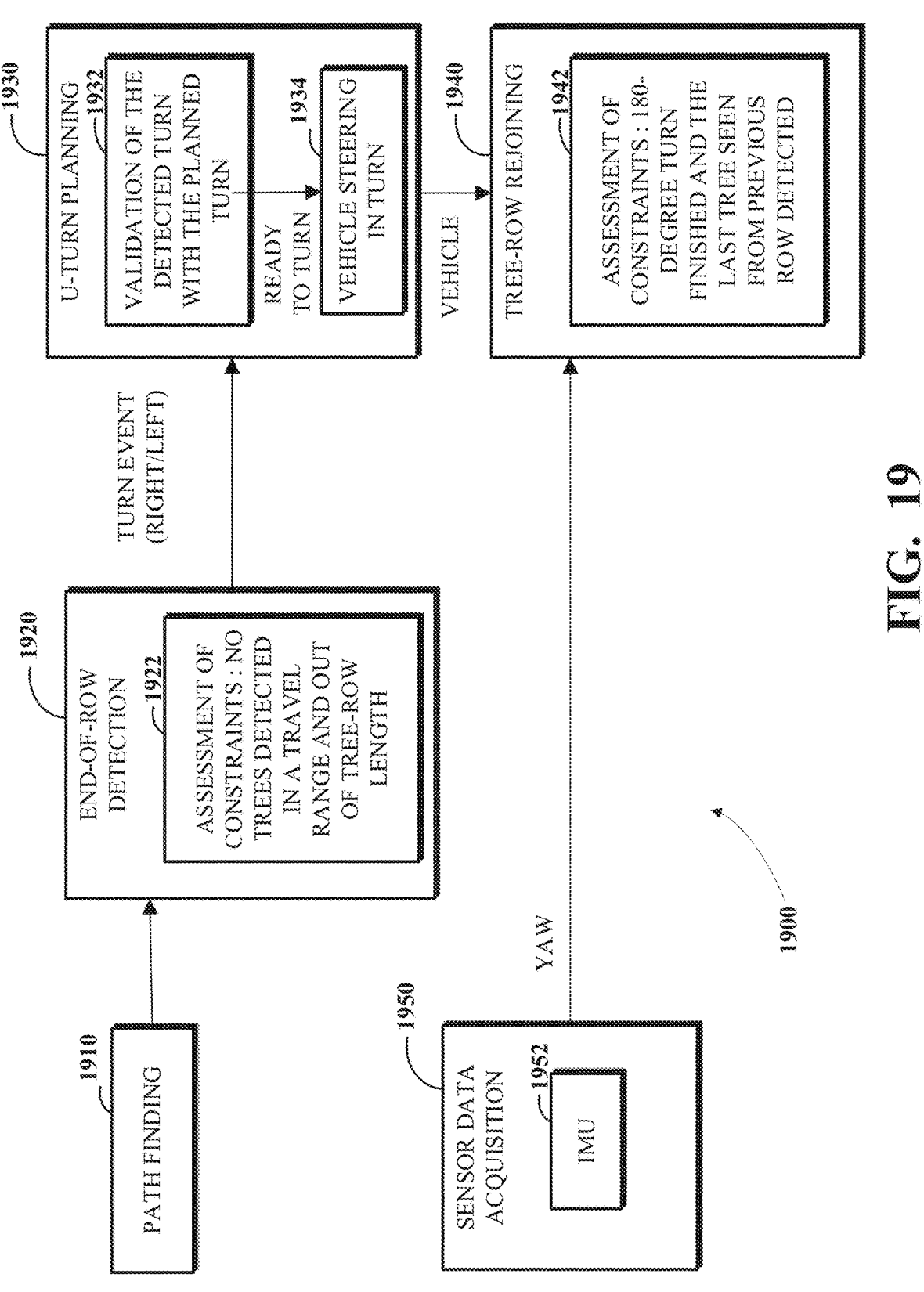
FIG. 19 is block diagram of an example of a system configured for autonomous vehicle control using perception based end-of-row detection and row rejoining.

FIG. 19 is block diagram of an example of a system 1900 configured for autonomous vehicle control using perception based end-of-row detection and row rejoining. The system 1900 includes a path finding module 1910; an end-of-row detection module 1920 that includes an assessment of constraints module 1922 (e.g., configured to check that no trees are detected in a travel range and out of tree-row length); a u-turn planning module 1930 that includes a validation module 1932 (e.g., configured to validate the detected turn as being associated with a planned turn) and vehicle steering in turn module 1934 (e.g., configured to output control signals to a vehicle steering actuator); a tree-row rejoining module 1940 that includes an assessment of constraints module 1942 (e.g., configured to check that a 180 degree turn is completed and that the last seen tree from the previous row is detected); and a sensor data acquisition system 1950 that includes an inertial measurement unit (IMU) 1952. For example, the sensor data acquisition system 1950 may output a yaw estimate for the vehicle to the tree-row rejoining module 1940. For example, the end-of-row detection module 1920 may be configured to determine turn events (e.g., a left turn or a right turn) when a turn at the end of a crop row may enable entry of a next row by the vehicle.

GPS Path Planning and Navigation
GPS-Based Path Planning

Figure 20:
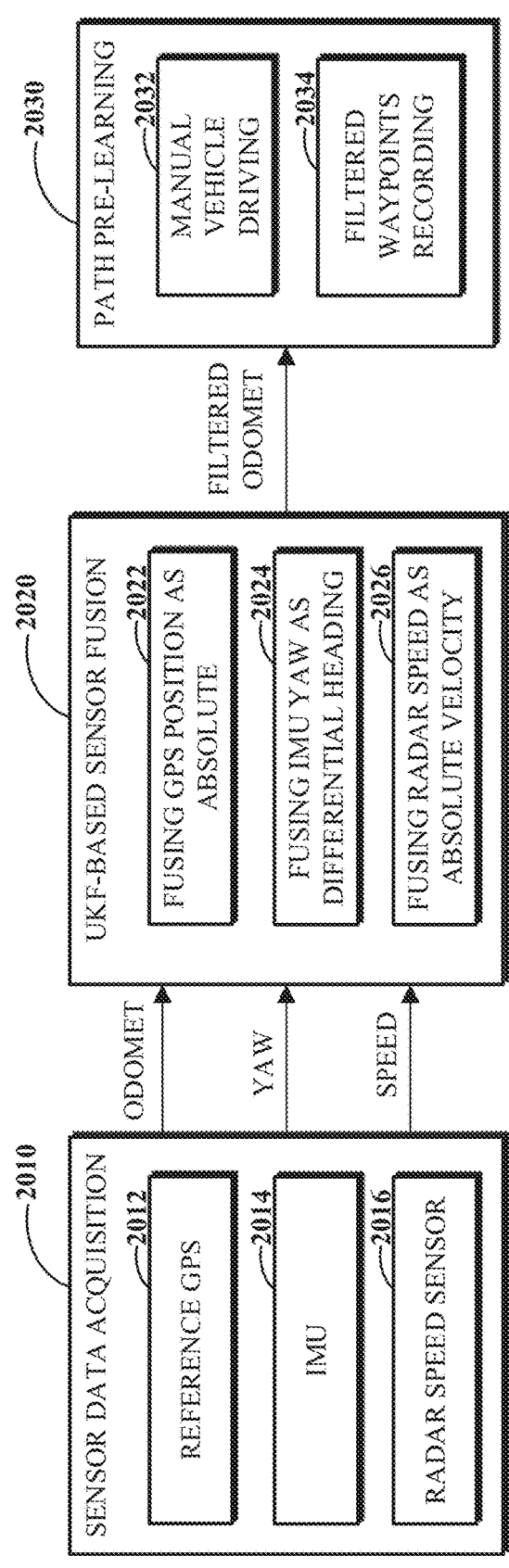
FIG. 20 is block diagram of an example of a method for global positioning system based path pre-learning by manual vehicle driving.
Figure 21:
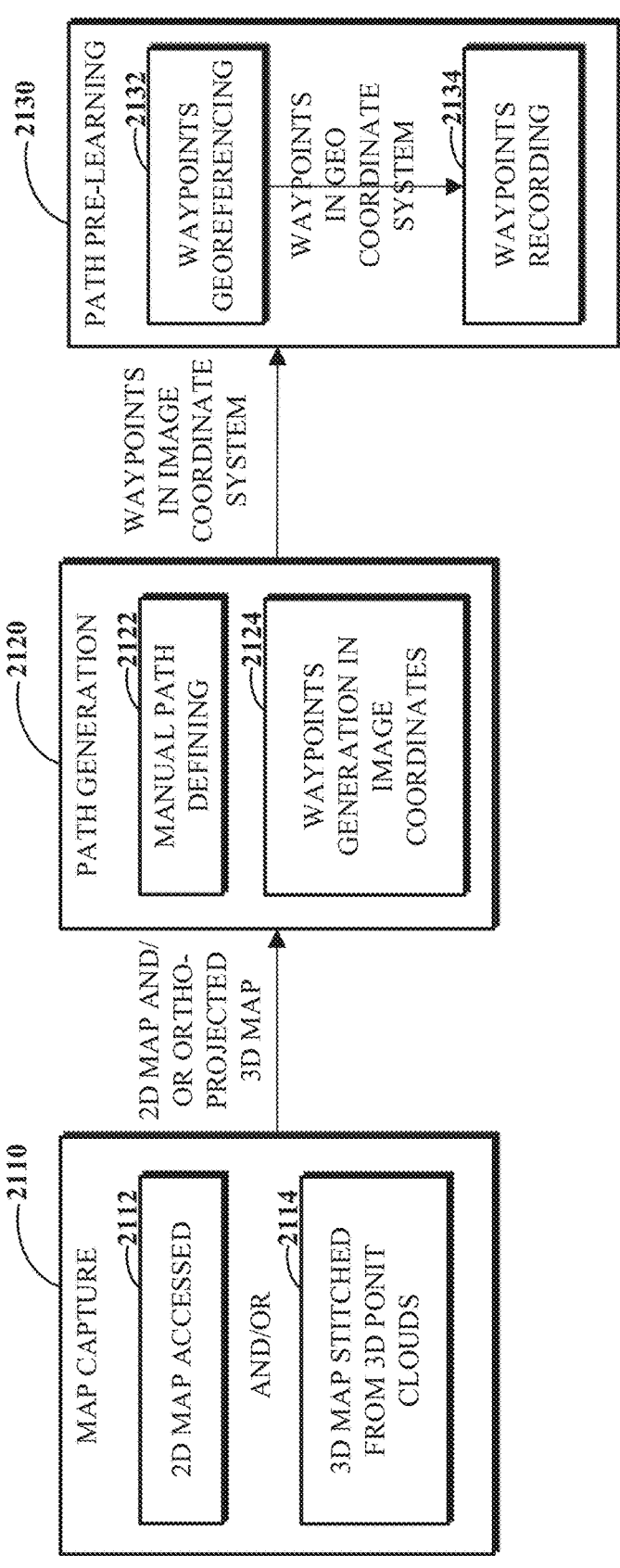
FIG. 21 is block diagram of an example of a method for global positioning system based path pre-learning by way-points generation.

FIGS. 20 and 21 depict two example methods for generating maps or paths when utilizing a GPS on the tractor. The first method, depicted in FIG. 20, allows a user to manually drive a path, where perception and orientation sensor values are recorded and fused to create sequential GPS waypoints the tractor can later follow autonomously. The second method, depicted in FIG. 21, utilizes aerial maps with GPS data to segment and draw a preferred route which may then be converted to GPS waypoints the tractor can later follow autonomously.

FIG. 20 is block diagram of an example of a method 2000 for global positioning system based path pre-learning by manual vehicle driving. The method 2000 includes sensor data acquisition 2010 that utilizes a reference global positioning system (GPS) 2012, an inertial measurement unit (IMU) 2014, and a radar speed sensor 2016; UKF-based sensor fusion 2020 that includes a fusing 2022 GPS position as absolute position data, fusing 2024 IMU yaw as differential position data, and fusing 2026 radar speed as absolute velocity; path pre-learning 2030 that includes manual vehicle driving 2032 and filtered waypoints recording 2034. For example, path pre-learning may include recording 2034 of filtered odometry data that is determined by UKF-based sensor fusion 2020 and associated with waypoints during manual vehicle driving 2032.

FIG. 21 is block diagram of an example of a method 2100 for global positioning system based path pre-learning by waypoints generation. The method 2100 includes map capture 2110 that includes accessing 2112 a 2D map and/or stitching 2114 a 3D map from 3D point clouds. Path generation 2120 may then be performed using a resulting 2D map and/or ortho-projected 3D map. In this example, path generation 2120 includes manual path defining 2122 (e.g., by drawing in a user interface, such a webpage presenting the map) and waypoints generation 2124 in image coordinates of the map. The method 2100 includes path pre-learning 2130 based on the waypoints in the image coordinates of the map. In this example, path pre-learning 2130 includes waypoints geo-referencing 2132 and recording 2134 of waypoints in a geographic coordinate system.

GPS-Based Navigation

Figure 22:
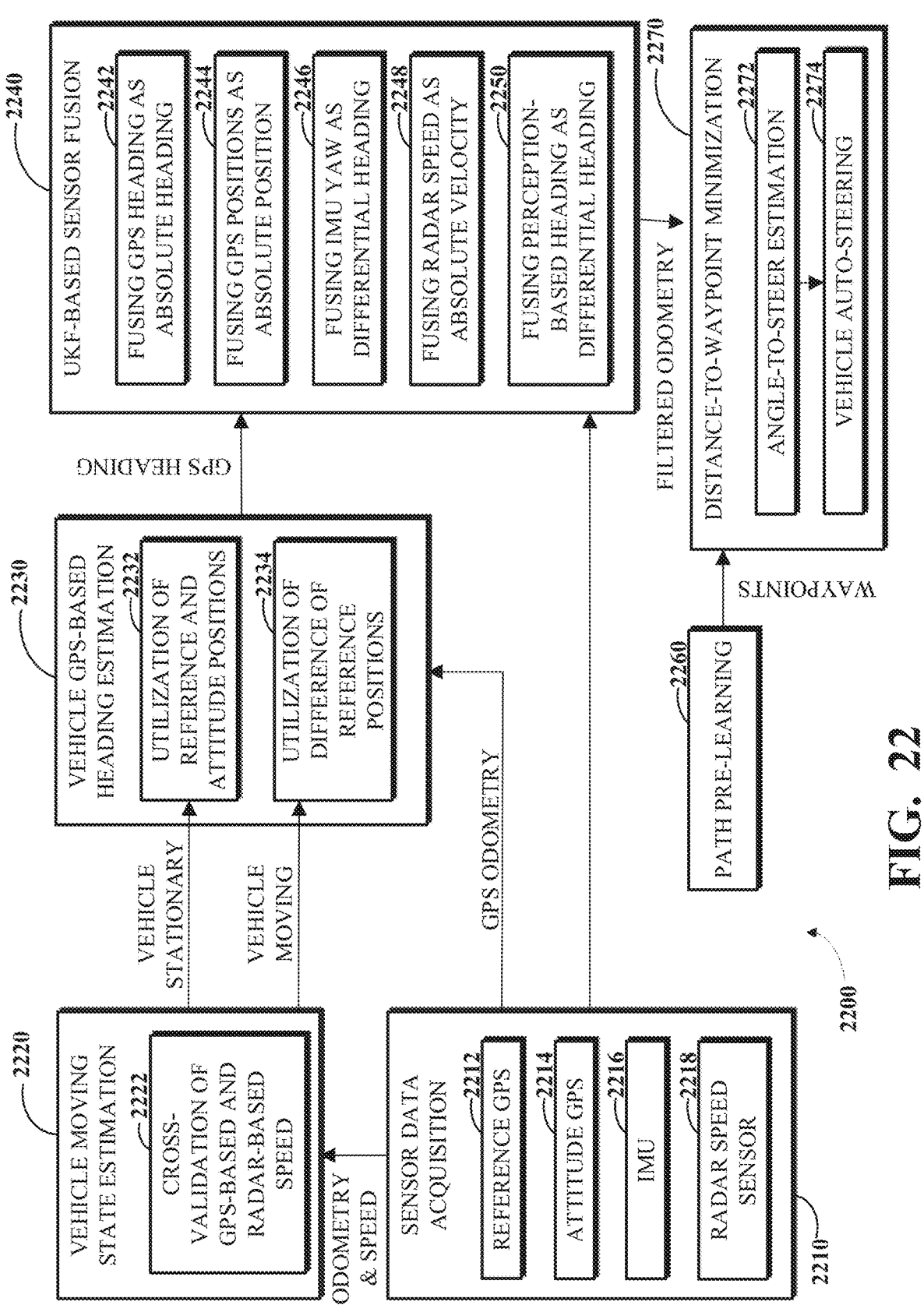
FIG. 22 is block diagram of an example of a method for global positioning system based path planning and navigation using sensor fusion.

FIG. 22 depicts the software algorithms that analyze and process sensor data and control a tractor (e.g., via messages to steering/pedal/implement actuators) based on a pre-defined path (e.g., a path defined as described in relation to FIG. 3, FIG. 4, FIG. 5, FIG. 20, or FIG. 21). The software architecture is a feedback loop, estimating the state of the tractor at the current time based on previous location, odometry, heading, and speed; then, calculating the goal waypoint, distance to that waypoint, and steering angle commands that result in a smooth navigation to said waypoint given the tractor's speed. This loop may continues through each waypoint along the pre-defined path until completion of the course or map.

FIG. 22 is block diagram of an example of a method 2200 for global positioning system based path planning and navigation using sensor fusion. The method 2200 includes sensor data acquisition 2210 that utilizes a reference GPS 2212 (e.g., mounted near the back of a vehicle), an attitude GPS 2214 (e.g., mounted near the front of the vehicle), an inertial measurement unit (IMU) 2216, and a radar speed sensor 2218; vehicle moving state estimation 2220 that includes cross-validation 2222 of GPS-based and radar-based speed; vehicle GPS-based heading estimation 2230 that includes utilization 2232 of reference and attitude positions and utilization 2234 of difference of reference positions; UKF-based sensor fusion 2240 that includes fusing 2242 GPS heading as absolute heading, fusing 2244 GPS positions as absolute positions, fusing 2246 IMU yaw as differential heading, fusing 2248 radar speed as absolute velocity, and fusing 2250 perception-based heading as differential heading; path pre-learning 2260; and distance-to-waypoint minimization 2270 that includes angle-to-steer estimation 2272 and vehicle auto-steering 2274.

ROS and Overall System Architecture

Figure 23:
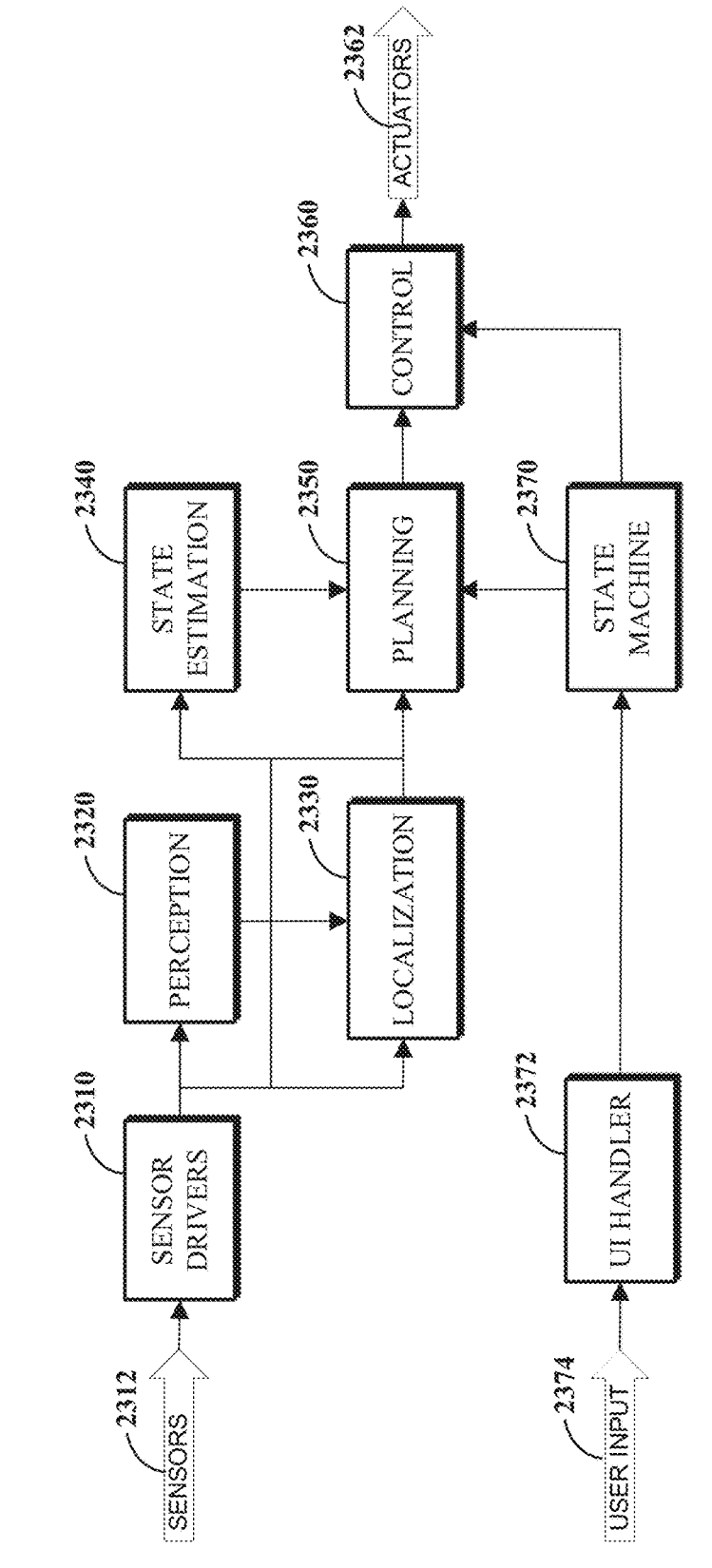
FIG. 23 is block diagram of an example of a software architecture for an autonomous vehicle control system.

FIG. 23 depicts an example of a high level software system architecture. The entire system may be built on a publish-subscribe (pub/sub) middleware system, such as Robot Operating System (ROS). In a pub/sub system, the software system may include of several nodes. For example, each node may subscribe to some topics that stream data, operate on that data, and publish their results. The pub/sub system allows the different components of the system to be abstracted into individual nodes as shown in FIG. 23. For example, the different classes of nodes may include sensor drivers, perception, localization, planning, control, user interface handler, and state machine.

FIG. 23 is block diagram of an example of a software architecture for an autonomous vehicle control system 2300. The autonomous vehicle control system 2300 includes a sensor drivers node 2310 that receives sensor data from one or more sensors 2312 (e.g., the sensors 140 or sensors of the tractor sensing system 1100); a perception node 2320; a localization node 2330; a state estimation node 2340; a planning node 2350; a control node 2360 configured to generate control signals for actuators 2362; a state machine 2370; and a user interface handler 2372 configured to receive user input 2374.

For example, the sensor drivers node 2310 may be responsible for reading in raw data from sensors, converting that data using calibration, and publishing it to the system. In some implementations (not shown in FIG. 23), each sensor will have its own driver node. For example the sensor drivers node 2310 may publish data to the localization and perception nodes.

For example, the perception node 2320 may subscribe to data coming from perception sensors, or sensors that collect data from the environment. For example, these sensors could include LiDAR, camera, or sonar. In some implementations, the perception node 2320 may be used for obstacle detection, object identification, and/or mapping.

For example, the localization node 2330 may subscribe to data from perception node 2320 and the sensor drivers node 2310. For example, the localization node 2330 may fuse this data to provide a probabilistic estimate of a location of a robot (e.g., a vehicle with a mounted implement under the control of an autonomous controller).

Autonomous Vehicle Safety

The vehicle may be constantly monitoring system health and has ability to terminate operations if any parameter goes out of predetermined safety limits/thresholds or if an operator or user decides to stop operations based on remotely detected conditions. For example, termination of operations can include a command to pause operations by stopping movement of the vehicle or cutting power to the entire system, which may stop all motors, engines, and actuators. In some implementations, termination of operations can also be based on monitored environmental conditions (e.g., detecting a thunderstorm coming).

System health monitoring may be run to ensure all aspects of the system are operating properly, which may include valid data from all sensors and all motors and actuators are responding in an expected manner to all commands. Additionally, a system of heartbeat messages may be passed between parts of the system to insure all parts are alive and well. If any problems are detected, the system may send a command down to a low level controller to terminate autonomous operation, which may be executed by safing the motors and actuators and then cutting power to the engine and stopping the system. Additionally, one or more users may be alerted to a hard shut down via the remote interface, which may prompt the user to resume operations manually.

Figure 24:
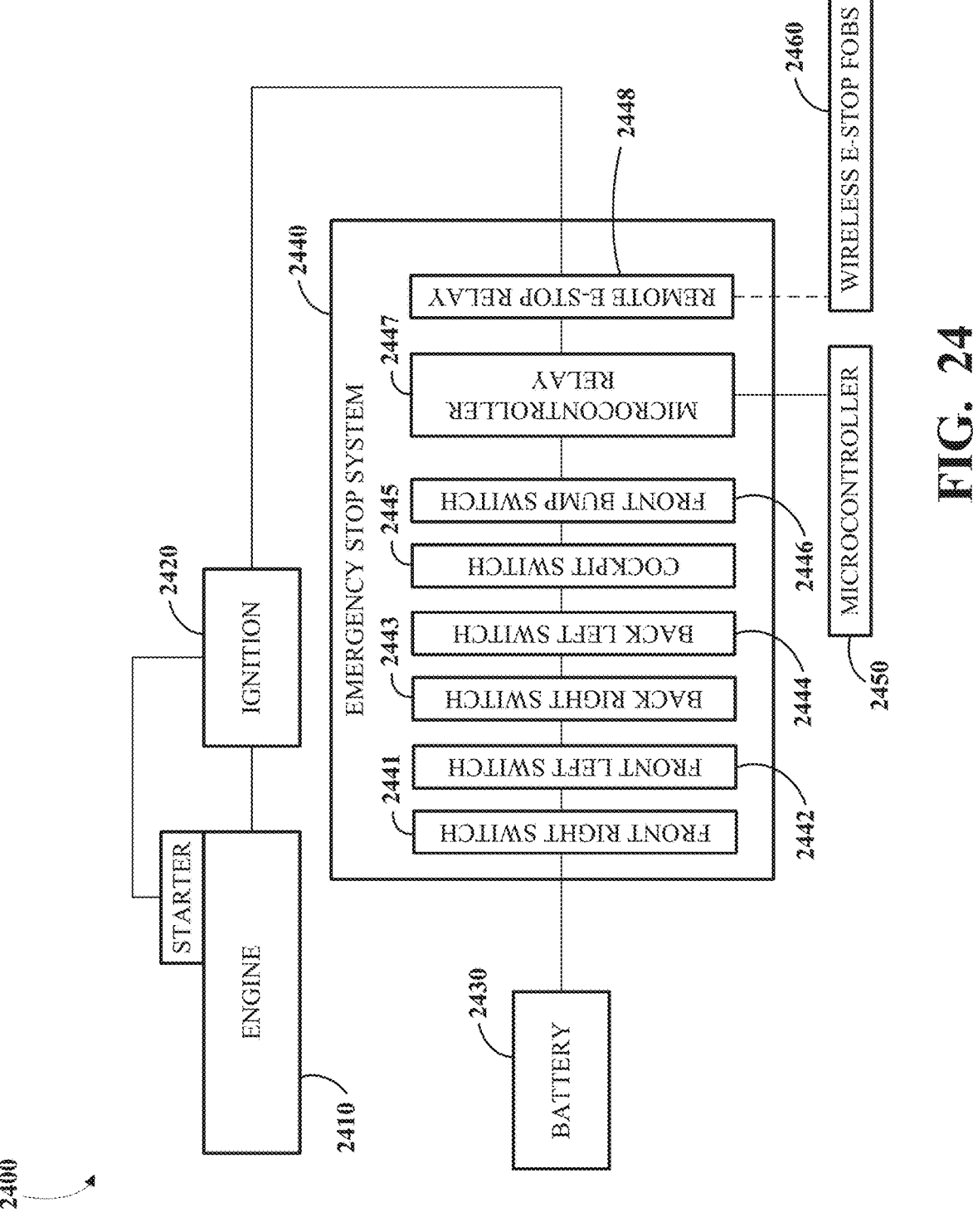
FIG. 24 is block diagram of an example of an emergency stop system.

The controller of the system may have physical switches capable of cutting power to the engines, motors and actuators (e.g., as shown in FIG. 24). These switches may be capable of being tripped manually, remotely, or via dedicated safety hardware, such as bump stops, light curtains, and/or geofences.

Safety System & FOBs

FIG. 24 is block diagram of an example of a vehicle 2400 including an emergency stop system. The emergency stop (e-stop) system 2440 is built to ensure remote or on-vehicle immediate shut down of the engine 2410 in the case of emergency. The switches (2441-2446) represent physical e-stop buttons mounted to the perimeter and cockpit of the tractor for use by a safety driver or someone walking alongside while the tractor is running autonomously. In addition, a front bumper and wireless FOBs 2460 act as switches when pressed. Upon activation of one of the many redundant safety switches power is cut to the engine 2410 and the vehicle (e.g., a tractor) will come to a stop.

The emergency stop system 2400 includes an engine 2410; an ignition module 2420; a battery 2430; an emergency stop system 2440; a microcontroller 2450; and one or more wireless e-stop FOBs 2460. The emergency stop system 2440 includes a front right switch 2441, a front left switch 2442, a back right switch 2443, a back left switch 2444, a cockpit switch 2445, and a front bump switch 2446. The emergency stop system 2440 includes a microcontroller relay 2247 that may be triggered by the microcontroller 2450. The emergency stop system 2440 includes a remote e-stop relay 2448 that may be triggered remotely by the wireless e-stop FOBs 2460.

FIG. 25 is flow chart of an example of a process 2500 for agricultural lane following using a distance sensor. The process 2500 includes accessing 2510 range data captured using a distance sensor connected to a vehicle; detecting 2520 a crop row based on the range data to obtain position data for the crop row; determining 2530, based on the position data for the crop row, a yaw and a lateral position of the vehicle with respect to a lane bounded by the crop row; and, based on the yaw and the lateral position, controlling 2540 the vehicle to move along a length of the lane bounded by the crop row. For example, the process 2500 may be implemented using the system 100 of FIG. 1. For example, the process 2500 may be implemented using the autonomous system 1300 of FIG. 13. For example, the process 2500 may be implemented using the autonomous vehicle control system 1400 of FIG. 14. For example, the process 2500 may be implemented using the autonomous vehicle control system 1500 of FIG. 15.

The process 2500 includes accessing 2510 range data captured using a distance sensor (e.g., the one or more distance sensors 146) connected to a vehicle (e.g., the vehicle 110). For example, the vehicle may be a tractor, a truck, or an all-terrain vehicle. For example, the distance sensor may be configured to output range data reflecting distances of objects with respect to the vehicle. For example, the distance sensor may be a radar sensor. For example, the distance sensor may be a lidar sensor. In some implementations, the distance sensor includes a lidar sensor and the range data includes point cloud data. For example, the range data may be accessed 2510 by receiving range data from the distance sensor via a bus (e.g., a controller area network (CAN) bus). In some implementations, the range data may be accessed 2510 via a communications link. For example, the range data may be accessed 2510 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the range data may be accessed 2510 as an input signal, which may represent positions of objects in a space near the vehicle. For example, the range data may include a three-dimensional point cloud or a voxelized occupancy grid. In some implementations, the range data may be accessed 2510 directly from the distance sensor without intermediate signal processing. In some implementations, the range data may be accessed 2510 after being subjected to intermediate signal processing (e.g., low-pass filtering or Kalman filtering to fuse data from multiple sensors). In some implementations, the range data may be accessed 2510 by retrieving the range data from a memory or other data storage apparatus.

Figure 32:
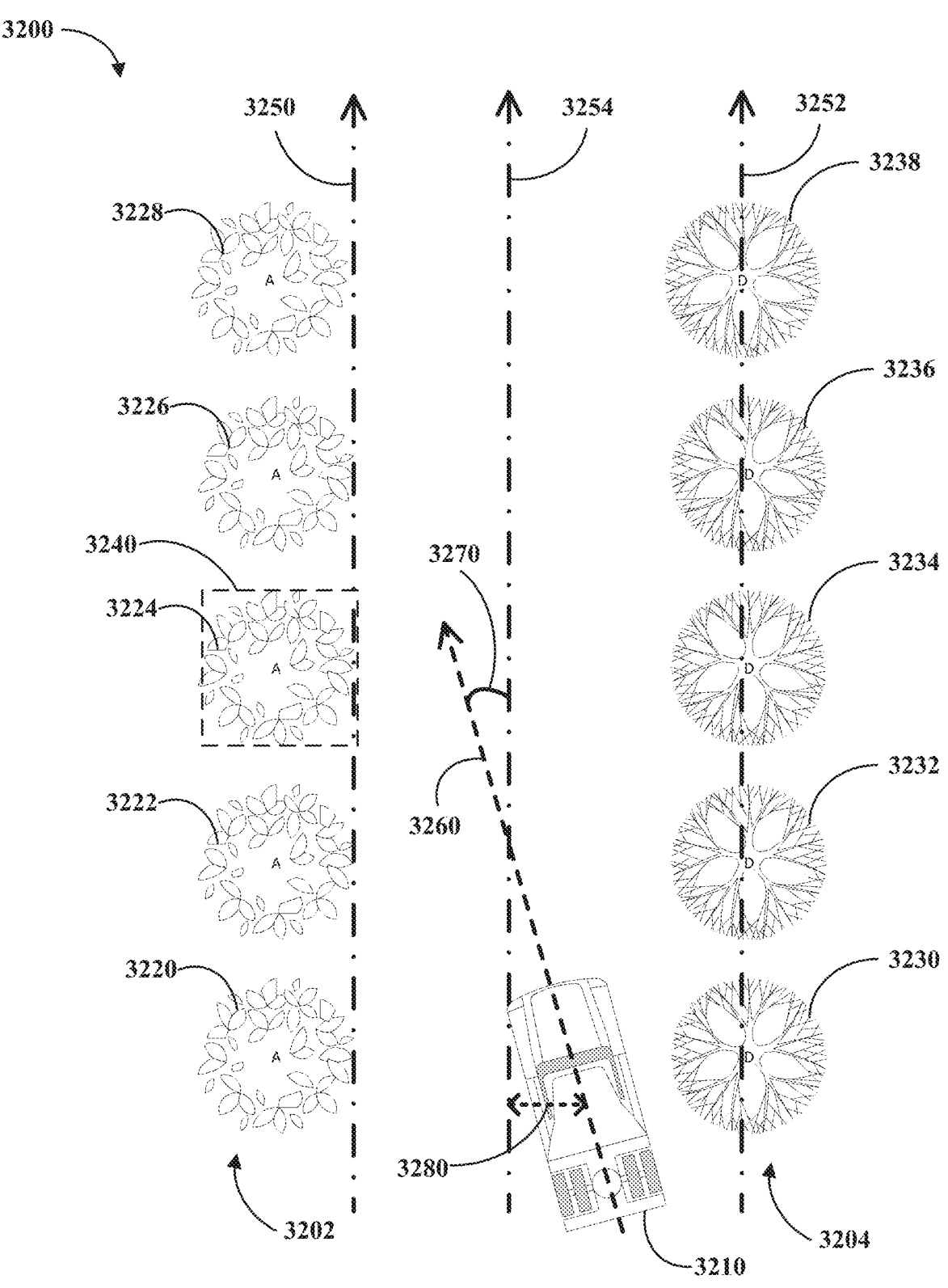
FIG. 32 is an illustration of an example of an agricultural lane following scenario.

The process 2500 includes detecting 2520 a crop row based on the range data to obtain position data for the crop row. For example, the crop row may include one or more plants (e.g., apple trees, corn stalks, or tomato plants). In some implementations, the vehicle is also connected to one or more image sensors and information from captured image data is fused with range data (e.g., radar sensor data or lidar sensor data) to detect 2520 the crop row and determine obtain position data for the crop row. For example, the process 2800 of FIG. 28 may be implemented to detect 2520 a crop row including one or more plants based on the range data. For example, the crop row may include a raised planting bed composed of soil structured to facilitate the planting of crop plants. For example, the process 2700 of FIG. 27 may be implemented to detect 2520 a crop row including a raised planting bed based on the range data. In some implementations, the range data may be filtered to isolate relevant position data for the crop row. For example, detecting 2520 a crop row may include filtering the range data (e.g., point cloud data) to consider only points in a zone of interest when detecting the crop row. For example, the zone of interest may be limited to a range of heights (e.g., from ground level to 4 feet to focus on tree trunks) and a maximum distance from the vehicle. In some implementations, the position data for the crop row includes one or more bounding boxes for one or more plants of the crop row, which may be determined by applying a neural network to the range data (e.g., filtered range data). In some implementations, two crop rows (a left crop row and a right crop row) that bound a lane the vehicle is positioned in on either side are detected 2520 and position data from both crop rows is used to identify and navigate the lane. For example, the scenario 3200 illustrated in FIG. 32 shows an agricultural lane bounded by a left crop row and right crop row. For example, the crop row may be a left crop, and the process 2500 may also include detecting 2520 a right crop row based on the range data.

The process 2500 includes determining 2530, based on the position data for the crop row, a yaw and a lateral position of the vehicle with respect to a lane bounded by the crop row. For example, the process 2600 of FIG. 26 may be implemented to determine 2530 the yaw and lateral position. For example, the process 2700 of FIG. 27 may be implemented to determine 2530 the yaw and lateral position. For example, a lane may be bounded by two crop rows (e.g., a left crop row and a right row) and position data for either or both of these bounding crop rows may be used to determine the position and orientation (specified by the yaw a lateral position) of vehicle with respect to the lane to facilitate agricultural lane following with or without localization into a map indicating the position(s) of the crop row(s). In some implementations, determining 2530 the yaw and lateral position includes determining 2530, based on position data for a left crop row and a right crop row, the yaw and the lateral position of the vehicle with respect to a lane bounded by the left crop row and the right crop row. For example, a lane may be bounded by a single crop row (e.g., a lane at the edge of a field) and unbounded on the other side or bounded by another object (e.g., a fence). In some implementations, a center line of the lane may be defined to facilitate maintaining a consistent distance between the vehicle and the nearest portion of the crop row to facilitate processing of the crop row with an agricultural implement (e.g., a plow, a sprayer, or a harvester) as the vehicle moves along the length of the identified lane. For example, the lateral position may be determined 2530 based on a constant lane width parameter and based on the position data for the crop row.

The process 2500 includes, based on the yaw and the lateral position, controlling 2540 the vehicle to move along a length of the lane bounded by the crop row. For example, actuators (e.g., the actuators 150 of FIG. 1) configured to control motion of the vehicle may be used to control 2540 the vehicle to move along a length of the lane bounded by the crop row. In some implementations, one or more actuators may be controlled to engage parts of a manual control interface (e.g., the manual control interface 112) of the vehicle to cause the vehicle to move along the length of the lane bounded by the crop row. For example, a turning angle may be determined based on the yaw and/or on the lateral position. The turning angle may be used control 2540 the one or more actuators to turn a steering wheel of the vehicle. For example, the one or more actuators may be controlled 2540 to pull down an accelerator pedal of the vehicle to cause the vehicle to be moved forward. In some implementations, the one or more actuators may bypass a manual control interface of the vehicle (e.g., using a controller area network (CAN) bus).

In some implementations (not shown in FIG. 25), the process 2500 may be augmented to include detecting and following a furrow in the lane to provide additional reassurance of the proper course where furrows have been formed between crop rows. For example, the process 2900 of FIG. 29 may be implemented to use range data (e.g., point cloud data) to detect a furrow in the lane and follow the furrow. For example, this furrow following may be combined with the lane following based on detection of the crop row by allowing a margin or range for the lateral position during lane following and following the furrow to the extent the vehicle stays within the allowed range of the lateral position. Other ways of combining the two objectives for control 2540 may be used.

FIG. 26 is flow chart of an example of a process 2600 for determining a yaw and a lateral position within an agricultural lane based on detected plants. The crop row may include multiple plants (e.g., cherry trees, stalks of corn, or tomato plants). The process 2600 includes detecting 2610 plants of the crop row based on the range data, and associating plants of the crop row with respective positions; fitting 2620 a line to the respective positions of plants of the crop row; and determining 2630 the yaw and the lateral position based on the line. For example, the process 2600 may be implemented using the system 100 of FIG. 1. For example, the process 2600 may be implemented using the autonomous system 1300 of FIG. 13. For example, the process 2600 may be implemented using the autonomous vehicle control system 1400 of FIG. 14. For example, the process 2600 may be implemented using the autonomous vehicle control system 1500 of FIG. 15.

The process 2600 includes detecting 2610 plants of the crop row based on the range data, and associating plants of the crop row with respective positions. For example, detecting 2610 plants of the crop row may include inputting the range data (e.g., a point cloud or a voxelized occupancy grid) to a neural network (e.g., a convolutional neural network) to obtain respective bounding boxes for plants of the crop row, which specify the respective positions of the plants. For example, detecting 2610 plants of the crop row may include applying a clustering algorithm to the range data to identify clusters of points associated with respective plants of the crop row and estimating the respective positions of the plants based on their clusters (e.g., estimated base on a centroid for a cluster).

The process 2600 includes fitting 2620 a line to the respective positions of plants of the crop row. For example, fitting 2620 the line may include determining a least squares fit of a line parallel to the ground plane to the respective positions associated with the plants of the crop row. For example, fitting 2620 the line may include applying a transform or other line fitting algorithm (e.g., a Hough transform or a random sample consensus (RANSAC) algorithm) to the respective positions associated with the plants of the crop row.

The process 2600 includes determining 2630 the yaw and the lateral position based on the line. For example, the yaw may be determined 2630 as an angle between the horizontal orientation of the vehicle and the fit 2620 line. For example, the lateral position may defined as distance from the line fit 2620 to the crop row or distance from a line parallel to the fit 2620 line (e.g., a center line for the lane bounded by the crop row). For example, the parallel line may be at spatially shifted (e.g., shifted by 0 meters, 1 meter, or 2 meters) into the lane. For example, a control algorithm for the vehicle may have an objective keeping the vehicle within a desired range (e.g., 0.1 meters 0.5 meters, 1 meter, or 2 meters) of the line parallel to the fit 2620 line. For example, the parallel line and/or the desired range may be selected to facilitate processing of the crop row using an agricultural implement attached to the vehicle. For example, scenario 3200 of FIG. 32 shows examples of yaw and lateral position.

FIG. 27 is flow chart of an example of a process 2700 for determining a yaw and a lateral position within an agricultural lane based on an edge of a raised planting bed. The process 2700 includes detecting 2710 one or more edges of the raised planting bed based on the range data, and associate the one or more edges of the raised planting bed with positions; fitting 2720 a line to the positions associated with an edge of the raised planting bed; and determining 2730 the yaw and the lateral position based on the line. For example, the process 2700 may be implemented using the system 100 of FIG. 1. For example, the process 2700 may be implemented using the autonomous system 1300 of FIG. 13. For example, the process 2700 may be implemented using the autonomous vehicle control system 1400 of FIG. 14. For example, the process 2700 may be implemented using the autonomous vehicle control system 1500 of FIG. 15.

The process 2700 includes detecting 2710 one or more edges of the raised planting bed based on the range data (e.g., a point cloud or voxelized occupancy grid), and associating the one or more edges of the raised planting bed with positions. For example, detecting 2710 one or more edges of the raised planting bed may include applying an edge detection algorithm (e.g., based on first-order or second order derivative expressions) to the range data.

The process 2700 includes fitting 2720 a line to the positions associated with an edge of the raised planting bed. For example, fitting 2720 the line may include determining a least squares fit of a line parallel to the ground plane to the positions associated with the edge of the raised planting bed. For example, fitting 2720 the line may include applying a transform or other line fitting algorithm (e.g., a Hough transform or a random sample consensus (RANSAC) algorithm) to the positions associated with the edge of the raised planting bed of the crop row.

The process 2700 includes determining 2730 the yaw and the lateral position based on the line. For example, the yaw and lateral position may be determined 2730 as described in relation to operation 2630 of FIG. 26.

Figure 28:
FIG. 28 is flow chart of an example of a process for detecting crop row by identifying bounding boxes for plants of the crop row.

FIG. 28 is flow chart of an example of a process 2800 for detecting crop row by identifying bounding boxes for plants of the crop row. The process 2800 includes accessing 2810 image data captured using one or more image sensors connected to the vehicle; determining 2820 bounding boxes for respective plants of the crop row based on the image data and the range data; and detecting 2830 the crop row based on the bounding boxes. For example, the process 2800 may be implemented using the system 100 of FIG. 1. For example, the process 2800 may be implemented using the autonomous system 1300 of FIG. 13. For example, the process 2800 may be implemented using the autonomous vehicle control system 1400 of FIG. 14. For example, the process 2800 may be implemented using the autonomous vehicle control system 1500 of FIG. 15.

The process 2800 includes accessing 2810 image data captured using one or more image sensors (e.g., the one or more image sensors 144) connected to the vehicle (e.g., the vehicle 110). For example, the vehicle may be a tractor, a truck, or an all-terrain vehicle. In some implementations, the one or more images sensors may be configured to capture light in bands of the spectrum corresponding to plant vitality. For example, the one or more image sensors may include a normalized difference vegetation index camera connected to the vehicle. In some implementations, accessing 2810 the image data includes accessing 2810 normalized difference vegetation index data, captured using the normalized difference vegetation index camera. For example, the image data may include RGB images and/or normalized difference vegetation index data. For example, the image data may be accessed 2810 by receiving image data from the one or more image sensors via a bus (e.g., a controller area network (CAN) bus). In some implementations, the image data may be accessed 2810 via a communications link. For example, the image data may be accessed 2810 via a wireless or wired communications interface (e.g., Wi-Fi, Bluetooth, USB, HDMI, Wireless USB, Near Field Communication (NFC), Ethernet, a radio frequency transceiver, and/or other interfaces). In some implementations, the image data may be accessed 2810 by retrieving the motion sensor data from a memory or other data storage apparatus. For example, the image data may be accessed 2810 as an input signal, which may represent each pixel value in a defined format, such as in a RAW image format or a YUV image format. In some implementations, the image data may be accessed 2810 directly from the one or more image sensors without intermediate signal processing. In some implementations, the image data may be accessed 2810 after being subjected to intermediate signal processing (e.g., low-pass filtering, lens distortion correction, spatial noise reduction and/or temporal noise reduction).

The process 2800 includes determining 2820 bounding boxes for respective plants of the crop row based on the image data and the range data (e.g., a point cloud or a voxelized occupancy grid). In some implementations, the distance sensor used to capture the range data includes a radar sensor. In some implementations, the distance sensor used to capture the range data includes a lidar sensor. For example, determining 2820 bounding boxes for respective plants of the crop row may include inputting the image data and the range data to a neural network (e.g., a convolutional neural network) to obtain the respective bounding boxes for plants of the crop row. For example, the image data may depict one or more plants of the crop row near the vehicle. For example, plants may include trees (e.g., apple trees, lemon trees, or cherry trees), vines (e.g., grape vines), or other plants (e.g., tomato plants, potato plants, or squash plants).

The process 2800 includes detecting 2830 the crop row based on the bounding boxes. For example, detecting 2830 the crop row may include applying a line fitting algorithm (e.g., a Hough transform or a random sample consensus (RANSAC) algorithm) to position data for the bounding boxes. In some implementations, detecting 2830 the crop row includes detecting the crop row based on normalized difference vegetation index data, which may help to isolate plant objects of the crop row from the rest of the environment.

Figure 29:
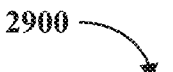
FIG. 29 is flow chart of an example of a process for following a furrow in an agricultural environment.

FIG. 29 is flow chart of an example of a process 2900 for following a furrow in an agricultural environment. The process 2900 includes determining 2910 a ground plane segmentation based on the point cloud data; detecting 2920 a furrow based on the ground plane segmentation to obtain position data for the furrow; and, based on the position data for the furrow, controlling 2930 the vehicle to move along a length of the furrow. For example, the process 2900 may be implemented using the system 100 of FIG. 1. For example, the process 2900 may be implemented using the autonomous system 1300 of FIG. 13. For example, the process 2900 may be implemented using the autonomous vehicle control system 1400 of FIG. 14. For example, the process 2900 may be implemented using the autonomous vehicle control system 1500 of FIG. 15.

The process 2900 includes determining 2910 a ground plane segmentation based on the point cloud data. For example, the point cloud data may represent a lane bounded by crop row including a raised crop bed that has not been seeded yet. For example, determining 2910 the ground plane segmentation may include applying a plane segmentation algorithm (e.g., a random sample consensus (RANSAC) algorithm) to the point cloud data.

The process 2900 includes detecting 2920 a furrow based on the ground plane segmentation to obtain position data for the furrow. For example, the furrow may be long trench in the ground between crop rows (e.g., formed by wheels of a tractor).

The process 2900 includes, based on the position data for the furrow, controlling 2930 the vehicle to move along a length of the furrow. For example, actuators (e.g., the actuators 150 of FIG. 1) configured to control motion of the vehicle may be used to control 2930 the vehicle to move along a length of the furrow. In some implementations, one or more actuators may be controlled to engage parts of a manual control interface (e.g., the manual control interface 112) of the vehicle to cause the vehicle to move along the length of the furrow. For example, a turning angle may be determined based on a yaw and/or on a lateral position relative to a line parallel to the length of the furrow. The turning angle may be used to control 2930 the one or more actuators to turn a steering wheel of the vehicle. For example, the one or more actuators may be controlled 2930 to pull down an accelerator pedal of the vehicle to cause the vehicle to be moved forward.

Figure 30:
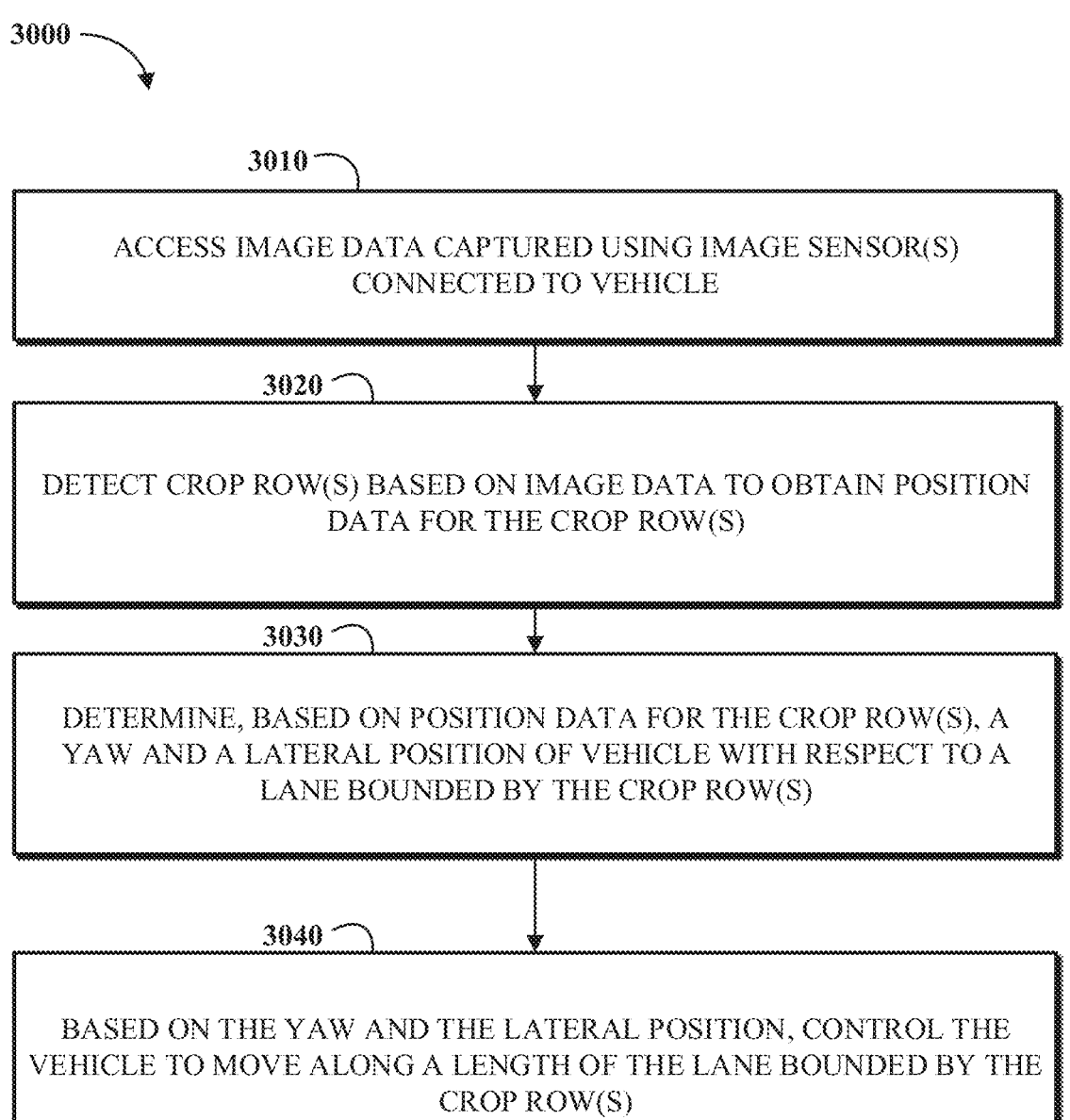
FIG. 30 is flow chart of an example of a process for agricultural lane following using one or more image sensors.

FIG. 30 is flow chart of an example of a process 3000 for agricultural lane following using one or more image sensors. The process 3000 includes accessing 3010 image data captured using one or more image sensors connected to a vehicle; detecting 3020 a crop row based on the image data to obtain position data for the crop row; determining 3030, based on the position data for crop row, a yaw and a lateral position of the vehicle with respect to a lane bounded by the crop row; and, based on the yaw and the lateral position, controlling 3040 the vehicle to move along a length of the lane bounded by the crop row. For example, the process 3000 may be implemented using the system 100 of FIG. 1. For example, the process 3000 may be implemented using the autonomous system 1300 of FIG. 13. For example, the process 3000 may be implemented using the autonomous vehicle control system 1400 of FIG. 14. For example, the process 3000 may be implemented using the autonomous vehicle control system 1500 of FIG. 15.

The process 3000 includes accessing 3010 image data captured using one or more image sensors (e.g., the one or more image sensors 144) connected to a vehicle (e.g., the vehicle 110). For example, the vehicle may be a tractor, a truck, or an all-terrain vehicle. In some implementations, the one or more images sensors may be configured to capture light in bands of the spectrum corresponding to plant vitality. For example, the one or more image sensors may include a normalized difference vegetation index camera connected to the vehicle. In some implementations, accessing 3010 the image data includes accessing 3010 normalized difference vegetation index data, captured using the normalized difference vegetation index camera. For example, the image data may include RGB images and/or normalized difference vegetation index data. For example, the image data may be accessed 3010 by receiving image data from the one or more image sensors via a bus (e.g., a controller area network (CAN) bus). In some implementations, the image data may be accessed 3010 via a communications link. For example, the image data may be accessed 3010 via a wireless or wired communications interface (e.g., Wi-Fi, Bluetooth, USB, HDMI, Wireless USB, Near Field Communication (NFC), Ethernet, a radio frequency transceiver, and/or other interfaces). In some implementations, the image data may be accessed 3010 by retrieving the motion sensor data from a memory or other data storage apparatus. For example, the image data may be accessed 3010 as an input signal, which may represent each pixel value in a defined format, such as in a RAW image format or a YUV image format. In some implementations, the image data may be accessed 3010 directly from the one or more image sensors without intermediate signal processing. In some implementations, the image data may be accessed 3010 after being subjected to intermediate signal processing (e.g., low-pass filtering, lens distortion correction, spatial noise reduction and/or temporal noise reduction).

The process 3000 includes detecting 3020 a crop row based on the image data to obtain position data for the crop row. For example, the crop row may include one or more plants (e.g., apple trees, corn stalks, or tomato plants). For example, the process 3100 of FIG. 31 may be implemented to detect 3020 the crop row. In some implementations, the one or more image sensors include a normalized difference vegetation index camera connected to the vehicle. For example, detecting 3020 a crop row may include accessing normalized difference vegetation index data, captured using the normalized difference vegetation index camera; and detecting 3020 the crop row based on the normalized difference vegetation index data.

In some implementations, the vehicle is also connected to a distance sensor and information from captured range data (e.g., a point cloud or a voxelized occupancy grid) is fused with the image data to detect 3020 the crop row and determine obtain position data for the crop row. For example, the distance sensor may be a radar sensor. For example, the distance sensor may be a lidar sensor. In some implementations, detecting 3020 a crop row based on the image data to obtain position data for the crop row includes accessing range data captured using the distance sensor, and determining a position of a plant in the crop row based on the image data and the range data. For example, image data and range data may be combined or fused to detect 3020 a plant in the crop row by inputting the image data and the range data to a neural network (e.g., a convolutional neural network) to obtain position data for the plant (e.g., a bounding box for the plant). For example, the process 2800 of FIG. 28 may be implemented to detect 3020 a crop row including one or more plants based on the image data to obtain position data for the crop row. For example, the crop row may include a raised planting bed composed of soil structured to facilitate the planting of crop plants. For example, a process similar to the process 2700 of FIG. 27 may be implemented to detect 3220 a crop row including a raised planting bed based on the image data (instead of based on range data). For example, detecting 3020 the crop row may include detecting one or more edges of the raised planting bed based on the image data, and associate the one or more edges of the raised planting bed with positions. For example, detecting one or more edges of the raised planting bed may include applying an edge detection algorithm (e.g., based on first-order or second order derivative expressions) to the image data.

Various methods may be used to determine distance information for detected objects of the crop row based on the image data. For example, detecting 3020 a crop row based on the image data to obtain position data for the crop row may include determining a distance from the vehicle to a plant in the crop row based on a size in pixels of the plant as it appears in the image data and a constant physical size parameter (e.g., an assumed size of the plant based on an expected plant type and/or time of year or season) of the plant. For example, the one or more image sensors may include two image sensors with overlapping fields of view, and a distance from the vehicle to a plant in the crop row may be determined based on stereoscopic signal processing of image data from the two image sensors depicting the plant. For example, detecting 3020 a crop row based on the image data to obtain position data for the crop row may include determining a bounding box for a plant of the crop row based on the image data; and determining a distance from the vehicle to a plant in the crop row based on an assumed height (e.g., assuming the base of the plant is at ground level in relation to the ground the vehicle is on or at a known offset in height from ground level) of a bottom of the bounding box relative to the one or more image sensors.

The process 3000 includes determining 3030, based on the position data for crop row, a yaw and a lateral position of the vehicle with respect to a lane bounded by the crop row. For example, a lane may be bounded by two crop rows (e.g., a left crop row and a right row) and position data for either or both of these bounding crop rows may be used to determine the position and orientation (specified by the yaw a lateral position) of vehicle with respect to the lane to facilitate agricultural lane following with or without localization into a map indicating the position(s) of the crop row(s). For example, determining 3030 the yaw and lateral position may include fitting a line to multiple plants in the crop row; and determining the yaw and the lateral position based on the line. In some implementations, determining 3030 the yaw and lateral position includes determining 3030, based on position data for a left crop row and a right crop row, the yaw and the lateral position of the vehicle with respect to a lane bounded by the left crop row and the right crop row. For example, determining 3030 the yaw and lateral position may include fitting a first line to position data for multiple plants in the left crop row; fitting a second line to position data for multiple plants in the right crop row; and determining the yaw and the lateral position based on the first line and the second line. For example, where the crop row includes a raised plant bed, determining 3030 the yaw and lateral position may include fitting a line to the positions associated with an edge of the raised planting bed; and determining the yaw and the lateral position based on the line (e.g., as described in relation to the process 2700 of FIG.

27. For example, a lane may be bounded by a single crop row (e.g., a lane at the edge of a field) and unbounded on the other side or bounded by another object (e.g., a fence). In some implementations, a center line of the lane may be defined to facilitate maintaining a consistent distance between the vehicle and the nearest portion of the crop row to facilitate processing of the crop row with an agricultural implement (e.g., a plow, a sprayer, or a harvester) as the vehicle moves along the length of the identified lane. For example, the lateral position may be determined 3030 based on a constant lane width parameter and based on the position data for the crop row.

The process 3000 includes, based on the yaw and the lateral position, controlling 3040 the vehicle to move along a length of the lane bounded by the crop row. For example, actuators (e.g., the actuators 150 of FIG. 1) configured to control motion of the vehicle may be used to control 2540 the vehicle to move along a length of the lane bounded by the crop row. In some implementations, one or more actuators may be controlled to engage parts of a manual control interface (e.g., the manual control interface 112) of the vehicle to cause the vehicle to move along the length of the lane bounded by the crop row. For example, a turning angle may be determined based on the yaw and/or on the lateral position. The turning angle may be used control 3040 the one or more actuators to turn a steering wheel of the vehicle. For example, the one or more actuators may be controlled 3040 to pull down an accelerator pedal of the vehicle to cause the vehicle to be moved forward. In some implementations, the one or more actuators may bypass a manual control interface of the vehicle (e.g., using a controller area network (CAN) bus).

In some implementations, two crop rows (a left crop row and a right crop row) that bound a lane the vehicle is positioned in on either side are detected 3020 and position data from both crop rows is used to identify and navigate the lane. For example, the scenario 3200 illustrated in FIG. 32 shows an agricultural lane bounded by a left crop row and right crop row. For example, the crop row may be a left crop, and the process 3000 may also include detecting 3020 a right crop row based on the image data to obtain position data for the right crop row. The lane may be bounded by the right crop row and the yaw and the lateral position are determined based on the position data for the right crop row. In some implementations, the process 3000 includes fitting a first line to position data for multiple plants in the left crop row; fitting a second line to position data for multiple plants in the right crop row; and determining the yaw and the lateral position based on the first line and the second line. For example, determining the yaw and the lateral position based on the first line and the second line may include taking an average of the first line and the second line to determine a line parallel to the lane, and determining the yaw a lateral position based on the line parallel to the lane. In some implementations, the process 3000 includes fitting a line to position data for multiple plants in the left crop row and to position data for multiple plants in the right crop row; and determine the yaw and the lateral position based on the line.

In some implementations (not shown in FIG. 30), the process 3000 may be augmented to include detecting and following a furrow in the lane to provide additional reassurance of the proper course where furrows have been formed between crop rows. For example, a process similar to the process 2900 of FIG. 29 may be implemented to use image data (e.g., RGB or YUV images) to detect a furrow in the lane and follow the furrow. In some implementations, the process 3000 is augmented to include determining a ground plane segmentation based on the image data; detecting a furrow based on the ground plane segmentation to obtain position data for the furrow; and, based on the position data for the furrow, controlling one or more of the actuators to cause the vehicle to move along a length of the furrow. For example, determining the ground plane segmentation based on the image data may include applying a texture segmentation algorithm and/or an edge detection algorithm to the image data. For example, this furrow following may be combined with the lane following based on detection of the crop row by allowing a margin or range for the lateral position during lane following and following the furrow to the extent the vehicle stays within the allowed range of the lateral position. Other ways of combining the two objectives for control 3040 may be used. For example, this technique based on using position data from both crop rows to fit a single line may work best when the sensors have sufficient range/resolution to detect plants in the crop at a distance such that the detected portions of the lane boundaries are significantly longer than the distance between the left crop row and the right crop row.

Figure 31:
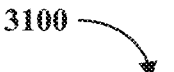
FIG. 31 is flow chart of an example of a process for determining a yaw and a lateral position within an agricultural lane based on detected plants.

FIG. 31 is flow chart of an example of a process 3100 for determining a yaw and a lateral position within an agricultural lane based on detected plants. The process 3100 includes inputting 3110 the image data to a neural network to detect a first plant of the crop row and obtain position data for the first plant; fitting 3120 a line to position data for multiple plants of the crop row, including the position data for the first plant; and determining 3130 the yaw and the lateral position based on the line. For example, the process 3100 may be implemented using the system 100 of FIG. 1. For example, the process 3100 may be implemented using the autonomous system 1300 of FIG. 13. For example, the process 3100 may be implemented using the autonomous vehicle control system 1400 of FIG. 14. For example, the process 3100 may be implemented using the autonomous vehicle control system 1500 of FIG. 15.

The process 3100 includes inputting 3110 the image data to a neural network to detect a first plant of the crop row and obtain position data for the first plant. For example, the neural network may include a convolutional neural network. In some implementations, the neural network is trained to detect a plant depicted in the image data and return position data for detected plant. For example, the position data for the first plant may include a bounding box for the first plant.

The process 3100 includes fitting 3120 a line to position data for multiple plants of the crop row, including the position data for the first plant. For example, fitting 3120 the line may include determining a least squares fit of a line parallel to the ground plane to a set of position data associated with the plants of the crop row. For example, fitting 3120 the line may include applying a transform or other line fitting algorithm (e.g., a Hough transform or a random sample consensus (RANSAC) algorithm) to the position data associated with the plants of the crop row.

The process 3100 includes determining 3130 the yaw and the lateral position based on the line. For example, the yaw and lateral position may be determined 3130 as described in relation to operation 2630 of FIG. 26.

FIG. 32 is an illustration of an example of an agricultural lane following scenario 3200. In the scenario 3200, two crop rows, a left crop row 3202 and a right crop row 3204 bound a lane on either side. A vehicle 3210 (e.g., the vehicle 110) is configured to automatically detect move along the lane bounded by the left crop row 3202 and the right crop row 3204. For example, the vehicle 3210 may be configured to implement the process 2500 of FIG. 25 or the process 3000 of FIG. 30. The left crop row 3202 includes the plants 3220, 3222, 3224, 3226, and 3228 (e.g., raspberry bushes). The right crop row 3204 includes the plants 3230, 3232, 3234, 3236, and 3238 (e.g., almond trees).

In this example scenario 3200, the vehicle 3210 is connected to a distance sensor (e.g., a lidar sensor or a radar sensor) and one or more image sensors (e.g., including an RGB camera and/or a normalized difference vegetation index camera). The processing apparatus (e.g., the processing apparatus 130) of the vehicle 3210 is configured to use sensor data capture by the distance sensor and/or the one or more cameras to detect the left crop row 3202 and the right crop row 3204. For example, the vehicle 3210 may detect the left crop row 3202 by inputting image data captured by the one or more image sensors and/or range data captured by the distance sensor to a neural network, which has been trained to detect the plants (e.g., raspberry bushes) expected to be present in the left crop row 3202, to obtain position data for the plants 3220, 3222, 3224, 3226, and 3228. The position data returned by the neural network includes a bounding box 3240 for the plant 3224 and similar bounding boxes (not shown in FIG. 32) for the plants 3220, 3222, 3226, and 3228. A line 3250 is then fit to the position data for the plants of left crop row 3202, including the bounding box 3240.

Similarly, the vehicle 3210 may detect the right crop row 3204 by inputting image data captured by the one or more image sensors and/or range data captured by the distance sensor to a neural network, which has been trained to detect the plants (e.g., almond trees) expected to be present in the right crop row, to obtain position data for the plants 3230, 3232, 3234, 3236, and 3238. For example, range data (e.g., a point cloud) may be filtered to isolate a region of interest corresponding to significant features of the plants 3230, 3232, 3234, 3236, and 3238 (e.g., the trunks of mature almond trees). The filtered range data may be input to For example, the vehicle 3210 may detect the right crop row 3204 by inputting the filtered range data to a neural network, which has been trained to detect the plants (e.g., almond trees) expected to be present in the right crop row 3204, to obtain position data for the plants 3220, 3222, 3224, 3226, and 3228. The position data returned by the neural network may include estimated centroids (not shown in FIG. 32) for the trunks for the plants 3230, 3232, 3234, 3236, and 3238. A line 3252 is then fit to the position data for the plants of right crop row 3204. A composite line 3254 (e.g., a center line for the lane) is determined based on the line 3250 and the line 3252 (e.g., by averaging the line 3250 and the line 3252).

The vehicle 3210 has a current heading 3260. In the example scenario 3200, the processing apparatus of the vehicle 3210 is configured to determine a yaw 3270 and a lateral position 3280 in relation to lane based on the composite line 3254. For example, the yaw 3270 may be an angle between the current heading 3260 of the vehicle and the composite line 3254 for the lane in a plane parallel to a detected ground plane in the environment. For example, the lateral position 3280 may be a distance between a centroid of the vehicle 3210 and the composite line 3254 for the lane bounded by the left crop row 3202 and the right crop row 3204. The vehicle 3210 may use the yaw 3270 and the lateral position 3280 to determine control parameters (e.g., a turning angle and/or an acceleration) that can be used to cause the vehicle 3210 to move along the length of the lane bounded by the left crop row 3202 and the right crop row 3204. The vehicle 3210 may include an attached agricultural implement (e.g., a sprayer), and the vehicle 3210 may control the implement to perform a function (e.g., spraying water or pesticide) either or both of the left crop row 3202 and the right crop row 3204 as the vehicle 3210 moves along the length of the lane.

In some implementations, tightly coupled machine learning models may be employed to determine position and/or orientation data (e.g., a yaw and a lateral position) for the vehicle in relation to lane bounded by one or more crop rows. For example, range data captured by distance sensor connected to the vehicle and/or image data captured by one or more image sensors connected to the vehicle may be input to a machine learning module (e.g., a neural network) that has been trained to directly determine a position and/or orientation or the vehicle in relation to lane bounded by one or more crop rows based on the input sensor data. In some implementations, the machine learning module (e.g., including a convolutional neural network is trained to take range data and image data from the vehicle as input and output a yaw and lateral position in relation to a lane bounded by one or more crop rows that the vehicle is located in.

In some implementations, a system can comprise one or more image sensors connected to a vehicle, actuators configured to control motion of the vehicle, and a processing apparatus that can be configured to: access image data captured using the one or more image sensors, detect a crop row based on the image data to obtain position data for the crop row, determine, based on the position data for the crop row, a yaw and a lateral position of the vehicle with respect to a lane bounded by the crop row, and based on the yaw and the lateral position, control, using one or more of the actuators, the vehicle to move along a length of the lane bounded by the crop row.

The system, in which in which the crop row is a left crop row, comprises the processing apparatus that can be configured to detect a right crop row based on the image data to obtain position data for the right crop row, wherein the lane is bounded by the right crop row and the yaw and the lateral position are determined based on the position data for the right crop row. The system comprises the processing apparatus that can be configured to: fit a first line to position data for multiple plants in the left crop row, fit a second line to position data for multiple plants in the right crop row, and determine the yaw and the lateral position based on the first line and the second line. The system comprises the processing apparatus that can be configured to: fit a line to position data for multiple plants in the left crop row and to position data for multiple plants in the right crop row and determine the yaw and the lateral position based on the line. The system comprises the processing apparatus that can be configured to determine a distance from the vehicle to a plant in the crop row based on a size in pixels of the plant as it appears in the image data and a constant physical size parameter of the plant. The system comprises the processing apparatus that can be configured to: determine a bounding box for a plant of the crop row based on the image data and determine a distance from the vehicle to a plant in the crop row based on an assumed height of a bottom of the bounding box relative to the one or more image sensors.

The system, in which one or more image sensors include two image sensors with overlapping fields of view, comprises the processing apparatus that can be configured to determine a distance from the vehicle to a plant in the crop row based on stereoscopic signal processing of image data from the two image sensors depicting the plant. The system comprises a distance sensor connected to the vehicle and the processing apparatus that can be configured to: access range data captured using the distance sensor and determine a position of a plant in the crop row based on the image data and the range data. The distance sensor can be a radar sensor. The distance sensor can be a lidar sensor.

The system, in which the one or more image sensors comprise a normalized difference vegetation index camera connected to the vehicle, comprises the processing apparatus that can be configured to: access normalized difference vegetation index data, captured using the normalized difference vegetation index camera and detect the crop row based on the normalized difference vegetation index data. The system comprises the processing apparatus that can be configured to: input the image data to a neural network to detect a first plant of the crop row and obtain position data for the first plant, fit a line to position data for multiple plants of the crop row, including the position data for the first plant, and determine the yaw and the lateral position based on the line. The position data for the first plant can include a bounding box for the first plant. The system can comprise an implement connected to the vehicle, wherein the implement is configured to selectively perform an operation on one or more plants or soil of the crop row as the vehicle is moved along the length of the lane bounded by the crop row.

The system, in which the crop row includes a raised planting bed, comprises the processing apparatus that can be configured to: detect one or more edges of the raised planting bed based on the image data, and associate the one or more edges of the raised planting bed with positions, fit a line to the positions associated with an edge of the raised planting bed, and determine the yaw and the lateral position based on the line. The system comprises the processing apparatus that can be configured to: determine a ground plane segmentation based on the image data, detect a furrow based on the ground plane segmentation to obtain position data for the furrow, and based on the position data for the furrow, control one or more of the actuators to cause the vehicle to move along a length of the furrow.

In some implementations, a method can comprise: accessing range data captured using a distance sensor connected to a vehicle, detecting a crop row based on the range data to obtain position data for the crop row, determining, based on the position data for the crop row, a yaw and a lateral position of the vehicle with respect to a lane bounded by the crop row, and based on the yaw and the lateral position, controlling the vehicle to move along a length of the lane bounded by the crop row. The method, in which the crop row includes multiple plants, can comprise: detecting plants of the crop row based on the range data, and associating plants of the crop row with respective positions, fitting a line to the respective positions of plants of the crop row, and determining the yaw and the lateral position based on the line.

The method, in which the crop row includes a raised planting bed, can comprise: detecting one or more edges of the raised planting bed based on the range data, and associating the one or more edges of the raised planting bed with positions, fitting a line to the positions associated with an edge of the raised planting bed, and determining the yaw and the lateral position based on the line. The distance sensor can include a lidar sensor and the range data can include point cloud data. The method can comprise: determining a ground plane segmentation based on the point cloud data, detecting a furrow based on the ground plane segmentation to obtain position data for the furrow, and based on the position data for the furrow, controlling the vehicle to move along a length of the furrow. The method can comprise filtering the point cloud data to consider only points in a zone of interest when detecting the crop row, wherein the zone of interest is limited to a range of heights and a maximum distance from the vehicle.

The method, in which the distance sensor includes a radar sensor, can comprise: accessing image data captured using one or more image sensors connected to the vehicle, determining bounding boxes for respective plants of the crop row based on the image data and the range data, and detecting the crop row based on the bounding boxes. The method, in which the one or more image sensors comprise a normalized difference vegetation index camera connected to the vehicle, can comprise: accessing normalized difference vegetation index data, captured using the normalized difference vegetation index camera, and detecting the crop row based on the normalized difference vegetation index data.

The method, in which the distance sensor includes a lidar sensor, can comprise: accessing image data captured using one or more image sensors connected to the vehicle, determining bounding boxes for respective plants of the crop row based on the image data and the range data, and detecting the crop row based on the bounding boxes. The method, in which the crop row is a left crop, can comprise: detecting a right crop row based on the range data, and determining, based on position data for the left crop row and the right crop row, the yaw and the lateral position of the vehicle with respect to a lane bounded by the left crop row and the right crop row.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A system comprising:
a distance sensor connected to a vehicle, wherein the distance sensor is configured to output range data reflecting distances of objects with respect to the vehicle;
actuators configured to control motion of the vehicle; and
a processing apparatus configured to:
access range data captured using the distance sensor;
determine a ground plane segmentation based on the range data;
detect a furrow based on the ground plane segmentation to obtain position data for the furrow;
based on the position data for the furrow, control one or more of the actuators to cause the vehicle to move along a length of the furrow;
detect a crop row based on the range data to obtain position data for the crop row, by applying a clustering algorithm to the range data to identify three-dimensional clusters of points associated with respective plants of the crop row and estimating respective positions of the respective plants of the crop row based on their associated three-dimensional clusters of points;
determine, based on the position data for the crop row including the respective positions of the respective plants of the crop row, a yaw and a lateral position of the vehicle with respect to a lane bounded by the crop row; and
based on the yaw and the lateral position, control, using one or more of the actuators, the vehicle to move along a length of the lane bounded by the crop row.

2. The system of claim 1, in which the crop row includes multiple plants and the processing apparatus is configured to:
detect the plants of the crop row based on the range data, and associate plants of the crop row with respective positions;
fit a line to the respective positions of the plants of the crop row; and
determine the yaw and the lateral position based on the line.

3. The system of claim 1, in which the crop row includes a raised planting bed and the processing apparatus is configured to:
detect one or more edges of the raised planting bed based on the range data, and associate the one or more edges of the raised planting bed with positions;
fit a line to the positions associated with an edge of the raised planting bed; and
determine the yaw and the lateral position based on the line.

4. The system of claim 1, in which the distance sensor includes a lidar sensor and the range data includes point cloud data, and in which the processing apparatus is configured to:
determine the ground plane segmentation based on the point cloud data.

5. The system of claim 4, in which the processing apparatus is configured to:
filter the point cloud data to consider only points in a zone of interest when detecting the crop row, wherein the zone of interest is limited to a range of heights and a maximum distance from the vehicle.

6. The system of claim 1, in which the distance sensor includes a radar sensor, the system includes one or more image sensors connected to the vehicle, and the processing apparatus is configured to:
access image data captured using the one or more image sensors;
determine bounding boxes for respective plants of the crop row based on the image data and the range data; and
detect the crop row based on the bounding boxes.

7. The system of claim 6, in which the one or more image sensors comprise a normalized difference vegetation index camera connected to the vehicle, and in which the processing apparatus is configured to:
access normalized difference vegetation index data, captured using the normalized difference vegetation index camera; and
detect the crop row based on the normalized difference vegetation index data.

8. The system of claim 1, in which the distance sensor includes a lidar sensor, the system includes one or more image sensors connected to the vehicle, and the processing apparatus is configured to:
access image data captured using the one or more image sensors;
determine bounding boxes for respective plants of the crop row based on the image data and the range data; and
detect the crop row based on the bounding boxes.

9. The system of claim 1, in which the crop row is a left crop row, and the processing apparatus is configured to:
detect a right crop row based on the range data; and
determine, based on position data for the left crop row and the right crop row, the yaw and the lateral position of the vehicle with respect to a lane bounded by the left crop row and the right crop row.

10. The system of claim 1, in which the processing apparatus is configured to:

determine the lateral position based on a constant lane width parameter and based on the position data for the crop row.

11. A method comprising:

accessing range data captured using a distance sensor connected to a vehicle;

determining a ground plane segmentation based on the range data;

detecting a furrow based on the ground plane segmentation to obtain position data for the furrow;

based on the position data for the furrow, controlling one or more actuators to cause the vehicle to move along a length of the furrow;

detecting a crop row based on the range data to obtain to obtain position data for the crop row, wherein detecting the crop row includes applying a clustering algorithm to the range data to identify three-dimensional clusters of points associated with respective plants of the crop row and estimating respective positions of the respective plants of the crop row based on their associated three-dimensional clusters of points;

determining, based on the position data for the crop row including the respective positions of the respective plants of the crop row, a yaw and a lateral position of the vehicle with respect to a lane bounded by the crop row; and based on the yaw and the lateral position, controlling the vehicle to move along a length of the lane bounded by the crop row.

12. The method of claim 11, in which the crop row includes multiple plants, comprising:

detecting the plants of the crop row based on the range data, and associate plants of the crop row with respective positions;

fitting a line to the respective positions of the plants of the crop row; and determining the yaw and the lateral position based on the line.

13. The method of claim 11, in which the crop row includes a raised planting bed, comprising:

detecting one or more edges of the raised planting bed based on the range data, and associate the one or more edges of the raised planting bed with positions;

fitting a line to the positions associated with an edge of the raised planting bed; and determining the yaw and the lateral position based on the line.

14. The method of claim 11, in which the distance sensor includes a lidar sensor and the range data includes point cloud data, comprising:

determining the ground plane segmentation based on the point cloud data.

15. The method of claim 14, comprising:

filtering the point cloud data to consider only points in a zone of interest when detecting the crop row, wherein the zone of interest is limited to a range of heights and a maximum distance from the vehicle.

16. The method of claim 11, in which the distance sensor includes a radar sensor, comprising:

accessing image data captured using one or more image sensors connected to the vehicle;

determining bounding boxes for respective plants of the crop row based on the image data and the range data; and detecting the crop row based on the bounding boxes.

17. The method of claim 16, in which the one or more image sensors comprise a normalized difference vegetation index camera connected to the vehicle, comprising:

accessing normalized difference vegetation index data, captured using the normalized difference vegetation index camera; and detecting the crop row based on the normalized difference vegetation index data.

18. The method of claim 11, in which the distance sensor includes a lidar sensor, comprising:

accessing image data captured using one or more image sensors connected to the vehicle;

determining bounding boxes for respective plants of the crop row based on the image data and the range data; and detecting the crop row based on the bounding boxes.

19. The method of claim 11, in which the crop row is a left crop row, comprising:

detecting a right crop row based on the range data; and determining, based on position data for the left crop row and the right crop row, the yaw and the lateral position of the vehicle with respect to a lane bounded by the left crop row and the right crop row.

20. The method of claim 11, comprising:

determining the lateral position based on a constant lane width parameter and based on the position data for the crop row.

\* \* \* \* \*